(12) United States Patent
Oami

(10) Patent No.: US 6,363,119 B1
(45) Date of Patent: Mar. 26, 2002

(54) DEVICE AND METHOD FOR HIERARCHICALLY CODING/DECODING IMAGES REVERSIBLY AND WITH IMPROVED CODING EFFICIENCY

(75) Inventor: Ryoma Oami, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/261,651

(22) Filed: Mar. 3, 1999

(30) Foreign Application Priority Data

Mar. 5, 1998 (JP) .......................................... 10-054021

(51) Int. Cl.$^7$ .............................. H04B 1/66; G06K 9/46
(52) U.S. Cl. ..................................... 375/240.3; 382/240
(58) Field of Search ........................ 375/240.3, 240.21, 375/240.16; 382/240

(56) References Cited

U.S. PATENT DOCUMENTS

| | | | | |
|---|---|---|---|---|
| 5,912,706 A | * | 1/1999 | Kikuchi et al. .............. | 348/401 |
| 6,173,013 B1 | * | 1/2001 | Suzuki et al. .......... | 375/240.16 |
| 6,292,591 B1 | * | 1/2001 | Kondo ........................ | 382/240 |
| 6,195,390 B1 | * | 2/2001 | Hashino et al. ........ | 375/240.21 |
| 2001/0016006 A1 | * | 8/2001 | Kadono ................. | 375/240.16 |

FOREIGN PATENT DOCUMENTS

| | | |
|---|---|---|
| JP | 4-72870 | 3/1992 |
| JP | 9-186882 | 7/1997 |
| JP | 10-108186 | 4/1998 |
| JP | 10-261966 | 9/1998 |

OTHER PUBLICATIONS

R. Oami, et al., "A Study of Hierarchical Coding With Lossless DCT", The Proceedings of the 12th Picture Coding Symposium of Japan, Oct. 1997, pp. 107–108.

D. Wilson, et al., "Efficient Coding Methods for Enhancement DCT Coefficients in SNR Scalable Coders", Proceedings of PCS 97, Sep. 1997, pp. 407–410.

"Rate Control and Buffer Control", Journal of the Institute of Television Engineers of Japan (special issue MPEG 3-2-5), vol. 49, No. 4, Apr. 1995, pp. 455–458.

Japanese Office Action issued Jul. 25, 2000 in a related application with English translation of relevant portions.

* cited by examiner

*Primary Examiner*—Chris Kelley
*Assistant Examiner*—B. Senfi
(74) *Attorney, Agent, or Firm*—Ostrolenk, Faber, Gerb & Soffen, LLP

(57) ABSTRACT

A hierarchical image coding device includes a base layer coding section, an arithmetic coding section, a coding residual value occurrence probability calculation section and a multiplexer. The base layer coding section encodes an input video signal and thereby generates a base layer bit-stream. At the same time, the base layer coding section also outputs coding residual values and quantization information. The coding residual value occurrence probability calculation section calculates and outputs occurrence probability of each possible value of each of the coding residual values, based on the quantization information outputted by the base layer coding section and statistical values (concerning values before quantization) which have preliminarily been stored therein. The arithmetic coding section executes arithmetic coding to the coding residual values based on the coding residual value occurrence probabilities outputted by the coding residual value occurrence probability calculation section. The result of the arithmetic coding and the quantization information are multiplexed by the multiplexer, and thereby an enhancement layer bit-stream is generated and outputted. By the arithmetic coding of the coding residual values based on the coding residual value occurrence probabilities calculated based on the quantization information, coding efficiency of the enhancement layer bit-stream is improved.

60 Claims, 22 Drawing Sheets

F I G. 15
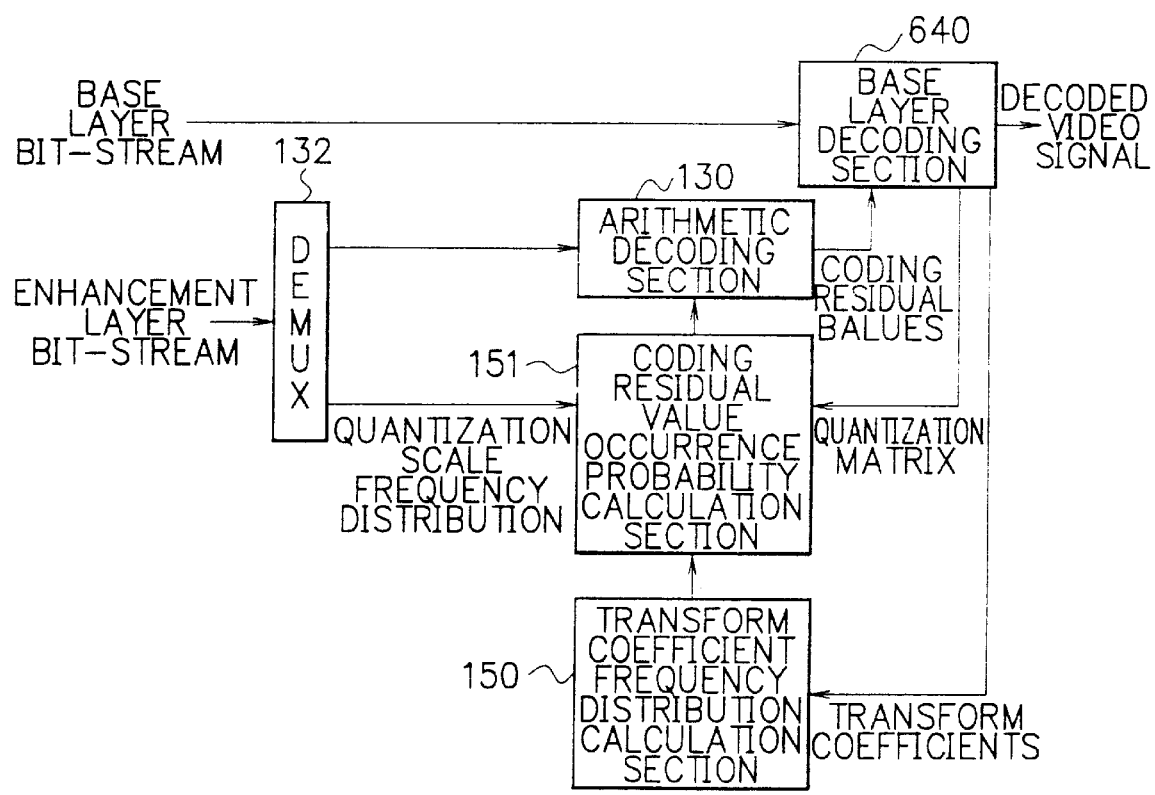

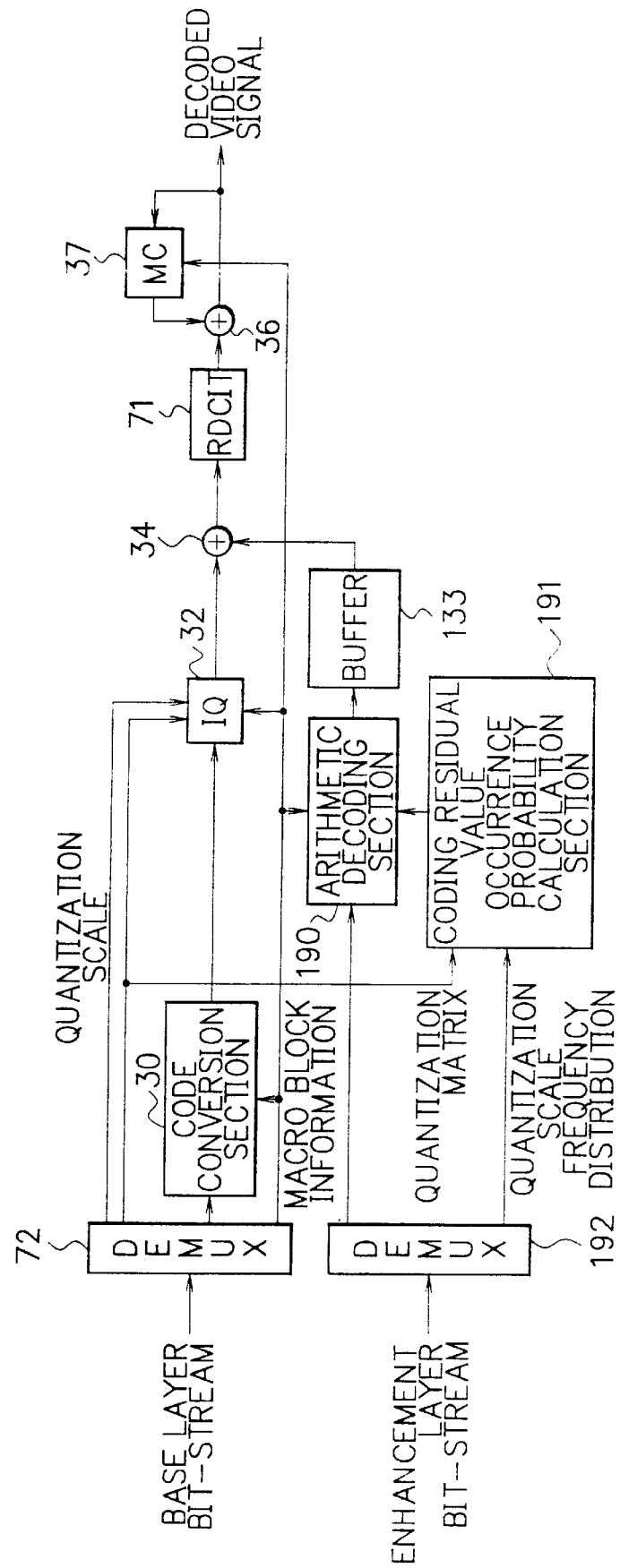
F I G. 24

DEVICE AND METHOD FOR HIERARCHICALLY CODING/DECODING IMAGES REVERSIBLY AND WITH IMPROVED CODING EFFICIENCY

BACKGROUND OF THE INVENTION

The present invention generally relates to a technique for compressing images (image signals), and in particular, to hierarchical image coding/decoding devices and hierarchical image coding/decoding methods by which lossless decoding of coded images is realized.

DESCRIPTION OF RELATED ARTS

As a reversible image coding method, the present inventor has recently proposed a technique in Japanese Patent Application Laid-Open No.HEI10-108186 (published Apr. 24, 1998): "Transform Coding Method for Digital Signals enabling Reversible Transformation." The technique is a reversible image coding method based on discrete cosine transform (DCT), and enables reversible coding by improving an ordinary coding method which employs discrete cosine transform. A reversible image coding method can also be constructed by applying the above technique to an MPEG-2 (Moving Picture Experts Group-Phase 2) coding method.

By combining the above reversible image coding method and the MPEG-2 SNR scalability together, a reversible hierarchical coding method can be constructed, as we mentioned in R. Oami and M. Ohta "A Study on Hierarchical Coding with Lossless DCT," The Proceedings of the 12th Picture Coding Symposium of Japan, pages 107–108 (October 1997). By the reversible hierarchical coding method, two layer bit-streams, a base layer bit-stream and an enhancement layer bit-stream, are generated. The base layer bit-stream can be decoded with an ordinary MPEG-2 decoder. The enhancement layer bit-stream is a bit-stream for complementing the base layer bit-stream. A lossless decoded image which is exactly the same as the original image can be obtained by decoding the base layer bit-stream and the enhancement layer bit-stream using inverse transformation of the reversible discrete cosine transform described in the Japanese Patent Application Laid-Open No.HEI10-108186 (published Apr. 24, 1998).

FIG. 1 is a circuit diagram showing an example of a hierarchical image coding device which is realized by employing the MPEG-2 SNR scalability and the reversible discrete cosine transform proposed by the present inventors. Referring to FIG. 1, the hierarchical image coding device comprises a quantization control section 3, a quantizer 4, an inverse quantizer (de-quantizer) 5, a motion estimation/compensation circuit (ME/MC) 50, a reversible discrete cosine transform circuit (RDCT) (lossless discrete cosine transform circuit (LDCT)) 51, code conversion sections 14 and 52 subtracters 1 and 53, and multiplexers 54 and 55.

The motion estimation/compensation circuit 50 executes motion compensation to an input video signal (the original image signal), and thereby generates and outputs a motion compensated prediction image signal. At the same time, the motion estimation/compensation circuit 50 also outputs macro block information. The subtracter 1 subtracts the motion compensated prediction image signal outputted by the motion estimation/compensation circuit 50 from the input video signal (the original image signal), and thereby outputs a prediction error image signal. The reversible discrete cosine transform circuit 51 executes the reversible discrete cosine transform to the prediction error image signal outputted by the subtracter 1, and thereby obtains transform coefficients of the reversible discrete cosine transform.

The quantization control section 3 determines and outputs a quantization scale on every macro block, based on the prediction error image signal outputted by the subtracter 1 and code quantity information of the base layer bit-stream outputted by the multiplexer 54. The quantizer 4 quantizes the transform coefficients outputted by the reversible discrete cosine transform circuit 51 based on a quantization matrix, the quantization scale determined by the quantization control section 3, and the macro block information outputted by the motion estimation/compensation circuit 50, and thereby outputs the quantized values of the transform coefficients to the code conversion section 14.

The code conversion section 14 encodes the quantized values outputted by the quantizer 4 into a variable length code based on the macro block information outputted by the motion estimation/compensation circuit 50 and a predetermined coding table, and thereby outputs the variable length code of the quantized values to the multiplexer 54. The multiplexer 54 multiplexes the variable length code outputted by the code conversion section 14, the quantization scale outputted by the quantization control section 3, the macro block information outputted by the motion estimation/compensation circuit 50, the quantization matrix and other additional information, and thereby generates and outputs the base layer bit-stream. The multiplexer 54 also outputs the code quantity information of the base layer bit-stream to the quantization control section 3.

The inverse quantizer 5 inversely quantizes (dequantizes) the quantized values outputted by the quantizer 4, using the quantization matrix and the quantization scale and based on the macro block information outputted by the motion estimation/compensation circuit 50, and outputs the inversely quantized values to the subtracter 53. The subtracter 53 subtracts the inversely quantized values outputted by the inverse quantizer 5 from the transform coefficients outputted by the reversible discrete cosine transform circuit 51, and thereby obtains coding residual values (coding residual signal). The code conversion section 52 encodes the coding residual values outputted by the subtracter 53 into a variable length code based on a predetermined coding table, and thereby outputs the variable length code of the coding residual values to the multiplexer 55. The multiplexer 55 multiplexes the variable length code outputted by the code conversion section 52 and other additional information, and thereby generates and outputs the enhancement layer bit-stream.

Incidentally, while motion compensation is generally executed using a locally decoded image signal in ordinary MPEG-2 image coding devices, the image coding device of FIG. 1 does not have such a component. That is because local decoding is unnecessary since a decoded image (an image signal after decoding) becomes exactly the same as the original image (the original image signal before coding) in the case where the reversible discrete cosine transform is employed instead of the ordinary discrete cosine transform.

FIG. 2 is a circuit diagram showing an example of a hierarchical image decoding device for decoding the video signal (image signal) which has been coded by the hierarchical image coding device of FIG. 1. Referring to FIG. 2, the hierarchical image decoding device comprises demultiplexers 72 and 73, code conversion sections 30 and 70, an inverse quantizer (de-quantizer) 32, adders 34 and 36, a reversible discrete cosine inverse transform circuit (RDCIT) 71, and a motion compensation circuit (MC) 37.

The demultiplexer 72 demultiplexes the base layer bit-stream into the variable length code of the quantized values, the quantization scale, the macro block information, the quantization matrix and the additional information. The code conversion section 30 decodes the variable length code of the quantized values using the predetermined coding table, and thereby outputs the quantized values to the inverse quantizer 32. The. inverse quantizer 32 executes inverse quantization (de-quantization), which is specified by the quantization scale, the macro block information and the quantization matrix outputted by the demultiplexer 72, to the quantized values outputted by the code conversion section 30, and thereby obtains the inversely quantized values.

The demultiplexer 73 demultiplexes the enhancement layer bit-stream into the variable length code of the coding residual values and the additional information. The code conversion section 70 decodes the variable length code of the coding residual values using the predetermined coding table, and thereby obtains the coding residual values. The adder 34 adds the inversely quantized values outputted by the inverse quantizer 32 and the coding residual values outputted by the code conversion section 70, and outputs the added values to the reversible discrete cosine inverse transform circuit 71 as the reversible discrete cosine transform coefficients. The reversible discrete cosine inverse transform circuit 71 executes inverse transformation of the reversible discrete cosine transform to the reversible discrete cosine transform coefficients outputted by the adder 34, and thereby obtains and outputs the prediction error image signal. The adder 36 adds the prediction error image signal outputted by the reversible discrete cosine inverse transform circuit 71 and a motion compensated prediction image signal outputted by the motion compensation circuit 37, and thereby obtains and outputs a decoded image signal. The motion compensation circuit 37 executes motion compensation to the decoded image signal outputted by the adder 36 based on the macro block information outputted by the demultiplexer 72, and thereby obtains and outputs the motion compensated prediction image signal.

Meanwhile, a method for encoding the enhancement layer of MPEG-2 SNR scalability into an arithmetic code and thereby improving coding efficiency has been disclosed in D. Wilson et al., "Efficient Coding Methods for Enhancement DCT Coefficients in SNR Scalable Coders", Proceedings of PCS 97, pages 407–410 (September 1997). The method employs arithmetic coding for generating the enhancement layer bit-stream, instead of employing the variable length coding of MPEG-2.

In addition, an image coding method disclosed in Japanese Patent Application Laid-Open No.HEI4-72870 executes orthogonal transform to an image and executes arithmetic coding to transform coefficients which are obtained by the orthogonal transform. In the method, orthogonal transform coding and quantization are executed to each block of an image, and the arithmetic coding is executed to the quantized values. For the arithmetic coding, occurrence probability density functions representing the probability of occurrence of each possible value of each of the quantized values (symbols) are preliminarily prepared. In the arithmetic coding, the occurrence probability density function of a quantized value is switched or changed adaptively depending on local characteristics of the block.

However, the devices and methods described above involves the following problems or drawbacks.

In the hierarchical image coding device of FIG. 1 which employs the reversible coding method of the Japanese Patent Application Laid-Open No.HEI10-108186 and the MPEG-2 SNR scalability, actual code quantity of the enhancement layer bit-stream becomes considerably large in comparison with entropy. The large code quantity of the enhancement layer bit-stream occurs by the following reasons.

First, in high bit rate coding that is required in the reversible coding, occurrence probability distribution of each quantization residual value in the enhancement layer becomes widely different from occurrence probability distribution which has been supposed when the variable length coding of MPEG-2 was designed.

Second, the coding method employed in the variable length coding of MPEG-2, in which combination of a 0-run length (the number of successive zeros) and a level (the absolute value of the next non-zero value) is encoded, becomes inefficient at such a high bit rate. Incidentally, entropy can generally be reduced by repeating entropy coding of coding residual values with respect to each frequency index (i,j) and thereby completing entropy coding with respect to all the frequency indexes (i,j), in comparison with the case where entropy coding is executed to the combination of the 0-run length and the level. The frequency index (i,j) is an index indicating the position of a transform coefficient in a transform coefficient matrix which is obtained by reversible transform such as the reversible discrete cosine transform executed by the reversible discrete cosine transform circuit 51 of the hierarchical image coding device of FIG. 1.

Meanwhile, it is possible to improve coding efficiency by executing arithmetic coding in the enhancement layer as disclosed in the document of D. Wilson et al. However, the method employs a fixed quantization step (quantization scale) of the base layer, and thus the method can not handle cases where the quantization scale of the base layer is changed adaptively block by block.

In the method disclosed in Japanese Patent Application Laid-Open No.HEI4-72870 in which the occurrence probability density function of the quantized value is switched depending on local characteristics of the block, adequate occurrence probability density functions have to be preliminarily prepared with respect to each of the quantized values, and the occurrence probability density function has to be appropriately selected depending on characteristics of the quantization in order to realize improvement of the coding efficiency. Further, even if we tried to apply the method to the enhancement layer, the occurrence probability density function of the coding residual values widely varies depending on the quantization executed in the base layer. Therefore, it is difficult to execute adaptive switching of the occurrence probability density function in the enhancement layer and improve the coding efficiency.

SUMMARY OF THE INVENTION

It is therefore the primary object of the present invention to provide a hierarchical image coding device and a hierarchical image decoding device, by which reversible image coding with improved coding efficiency can be realized.

Another object of the present invention is to provide a hierarchical image coding method and a hierarchical image decoding method, by which reversible image coding with improved coding efficiency can be realized.

In accordance with a 1st aspect of the present invention, there is provided a hierarchical image coding device for encoding an original image signal hierarchically, comprising a first coding means, a coding residual value occurrence probability calculation means, a second coding means and a multiplexing means. The first coding means encodes the original image signal and outputs a base layer bit-stream, quantization information and coding residual values. The coding residual value occurrence probability calculation means calculates occurrence probability of each possible value of each of the coding residual values, using the quantization information. The second coding means encodes the coding residual values based on the coding residual value occurrence probabilities calculated by the coding residual value occurrence probability calculation means and thereby outputs coding residual value code. The multiplexing means multiplexes the coding residual value code and the quantization information, and thereby generates and outputs an enhancement layer bit-stream.

In accordance with a 2nd aspect of the present invention, in the 1st aspect, the coding residual values are coding residual values which occur when the first coding means executes quantization to transform coefficients which are obtained by executing reversible transform to the original image signal. The quantization information which is outputted by the first coding means and multiplexed by the multiplexing means into the enhancement layer bit-stream includes quantization scale frequency distribution and a quantization matrix. The coding residual value occurrence probability calculation means calculates the coding residual value occurrence probabilities, based on the quantization scale frequency distribution, the quantization matrix, and frequency distribution of each transform coefficient which has preliminarily been prepared. The second coding means executes variable length coding to the coding residual values based on the coding residual value occurrence probabilities, in which variable length coding of coding residual values concerning each frequency index (i,j) is repeated and thereby variable length coding concerning all the frequency indexes (i,j) is completed.

In accordance with a 3rd aspect of the present invention, in the 2nd aspect, the variable length coding executed by the second coding means is arithmetic coding.

In accordance with a 4th aspect of the present invention, in the 1st aspect, the coding residual values are coding residual values which occur when the first coding means executes quantization to transform coefficients which are obtained by executing reversible transform to the original image signal. The quantization information which is outputted by the first coding means includes quantization scale frequency distribution and a quantization matrix, and the quantization information which is multiplexed by the multiplexing means into the enhancement layer bit-stream includes the quantization scale frequency distribution. The coding residual value occurrence probability calculation means calculates the coding residual value occurrence probabilities, based on the quantization scale frequency distribution, the quantization matrix, and frequency distribution of each transform coefficient which has preliminarily been prepared. The second coding means executes variable length coding to the coding residual values based on the coding residual value occurrence probabilities, in which variable length coding of coding residual values concerning each frequency index (i,j) is repeated and thereby variable length coding concerning all the frequency indexes (i,j) is completed.

In accordance with a 5th aspect of the present invention, in the 4th aspect, the variable length coding executed by the second coding means is arithmetic coding.

In accordance with a 6th aspect of the present invention, in the 1st aspect, the first coding means includes a transform coefficient collection means. The transform coefficient collection means collects transform coefficients which are obtained by executing reversible transform to the original image signal, and thereby obtains and outputs frequency distribution of each of the transform coefficients. The coding residual value occurrence probability calculation means successively updates transform coefficient frequency distribution stored therein using the transform coefficient frequency distribution outputted by the transform coefficient collection means, and calculates the coding residual value occurrence probabilities using the updated transform coefficient frequency distribution.

In accordance with a 7th aspect of the present invention, in the 1st aspect, the first coding means includes a first image signal generation means, a second image signal generation means, a transform means, a quantization scale setting means, a quantization means, a variable length coding means, a base layer multiplexing means, an inverse quantization means, a coding residual value calculation means and a quantization scale collection means. The first image signal generation means executes motion estimation and motion compensation to the original image signal and thereby generates a motion compensated prediction image signal. The first image signal generation means further outputs macro block information. The second image signal generation means subtracts the motion compensated prediction image signal from the original image signal and thereby generates a prediction error image signal. The transform means executes reversible transform to the prediction error image signal and thereby obtains transform coefficients. The quantization scale setting means sets a quantization scale for each macro block based on the prediction error image signal. The quantization means executes quantization to the transform coefficients and thereby outputs quantized values, based on the quantization scale, a quantization matrix and the macro block information. The variable length coding means executes variable length coding to the quantized values based on the macro block information and a predetermined coding table, and thereby outputs a variable length code of the quantized values. The base layer multiplexing means multiplexes the variable length code of the quantized values, the quantization matrix, the quantization scale and the macro block information, and thereby generates and outputs the base layer bit-stream. The inverse quantization means executes inverse quantization to the quantized values based on the quantization scale, the quantization matrix and the macro block information, and thereby outputs inversely quantized values. The coding residual value calculation means subtracts the inversely quantized values from the transform coefficients, and thereby obtains the coding residual values. The quantization scale collection means collects the quantization scales at predetermined coding periods, and thereby obtains and outputs quantization scale frequency distribution. The coding residual value occurrence probability calculation means calculates the coding residual value occurrence probabilities based on the quantization scale frequency distribution outputted by the quantization scale collection means and the quantization matrix.

In accordance with an 8th aspect of the present invention, in the 7th aspect, the base layer multiplexing means outputs code quantity information of the base layer bit-stream as well as outputting the base layer bit-stream, and the quantization scale setting means sets the quantization scale for each of the macro blocks, based on the prediction error image signal and the code quantity information.

In accordance with a 9th aspect of the present invention, in the 7th aspect, the quantization scale collection means executes the collection of the quantization scales, with respect to each different block type separately, based on the macro block information, and thereby obtains and outputs quantization scale frequency distribution with respect to each of the different block types. The coding residual value occurrence probability calculation means calculates coding residual value occurrence probabilities with respect to each of the different block types separately, using the quantization scale frequency distribution with respect to each block type outputted by the quantization scale collection means. The second coding means executes the coding of the coding residual values, referring to the macro block information and using coding residual value occurrence probabilities with respect to a block type corresponding to the coding residual values to be coded.

In accordance with a 10th aspect of the present invention, in the 9th aspect, the different block types are intra blocks and non-intra blocks.

In accordance with an 11th aspect of the present invention, in the 7th aspect, the first coding means further includes a transform coefficient collection means. The transform coefficient collection means collects the transform coefficients obtained by the transform means and thereby obtains and outputs frequency distribution of each of the transform coefficients. The coding residual value occurrence probability calculation means successively updates transform coefficient frequency distribution stored therein using the transform coefficient frequency distribution outputted by the transform coefficient collection means, and calculates the coding residual value occurrence probabilities using the updated transform coefficient frequency distribution.

In accordance with a 12th aspect of the present invention, in the 11th aspect, the transform coefficient collection means executes the collection of the transform coefficients, with respect to each different block type separately, based on the macro block information, and thereby obtains and outputs transform coefficient frequency distribution with respect to each of the different block types. The coding residual value occurrence probability calculation means successively updates transform coefficient frequency distribution with respect to each of the different block types stored therein using the transform coefficient frequency distribution with respect to each of the different block types outputted by the transform coefficient collection means, and calculates coding residual value occurrence probabilities with respect to each of the different block types separately, using the. updated transform coefficient frequency distribution with respect to each of the different block types. The second coding means executes the coding of the coding residual values, referring to the macro block information and using coding residual value occurrence probabilities with respect to a block type corresponding to the coding residual values to be coded.

In accordance with a 13th aspect of the present invention, in the 12th aspect, the different block types are intra blocks and non-intra blocks.

In accordance with a 14th aspect of the present invention, in the 1st aspect, the first coding means includes a first image signal generation means, a second image signal generation means, a first transform means, a quantization scale setting means, a quantization means, a variable length coding means, a base layer multiplexing means, an inverse quantization means, a third image signal generation means, a fourth image signal generation means, a fifth image signal generation means, a sixth image signal generation means, a second transform means, a coding residual value calculation means and a quantization scale collection means. The first image signal generation means executes motion estimation between the original image signal and a locally decoded image signal, executes motion compensation to the locally decoded image signal based on the result of the motion estimation, and thereby generates a first motion compensated prediction image signal. The first image signal generation means further outputs macro block information. The second image signal generation means subtracts the first motion compensated prediction image signal from the original image signal and thereby generates a first prediction error image signal. The first transform means executes reversible transform to the first prediction error image signal and thereby obtains first transform coefficients. The quantization scale setting means sets a quantization scale for each macro block based on the first prediction error image signal. The quantization means executes quantization to the first transform coefficients and thereby outputs quantized values, based on the quantization scale, a quantization matrix and the macro block information. The variable length coding means executes variable length coding to the quantized values based on the macro block information and a predetermined coding table, and thereby outputs a variable length code of the quantized values. The base layer multiplexing means multiplexes the variable length code of the quantized values, the quantization matrix, the quantization scale and the macro block information, and thereby generates and outputs the base layer bit-stream. The inverse quantization means executes inverse quantization to the quantized values based on the quantization scale, the quantization matrix and the macro block information, and thereby outputs inversely quantized values. The third image signal generation means executes inverse transformation of the reversible transform to the inversely quantized values, and thereby generates a locally decoded prediction error image signal. The fourth image signal generation means adds the locally decoded prediction error image signal to the first motion compensated prediction image signal, and thereby generates the locally decoded image signal. The fifth image signal generation means executes motion compensation to the original image signal based on the macro block information, and thereby generates a second motion compensated prediction image signal. The sixth image signal generation means subtracts the second motion compensated prediction image signal from the original image signal, and thereby generates a second prediction error image signal. The second transform means executes the reversible transform to the second prediction error image signal and thereby obtains second transform coefficients. The coding residual value calculation means subtracts the inversely quantized values from the second transform coefficients, and thereby obtains the coding residual values. The quantization scale collection means collects the quantization scales at predetermined coding periods, and thereby obtains and outputs quantization scale frequency distribution. The coding residual value occurrence probability calculation means calculates the coding residual value occurrence probabilities based on the quantization scale frequency distribution outputted by the quantization scale collection means and the quantization matrix.

In accordance with a 15th aspect of the present invention, in the 14th aspect, the base layer multiplexing means outputs code quantity information of the base layer bit-stream as well as outputting the base layer bit-stream, and the quantization scale setting means sets the quantization scale for each of the macro blocks, based on the first prediction error image signal and the code quantity information.

In accordance with a 16th aspect of the present invention, in the 14th aspect, the quantization scale collection means executes the collection of the quantization scales, with respect to each different block type separately, based on the macro block information, and thereby obtains and outputs quantization scale frequency distribution with respect to each of the different block types. The coding residual value occurrence probability calculation means calculates coding residual value occurrence probabilities with respect to each of the different block types separately, using the quantization scale frequency distribution with respect to each block type outputted by the quantization scale collection means. The second coding means executes the coding of the coding residual values, referring to the macro block information and using coding residual value occurrence probabilities with respect to a block type corresponding to the coding residual values to be coded.

In accordance with a 17th aspect of the present invention, in the 16th aspect, the different block types are intra blocks and non-intra blocks.

In accordance with an 18th aspect of the present invention, in the 14th aspect, the first coding means further includes a transform coefficient collection means. The transform coefficient collection means collects the second transform coefficients obtained by the second transform means and thereby obtains and outputs frequency distribution of each of the second transform coefficients. The coding residual value occurrence probability calculation means successively updates transform coefficient frequency distribution stored therein using the second transform coefficient frequency distribution outputted by the transform coefficient collection means, and calculates the coding residual value occurrence probabilities using the updated transform coefficient frequency distribution.

In accordance with a 19th aspect of the present invention, in the 18th aspect, the transform coefficient collection means executes the collection of the second transform coefficients, with respect to each different block type separately, based on the macro block information, and thereby obtains and outputs transform coefficient frequency distribution with respect to each of the different block types. The coding residual value occurrence probability calculation means successively updates transform coefficient frequency distribution with respect to each of the different block types stored therein using the transform coefficient frequency distribution with respect to each of the different block types outputted by the transform coefficient collection means, and calculates coding residual value occurrence probabilities with respect to each of the different block types separately, using the updated transform coefficient frequency distribution with respect to each of the different block types. The second coding means executes the coding of the coding residual values, referring to the macro block information and using coding residual value occurrence probabilities with respect to a block type corresponding to the coding residual values to be coded.

In accordance with a 20th aspect of the present invention, in the 19th aspect, the different block types are intra blocks and non-intra blocks.

In accordance with a 21st aspect of the present invention, there is provided a hierarchical image decoding device for decoding the base layer bit-stream and the enhancement layer bit-stream which have been encoded by the hierarchical image coding device of the above aspects. The hierarchical image decoding device comprises a demultiplexing means, a coding residual value occurrence probability calculation means, a first decoding means and a second decoding means. The demultiplexing means demultiplexes the coding residual value code and the quantization information from the enhancement layer bit-stream. The coding residual value occurrence probability calculation means calculates occurrence probability of each possible value of each of the coding residual values, using the quantization information. The first decoding means decodes the coding residual value code based on the coding residual value occurrence probabilities calculated by the coding residual value occurrence probability calculation means, and thereby outputs the coding residual values. The second decoding means decodes the base layer bit-stream, adds the coding residual values to a signal obtained by decoding the base layer bit-stream, and thereby regenerates the original image signal.

In accordance with a 22nd aspect of the present invention, in the 21st aspect, the coding residual value occurrence probability calculation means calculates the coding residual value occurrence probabilities, based on quantization scale frequency distribution included in the quantization information demultiplexed from the enhancement layer bit-stream, a quantization matrix, and frequency distribution of each transform coefficient which has preliminarily been prepared. The first decoding means executes variable length decoding to the coding residual value code based on the coding residual value occurrence probabilities, in which variable length decoding of coding residual value code concerning each frequency index (i,j) is repeated and thereby variable length decoding concerning all the frequency indexes (i,j) is completed.

In accordance with a 23rd aspect of the present invention, in the 22nd aspect, the variable length decoding executed by the first decoding means is arithmetic decoding.

In accordance with a 24th aspect of the present invention, in the 21st aspect, the second decoding means includes a transform coefficient collection means. The transform coefficient collection means collects transform coefficients which are obtained by executing the decoding of the base layer bit-stream and adding the coding residual values to the decoding result, and thereby obtains and outputs frequency distribution of each of the transform coefficients. The coding residual value occurrence probability calculation means successively updates transform coefficient frequency distribution stored therein using the transform coefficient frequency distribution outputted by the transform coefficient collection means, and calculates the coding residual value occurrence probabilities using the updated transform coefficient frequency distribution.

In accordance with a 25th aspect of the present invention, in the 21st aspect, the second decoding means includes a base layer demultiplexing means, a variable length decoding means, an inverse quantization means, a transform coefficient calculation means, a first image signal regeneration means, a second image signal regeneration means and a third image signal regeneration means. The base layer demultiplexing means demultiplexes the variable length code of the quantized values, the quantization matrix, the quantization scale and the macro block information from the base layer bit-stream. The variable length decoding means executes variable length decoding to the variable length code of the quantized values based on the macro block information and a predetermined coding table, and thereby outputs the quantized values. The inverse quantization means executes inverse quantization to the quantized values based on the quantization matrix, the quantization scale and the macro block information, and thereby outputs the inversely quantized values. The transform coefficient calculation means adds the coding residual values outputted by the first decoding means and the inversely quantized values outputted by the inverse quantization means, and thereby outputs the transform coefficients. The first image signal regeneration means executes inverse transformation of the reversible transform that has been executed in the hierarchical image coding device to the transform coefficients, and thereby regenerates the prediction error image signal. The second image signal regeneration means adds the prediction error image signal to a motion compensated prediction image signal, and thereby generates a decoded image signal. The third image signal regeneration means executes motion compensation to the decoded image signal based on the macro block information, and thereby generates the motion compensated prediction image signal.

In accordance with a 26th aspect of the present invention, in the 25th aspect, the quantization information demultiplexed from the enhancement layer bit-stream by the demultiplexing means includes quantization scale frequency distribution with respect to each different block type. The coding residual value occurrence probability calculation means calculates coding residual value occurrence probabilities with respect to each of the different block types separately, using the quantization scale frequency distribution with respect to each block type. The first decoding means executes the decoding of the coding residual value code, referring to the macro block information and using coding residual value occurrence probabilities with respect to a block type corresponding to the coding residual value code to be decoded.

In accordance with a 27th aspect of the present invention, in the 26th aspect, the different block types are intra blocks and non-intra blocks.

In accordance with a 28th aspect of the present invention, in the 25th aspect, the second decoding means further includes a transform coefficient collection means. The transform coefficient collection means collects transform coefficients which are obtained by executing the decoding of the base layer bit-stream and adding the coding residual values to the decoding result, and thereby obtains and outputs frequency distribution of each of the transform coefficients. The coding residual value occurrence probability calculation means successively updates transform coefficient frequency distribution stored therein using the transform coefficient frequency distribution outputted by the transform coefficient collection means, and calculates the coding residual value occurrence probabilities using the updated transform coefficient frequency distribution.

In accordance with a 29th aspect of the present invention, in the 28th aspect, the transform coefficient collection means executes the collection of the transform coefficients, with respect to each different block type separately, based on the macro block information, and thereby obtains and outputs transform coefficient frequency distribution with respect to each of the different block types. The coding residual value occurrence probability calculation means successively updates transform coefficient frequency distribution with respect to each of the different block types stored therein using the transform coefficient frequency distribution with respect to each of the different block types outputted by the transform coefficient collection means, and calculates coding residual value occurrence probabilities with respect to each of the different block types separately, using the updated transform coefficient frequency distribution with respect to each of the different block types. The first decoding means executes the decoding of the coding residual value code, referring to the macro block information and using coding residual value occurrence probabilities with respect to a block type corresponding to the coding residual value code to be decoded.

In accordance with a 30th aspect of the present invention, in the 29th aspect, the different block types are intra blocks and non-intra blocks.

In accordance with a 31st aspect of the present invention, there is provided a hierarchical image coding method for encoding an original image signal hierarchically, comprising a first coding step, a coding residual value occurrence probability calculation step, a second coding step and a multiplexing step. In the first coding step, the original image signal is encoded and thereby a base layer bit-stream, quantization information and coding residual values are generated. In the coding residual value occurrence probability calculation step, occurrence probability of each possible value of each of the coding residual values is calculated using the quantization information. In the second coding step, the coding residual values are encoded based on the coding residual value occurrence probabilities calculated in the coding residual value occurrence probability calculation step and thereby coding residual value code is generated. In the multiplexing step, the coding residual value code and the quantization information are multiplexed and thereby an enhancement layer bit-stream is generated.

In accordance with a 32nd aspect of the present invention, in the 31st aspect, the coding residual values are coding residual values which occur in the first coding step when quantization is executed to transform coefficients which are obtained by executing reversible transform to the original image signal. The quantization information which is generated in the first coding step and multiplexed into the enhancement layer bit-stream in the multiplexing step includes quantization scale frequency distribution and a quantization matrix. In the coding residual value occurrence probability calculation step, the coding residual value occurrence probabilities are calculated based on the quantization scale frequency distribution, the quantization matrix, and frequency distribution of each transform coefficient which has preliminarily been prepared. In the second coding step, variable length coding is executed to the coding residual values based on the coding residual value occurrence probabilities, in which variable length coding of coding residual values concerning each frequency index (i,j) is repeated and thereby variable length coding concerning all the frequency indexes (i,j) is completed.

In accordance with a 33rd aspect of the present invention, in the 32nd aspect, the variable length coding executed in the second coding step is arithmetic coding.

In accordance with a 34th aspect of the present invention, in the 31st aspect, the coding residual values are coding residual values which occur in the first coding step when quantization is executed to transform coefficients which are obtained by executing reversible transform to the original image signal. The quantization information which is generated in the first coding step includes quantization scale frequency distribution and a quantization matrix, and the quantization information which is multiplexed into the enhancement layer bit-stream in the multiplexing step includes the quantization scale frequency distribution. In the coding residual value occurrence probability calculation step, the coding residual value occurrence probabilities are calculated based on the quantization scale frequency distribution, the quantization matrix, and frequency distribution of each transform coefficient which has preliminarily been prepared. In the second coding step, variable length coding is executed to the coding residual values based on the coding residual value occurrence probabilities, in which variable length coding of coding residual values concerning each frequency index (i,j) is repeated and thereby variable length coding concerning all the frequency indexes (i,j) is completed.

In accordance with a 35th aspect of the present invention, in the 34th aspect, the variable length coding executed in the second coding step is arithmetic coding.

In accordance with a 36th aspect of the present invention, in the 31st aspect, the first coding step includes a transform coefficient collection step. In the transform coefficient collection step, transform coefficients which are obtained by executing reversible transform to the original image signal are collected, and thereby frequency distribution of each of the transform coefficients is obtained. In the coding residual value occurrence probability calculation step, transform coefficient frequency distribution successively updated by the transform coefficient frequency distribution obtained by the transform coefficient collection step is used for calculating the coding residual value occurrence probabilities.

In accordance with a 37th aspect of the present invention, in the 31st aspect, the first coding step includes a first image signal generation step, a second image signal generation step, a transform step, a quantization scale setting step, a quantization step, a variable length coding step, a base layer multiplexing step, an inverse quantization step, a coding residual value calculation step and a quantization scale collection step. In the first image signal generation step, motion estimation and motion compensation are executed to the original image signal and thereby a motion compensated prediction image signal is generated and macro block information is obtained. In the second image signal generation step, the motion compensated prediction image signal is subtracted from the original image signal and thereby a prediction error image signal is generated. In the transform step, reversible transform is executed to the prediction error image signal and thereby transform coefficients are obtained. In the quantization scale setting step, a quantization scale is set for each macro block based on the prediction error image signal. In the quantization step, quantization is executed to the transform coefficients based on the quantization scale, a quantization matrix and the macro block information, and thereby quantized values are obtained. In the variable length coding step, variable length coding is executed to the quantized values based on the macro block information and a predetermined coding table, and thereby a variable length code of the quantized values is obtained. In the base layer multiplexing step, the variable length code of the quantized values, the quantization matrix, the quantization scale and the macro block information are multiplexed, and thereby the base layer bit-stream is generated. In the inverse quantization step, inverse quantization is executed to the quantized values based on the quantization scale, the quantization matrix and the macro block information, and thereby inversely quantized values are obtained. In the coding residual value calculation step, the inversely quantized values are subtracted from the transform coefficients, and thereby the coding residual values are obtained. In the quantization scale collection step, the quantization scales are collected at predetermined coding periods, and thereby quantization scale frequency distribution is obtained, In the coding residual value occurrence probability calculation step, the coding residual value occurrence probabilities are calculated based on the quantization scale frequency distribution obtained in the quantization scale collection step and the quantization matrix.

In accordance with a 38th aspect of the present invention, in the 37th aspect, code quantity information of the base layer bit-stream is obtained as well as generating the base layer bit-stream in the base layer multiplexing step. In the quantization scale setting step, the quantization scale is set for each of the macro blocks, based on the prediction error image signal and the code quantity information.

In accordance with a 39th aspect of the present invention, in the 37th aspect, the collection of the quantization scales is executed with respect to each different block type separately, based on the macro block information, and thereby quantization scale frequency distribution with respect to each of the different block types are obtained in the quantization scale collection step. In the coding residual value occurrence probability calculation step, coding residual value occurrence probabilities with respect to each of the different block types are calculated separately, using the quantization scale frequency distribution with respect to each block type obtained in the quantization scale collection step. In the second coding step, the coding of the coding residual values is executed, referring to the macro block information and using coding residual value occurrence probabilities with respect to a block type corresponding to the coding residual values to be coded.

In accordance with a 40th aspect of the present invention, in the 39th aspect, the different block types are intra blocks and non-intra blocks.

In accordance with a 41st aspect of the present invention, in the 37th aspect, the first coding step further includes a transform coefficient collection step. In the transform coefficient collection step, the transform coefficients obtained in the transform step are collected and thereby frequency distribution of each of the transform coefficients is obtained. In the coding residual value occurrence probability calculation step, transform coefficient frequency distribution successively updated by the transform coefficient frequency distribution obtained by the transform coefficient collection step is used for calculating the coding residual value occurrence probabilities.

In accordance with a 42nd aspect of the present invention, in the 41st aspect, the collection of the transform coefficients is executed with respect to each different block type separately, based on the macro block information, and thereby transform coefficient frequency distribution with respect to each of the different block types is obtained in the transform coefficient collection step. In the coding residual value occurrence probability calculation step, coding residual value occurrence probabilities with respect to each of the different block types are calculated separately, using transform coefficient frequency distribution with respect to each of the different block types successively updated by the transform coefficient frequency distribution with respect to each of the different block types obtained by the transform coefficient collection step. In the second coding step, the coding of the coding residual values is executed, referring to the macro block information and using coding residual value occurrence probabilities with respect to a block type corresponding to the coding residual values to be coded.

In accordance with a 43rd aspect of the present invention, in the 42nd aspect, the different block types are intra blocks and non-intra blocks.

In accordance with a 44th aspect of the present invention, in the 31st aspect, the first coding step includes a first image signal generation step, a second image signal generation step, a first transform step, a quantization scale setting step, a quantization step, a variable length coding step, a base layer multiplexing step, an inverse quantization step, a third image signal generation step, a fourth image signal generation step, a fifth image signal generation step, a sixth image signal generation step, a second transform step, a coding residual value calculation step and a quantization scale collection step. In the a first image signal generation step, motion estimation is executed between the original image signal and a locally decoded image signal, motion compensation is executed to the locally decoded image signal based on the result of the motion estimation, and thereby a first motion compensated prediction image signal is generated, and macro block information is obtained. In the second image signal generation step, the first motion compensated prediction image signal is subtracted from the original image signal and thereby a first prediction error image signal is generated. In the first transform step, reversible transform is executed to the first prediction error image signal and thereby first transform coefficients are obtained. In the quantization scale setting step, a quantization scale is set for each macro block based on the first prediction error image signal. In the quantization step, quantization is executed to the first transform coefficients based on the quantization scale, a quantization matrix and the macro block information, and thereby quantized values are obtained. In the variable length coding step, variable length coding is executed to the quantized values based on the macro block information and a predetermined coding table, and thereby a variable length code of the quantized values is generated. In the base layer multiplexing step, the variable length code of the quantized values, the quantization matrix, the quantization scale and the macro block information are multiplexed, and thereby the base layer bit-stream is generated. In the inverse quantization step, inverse quantization is executed to the quantized values based on the quantization scale, the quantization matrix and the macro block information, and thereby inversely quantized values are obtained. In the third image signal generation step, inverse transformation of the reversible transform is executed to the inversely quantized values, and thereby a locally decoded prediction error image signal is generated. In the fourth image signal generation step, the locally decoded prediction error image signal is added to the first motion compensated prediction image signal, and thereby the locally decoded image signal is generated. In the fifth image signal generation step, motion compensation is executed to the original image signal based on the macro block information, and thereby a second motion compensated prediction image signal is generated. In the sixth image signal generation step, the second motion compensated prediction image signal is subtracted from the original image signal, and thereby a second prediction error image signal is generated. In the second transform step, the reversible transform is executed to the second prediction error image signal and thereby second transform coefficients are obtained. In the coding residual value calculation step, the inversely quantized values are subtracted from the second transform coefficients, and thereby the coding residual values are obtained. In the quantization scale collection step, the quantization scales are collected at predetermined coding periods, and thereby quantization scale frequency distribution is obtained. In the coding residual value occurrence probability calculation step, the coding residual value occurrence probabilities are calculated based on the quantization scale frequency distribution obtained in the quantization scale collection step and the quantization matrix.

In accordance with a 45th aspect of the present invention, in the 44th aspect, code quantity information of the base layer bit-stream is obtained as well as generating the base layer bit-stream in the base layer multiplexing step. In the quantization scale setting step, the quantization scale is set for each of the macro blocks, based on the first prediction error image signal and the code quantity information.

In accordance with a 46th aspect of the present invention, in the 44th aspect, the collection of the quantization scales is executed with respect to each different block type separately, based on the macro block information, and thereby quantization scale frequency distribution with respect to each of the different block types is obtained in the quantization scale collection step. In the coding residual value occurrence probability calculation step, coding residual value occurrence probabilities with respect to each of the different block types are calculated separately, using the quantization scale frequency distribution with respect to each block type obtained in the quantization scale collection step. In the second coding step, the coding of the coding residual values is executed, referring to the macro block information and using coding residual value occurrence probabilities with respect to a block type corresponding to the coding residual values to be coded.

In accordance with a 47th aspect of the present invention, in the 46th aspect, the different block types are intra blocks and non-intra blocks.

In accordance with a 48th aspect of the present invention, in the 44th aspect, the first coding step further includes a transform coefficient collection step. In the transform coefficient collection step, the second transform coefficients obtained in the second transform step are collected and thereby frequency distribution of each of the second transform coefficients is obtained. In the coding residual value occurrence probability calculation step, transform coefficient frequency distribution successively updated by the second transform coefficient frequency distribution obtained by the transform coefficient collection step is used for calculating the coding residual value occurrence probabilities.

In accordance with a 49th aspect of the present invention, in the 48th aspect, the collection of the second transform coefficients is executed with respect to each different block type separately, based on the macro block information, and thereby transform coefficient frequency distribution with respect to each of the different block types is obtained in the transform coefficient collection step. In the coding residual value occurrence probability calculation step, coding residual value occurrence probabilities with respect to each of the different block types are calculated separately, using transform coefficient frequency distribution with respect to each of the different block types successively updated by the transform coefficient frequency distribution with respect to each of the different block types obtained by the transform coefficient collection step. In the second coding step, the coding of the coding residual values is executed, referring to the macro block information and using coding residual value occurrence probabilities with respect to a block type corresponding to the coding residual values to be coded.

In accordance with a 50th aspect of the present invention, in the 49th aspect, the different block types are intra blocks and non-intra blocks.

In accordance with a 51st aspect of the present invention, there is provided a hierarchical image decoding method for decoding the base layer bit-stream and the enhancement layer bit-stream which have been encoded by the hierarchical image coding method of the above aspects, comprising a demultiplexing step, a coding residual value occurrence probability calculation step, a first decoding step and a second decoding step. In the demultiplexing step, the coding residual value code and the quantization information are demultiplexed from the enhancement layer bit-stream. In the coding residual value occurrence probability calculation step, occurrence probability of each possible value of each of the coding residual values is calculated using the quantization information. In the first decoding step, the coding residual value code is decoded based on the coding residual value occurrence probabilities calculated in the coding residual value occurrence probability calculation step, and thereby the coding residual values are obtained. In the second decoding step, the base layer bit-stream is decoded, the coding residual values are added to a signal obtained by decoding the base layer bit-stream, and thereby the original image signal is regenerated.

In accordance with a 52nd aspect of the present invention, in the coding residual value occurrence probability calculation step of the 51st aspect, the coding residual value occurrence probabilities are calculated based on quantization scale frequency distribution included in the quantization information demultiplexed from the enhancement layer bit-stream, a quantization matrix, and frequency distribution of each transform coefficient which has preliminarily been prepared. In the first decoding step, variable length decoding is executed to the coding residual value code based on the coding residual value occurrence probabilities, in which variable length decoding of coding residual value code concerning each frequency index (i,j) is repeated and thereby variable length decoding concerning all the frequency indexes (i,j) is completed.

In accordance with a 53rd aspect of the present invention, in the 52nd aspect, the variable length decoding executed in the first decoding step is arithmetic decoding.

In accordance with a 54th aspect of the present invention, in the 51st aspect, the second decoding step includes a transform coefficient collection step. In the transform coefficient collection step, transform coefficients which are obtained by executing the decoding of the base layer bit-stream and adding the coding residual values to the decoding result is collected and thereby frequency distribution of each of the transform coefficients is obtained. In the coding residual value occurrence probability calculation step, transform coefficient frequency distribution successively updated by the transform coefficient frequency distribution obtained by the transform coefficient collection step is used for calculating the coding residual value occurrence probabilities.

In accordance with a 55th aspect of the present invention, in the 51st aspect, the second decoding step includes a base layer demultiplexing step, a variable length decoding step, an inverse quantization step, a transform coefficient calculation step, a first image signal regeneration step, a second image signal regeneration step and a third image signal regeneration step. In the base layer demultiplexing step, the variable length code of the quantized values, the quantization matrix, the quantization scale and the macro block information are demultiplexed from the base layer bit-stream. In the variable length decoding step, variable length decoding is executed to the variable length code of the quantized values based on the macro block information and a predetermined coding table, and thereby the quantized values are obtained. In the inverse quantization step, inverse quantization is executed to the quantized values based on the quantization matrix, the quantization scale and the macro block information, and thereby the inversely quantized values are obtained. In the transform coefficient calculation step, the coding residual values obtained in the first decoding step and the inversely quantized values obtained in the inverse quantization step are added, and thereby the transform coefficients are obtained. In the first image signal regeneration step, inverse transformation of the reversible transform that has been executed in the hierarchical image coding method is executed to the transform coefficients, and thereby the prediction error image signal is regenerated. In the second image signal regeneration step, the prediction error image signal is added to a motion compensated prediction image signal, and thereby a decoded image signal is generated. In the third image signal regeneration step, motion compensation is executed to the decoded image signal based on the macro block information, and thereby the motion compensated prediction image signal is generated.

In accordance with a 56th aspect of the present invention, in the 55th aspect, the quantization information demultiplexed from the enhancement layer bit-stream in the demultiplexing step includes quantization scale frequency distribution with respect to each different block type. In the coding residual value occurrence probability calculation step, coding residual value occurrence probabilities with respect to each of the different block types are calculated separately, using the quantization scale frequency distribution with respect to each block type. In the first decoding step, the decoding of the coding residual value code is executed, referring to the macro block information and using coding residual value occurrence probabilities with respect to a block type corresponding to the coding residual value code to be decoded.

In accordance with a 57th aspect of the present invention, in the 56th aspect, the different block types are intra blocks and non-intra blocks.

In accordance with a 58th aspect of the present invention, in the 55th aspect, the second decoding step further includes a transform coefficient collection step. In the transform coefficient collection step, transform coefficients which are obtained by executing the decoding of the base layer bit-stream and adding the coding residual values to the decoding result are collected and thereby frequency distribution of each of the transform coefficients is obtained. In the coding residual value occurrence probability calculation step, transform coefficient frequency distribution successively updated by the transform coefficient frequency distribution obtained by the transform coefficient collection step is used for calculating the coding residual value occurrence probabilities.

In accordance with a 59th aspect of the present invention, in the 58th aspect, the collection of the transform coefficients is executed with respect to each different block type separately, based on the macro block information, and thereby transform coefficient frequency distribution with respect to each of the different block types is obtained in the transform coefficient collection step. In the coding residual value occurrence probability calculation step, coding residual value occurrence probabilities with respect to each of the different block types are calculated separately, using transform coefficient frequency distribution with respect to each of the different block types successively updated by the transform coefficient frequency distribution with respect to each of the different block types obtained by the transform coefficient collection step. In the first decoding step, the decoding of the coding residual value code is executed, referring to the macro block information and using coding residual value occurrence probabilities with respect to a block type corresponding to the coding residual value code to be decoded.

In accordance with a 60th aspect of the present invention, in the 59th aspect, the different block types are intra blocks and non-intra blocks.

BRIEF DESCRIPTION OF THE DRAWINGS

The objects and features of the present invention will become more apparent from the consideration of the following detailed description taken in conjunction with the accompanying drawings, in which:

FIG. 15 is a circuit diagram showing a hierarchical image decoding device according to an eighth embodiment of the present invention;

FIG. 24 is a circuit diagram showing a hierarchical image decoding device according to a sixteenth embodiment of the present invention;

DESCRIPTION OF THE PREFERRED EMBODIMENTS

Figure 1:
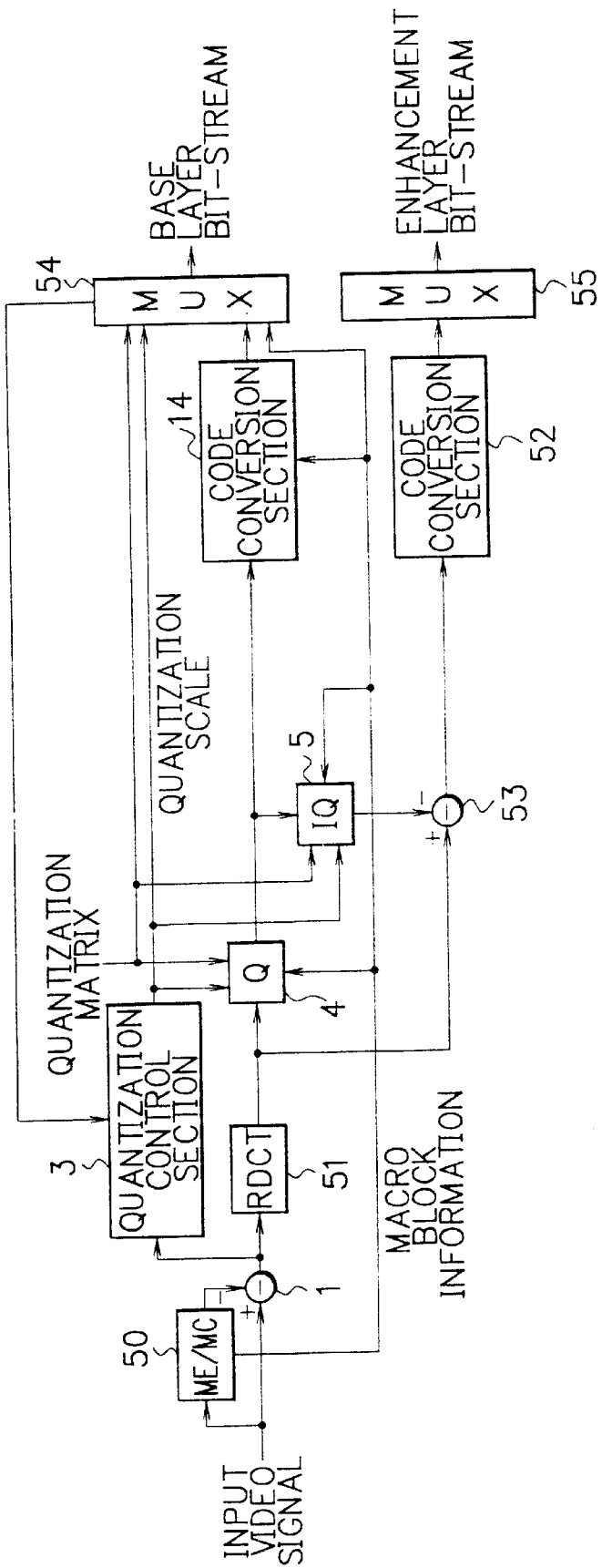
FIG. 1 is a circuit diagram showing an example of a hierarchical image coding device which is realized by employing a reversible hierarchical coding method and reversible discrete cosine transform proposed by the present inventors.

Referring now to the drawings, a description will be given in detail of preferred embodiments in accordance with the present invention.

[Embodiment 1]

Figure 3:
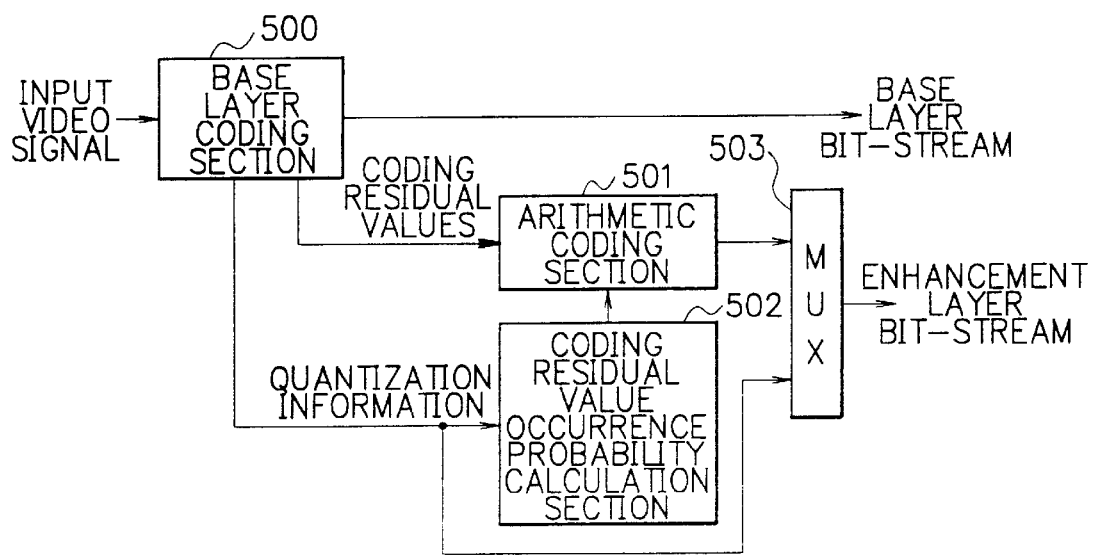
FIG. 3 is a circuit diagram showing a hierarchical image coding device according to a first embodiment of the present invention.

FIG. 3 is a circuit diagram showing a hierarchical image coding device according to a first embodiment of the present invention.

Referring to FIG. 3, the hierarchical image coding device comprises a base layer coding section 500, an arithmetic coding section 501, a coding residual value occurrence probability calculation section 502, and a multiplexer 503.

The base layer coding section 500 encodes an input video signal (an original image signal), and thereby generates and outputs a base layer bit-stream. At the same time, the base layer coding section 500 also outputs coding residual values and quantization information. The coding residual value occurrence probability calculation section 502 calculates and outputs occurrence probability of each possible value of each of the coding residual values, based on the quantization information outputted by the base layer coding section 500. Incidentally, the coding residual values outputted by the base layer coding section 500 are generally integers. The arithmetic coding section 501 executes arithmetic coding (variable length coding) to the coding residual values outputted by the base layer coding section 500 based on the coding residual value occurrence probabilities outputted by the coding residual value occurrence probability calculation section 502, and outputs the result to the multiplexer 503 as a coding residual value arithmetic code. The multiplexer 503 multiplexes the coding residual value arithmetic code outputted by the arithmetic coding section 501, the quantization information outputted by the base layer coding section 500 and other additional information, and thereby generates and outputs an enhancement layer bit-stream.

The components of the hierarchical image coding device of FIG. 3 are realized by, for example, one or more microprocessor units which are composed of one or more CPUs (Central Processing Units), ROM (Read Only Memory), RAM (Random Access Memory), etc. It is also possible to realize the components of the hierarchical image coding device of FIG. 3 by software on a computer.

In the following, the operation of the hierarchical image coding device of FIG. 3 will be described in detail.

The input video signal (here, the term "input video signal" can also mean a signal which is obtained by transforming an input video signal) is supplied to the base layer coding section 500 and irreversible image coding is executed by the base layer coding section 500, thereby the base layer bit-stream is generated and outputted. In the irreversible image coding, a procedure for decreasing information quantity (such as quantization) is executed to the input video signal. Therefore, loss of information occurs in the irreversible image coding. The coding residual values are the loss which occurred in the irreversible image coding of the input video signal. The quantization information is information (values, matrixes, etc.) which indicates the procedure (such as quantization) for decreasing information quantity. The base layer bit-stream, the coding residual values and the quantization information are outputted by the base layer coding section 500.

The quantization information outputted by the base layer coding section 500 is supplied to the coding residual value occurrence probability calculation section 502. Data concerning statistical values of video signals is preliminarily stored in the coding residual value occurrence probability calculation section 502. The coding residual value occurrence probability calculation section 502 calculates and outputs occurrence probability of each possible value of each of the coding residual values outputted by the base layer coding section 500, based on the statistical values and the quantization information.

The coding residual values outputted by the base layer coding section 500 is supplied to the arithmetic coding section 501. The arithmetic coding section 501 executes arithmetic coding (variable length coding (entropy coding)) to the coding residual values, based on the coding residual value occurrence probabilities outputted by the coding residual value occurrence probability calculation section 502. The result of the arithmetic coding is outputted as the coding residual value arithmetic code.

The coding residual value arithmetic code outputted by the arithmetic coding section 501 and the quantization information outputted by the base layer coding section 500 are supplied to the multiplexer 503. The multiplexer 503 has a buffer for temporarily storing various types of data supplied thereto. The multiplexer 503 multiplexes the data according to a predetermined multiplexing order and outputs the multiplexed data as the enhancement layer bit-stream.

As described above, in the hierarchical image coding device according to the first embodiment of the present invention, the occurrence probability of each possible value of each of the coding residual values is calculated based on the quantization information obtained in the base layer coding, and the arithmetic coding of the coding residual values is executed adaptively using the coding residual value occurrence probabilities. Therefore, coding efficiency of the enhancement layer bit-stream is improved in comparison with the hierarchical image coding device which has been shown in FIG. 1, and thereby total code quantity can be decreased. Incidentally, while the image coding method of Japanese Patent Application Laid-Open No.HEI4-72870 required inclusive preparation of adequate occurrence probability density functions with respect to each of the quantized values, the hierarchical image coding device of the first embodiment does not require preparation of coding residual value occurrence probability functions, and the coding residual value occurrence probabilities are calculated by the coding residual value occurrence probability calculation section 502 based on the statistical values and the quantization information which has been generated according to the actually executed quantization.

[Embodiment 2]

Figure 4:
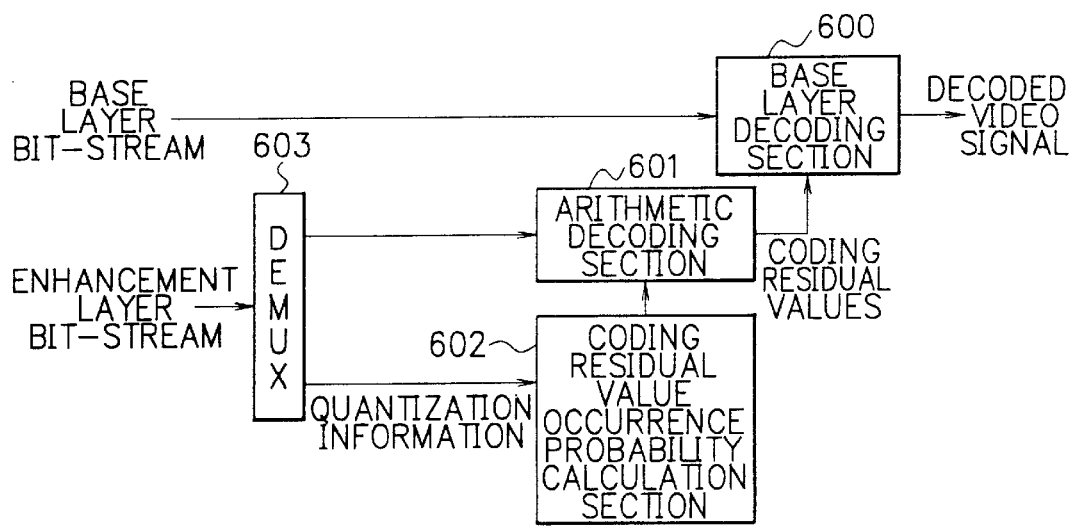
FIG. 4 is a circuit diagram showing a hierarchical image decoding device according to a second embodiment of the present invention.

FIG. 4 is a circuit diagram showing a hierarchical image decoding device according to a second embodiment of the present invention. The hierarchical image decoding device of FIG. 4 is a device for decoding the video signal (the base layer bit-stream and the enhancement layer bit-stream) which has been coded by the hierarchical image coding device of the above first embodiment.

Referring to FIG. 4, the hierarchical image decoding device comprises a base layer decoding section 600, an arithmetic decoding section 601, a coding residual value occurrence probability calculation section 602 and a demultiplexer 603.

The demultiplexer 603 demultiplexes the enhancement layer bit-stream into coding residual value arithmetic code, the quantization information and other additional information. The coding residual value arithmetic code is supplied to the arithmetic decoding section 601, and the quantization information is supplied to the coding residual value occurrence probability calculation section 602. The coding residual value occurrence probability calculation section 602 calculates and outputs occurrence probability of each possible value of each of the coding residual values based on the quantization information supplied from the demultiplexer 603. The arithmetic decoding section 601 executes arithmetic decoding to the coding residual value arithmetic code supplied from the demultiplexer 603 based on the coding residual value occurrence probabilities outputted by the coding residual value occurrence probability calculation section 602, and outputs the result of the arithmetic decoding (i.e. the coding residual values) to the base layer decoding section 600. The base layer decoding section 600 executes decoding and regenerates the original image signal using the base layer bit-stream outputted by the hierarchical image coding device of FIG. 3 and the coding residual values supplied from the arithmetic decoding section 601, and outputs the decoded video signal (the original image signal).

The components of the hierarchical image decoding device of FIG. 4 are realized by, for example, one or more microprocessor units which are composed of one or more CPUs (Central Processing Units), ROM (Read Only Memory), RAM (Random Access Memory), etc. It is also possible to realize the components by software on a computer.

In the following, the operation of the hierarchical image decoding device of FIG. 4 will be described in detail.

The enhancement layer bit-stream outputted by the hierarchical image coding device of FIG. 3 is inputted to the demultiplexer 603. The enhancement layer bit-stream is demultiplexed by the demultiplexer 603 into the coding residual value arithmetic code, the quantization information and the additional information. The coding residual value arithmetic code, the quantization information and the additional information demultiplexed by the demultiplexer 603 are temporarily stored in a buffer of the demultiplexer 603. Incidentally, if the demultiplexing (discrimination between the coding residual value arithmetic code, the quantization information and other additional information) by the demultiplexer 603 is impossible without the arithmetic decoding by the arithmetic decoding section 601, it is also possible to combine the demultiplexer 603 and the arithmetic decoding section 601 together so that the demultiplexing and the arithmetic decoding will be executed simultaneously. Subsequently, the quantization information is supplied to the coding residual value occurrence probability calculation section 602 to be used for calculating the coding residual value occurrence probabilities.

Data concerning statistical values of video signals (the same data as that stored in the coding residual value occurrence probability calculation section 502 shown in FIG. 3) is preliminarily stored in the coding residual value occurrence probability calculation section 602. The coding residual value occurrence probability calculation section 602 calculates and outputs occurrence probability of each possible value of each of the coding residual values, based on the statistical values and the quantization information, in the same way as the coding residual value occurrence probability calculation section 502.

The arithmetic decoding section 601 receives the coding residual value arithmetic code from the demultiplexer 603 and executes arithmetic decoding to the coding residual value arithmetic code, based on the coding residual value occurrence probabilities supplied from the coding residual value occurrence probability calculation section 602. The arithmetic decoding section 601 outputs the result (the coding residual values) to the base layer decoding section 600.

On the other hand, the base layer bit-stream outputted by the base layer coding section 500 of the hierarchical image coding device of FIG. 3 is inputted to the base layer decoding section 600. The base layer decoding section 600 executes decoding (corresponding to the coding that has been executed by the base layer coding section 500) to the base layer bit-stream. The base layer decoding section 600 generates a decoded video signal using the signal obtained by the decoding of the base layer bit-stream and the coding residual values supplied from the arithmetic decoding section 601, and the decoded video signal (the original image signal) is outputted.

As described above, in the hierarchical image decoding device according to the second embodiment of the present invention, The video signal (the base layer bit-stream and the enhancement layer bit-stream) coded by the hierarchical image coding device of FIG. 3 is decoded losslessly into the original image signal (the input video signal).

The coding residual value occurrence probability calculation sections 502 in the hierarchical image coding device and the coding residual value occurrence probability calculation section 602 in the hierarchical image decoding device preliminarily store the same data concerning statistical values of video signals, and the quantization information indicating the quantization executed by the base layer coding section 500 is sent to the coding residual value occurrence probability calculation section 602 to be used for calculating the coding residual value occurrence probabilities. Therefore, the coding residual value occurrence probabilities outputted by the coding residual value occurrence probability calculation section 602 become the same as the coding residual value occurrence probabilities which have been outputted by the coding residual value occurrence probability calculation section 502. Thus, the coding residual values outputted by the arithmetic decoding section 601 become the same as the coding residual values which have been inputted to the arithmetic coding section 501. Consequently, the decoded video signal outputted by the base layer decoding section 600 becomes the same as the input video signal which has been inputted to the base layer coding section 500. Thereby, the perfectly reversible coding-decoding is realized by the hierarchical image coding device of FIG. 3 and the hierarchical image decoding device of FIG. 4.

[Embodiment 3]

Figure 5:
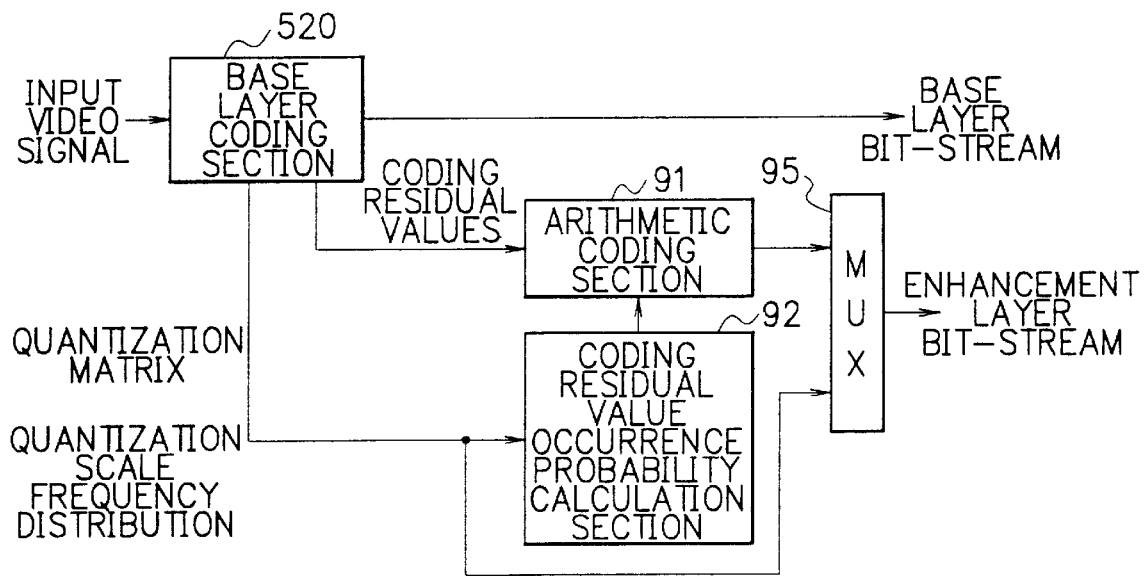
FIG. 5 is a circuit diagram showing a hierarchical image coding device according to a third embodiment of the present invention.

FIG. 5 is a circuit diagram showing a hierarchical image coding device according to a third embodiment of the present invention.

Referring to FIG. 5, the hierarchical image coding device of the third embodiment comprises a base layer coding section 520, an arithmetic coding section 91, a coding residual value occurrence probability calculation section 92, and a multiplexer 95.

The base layer coding section 520 encodes an input video signal (the original image signal), and thereby generates and outputs a base layer bit-stream. At the same time, the base layer coding section 520 also outputs coding residual values, a quantization matrix and frequency distribution of the quantization scale. The quantization matrix and the quantization scale frequency distribution is outputted by the base layer coding section 520 as the quantization information. The coding residual value occurrence probability calculation section 92 calculates and outputs occurrence probability of each possible value of each of the coding residual values, based on the quantization matrix and the quantization scale frequency distribution outputted by the base layer coding section 520. The arithmetic coding section 91 executes arithmetic coding to quantization residual values (the coding residual values) outputted by the base layer coding section 520 based on the coding residual value occurrence probabilities outputted by the coding residual value occurrence probability calculation section 92, and outputs the result to the multiplexer 95 as a coding residual value arithmetic code. The multiplexer 95 multiplexes the coding residual value arithmetic code outputted by the arithmetic coding section 91, the quantization information (the quantization matrix and the quantization scale frequency distribution) outputted by the base layer coding section 520 and other additional information, and thereby generates and outputs an enhancement layer bit-stream.

In the following, the operation of the hierarchical image coding device of FIG. 5 will be described in detail.

An input video signal is supplied to the base layer coding section 520. In the base layer coding section 520, an image of the input video signal is partitioned into small domains (blocks etc.). Subsequently, reversible transform (obtaining prediction error image signal, for example) is executed and reversible transform which is used in reversible transform coding (such as reversible discrete cosine transform, reversible Hadamard transform, reversible wavelet transform, etc.) is executed to each of the small domains. For example, in the case where the image of the input video signal is partitioned into blocks (each of which is composed of 8×8 pixels, for example) and the above reversible transform is executed to a block, a matrix composed of 8×8 transform coefficients (an 8×8 transform coefficient matrix) is obtained. In order to indicate (specify) a transform coefficient in the transform coefficient matrix, a frequency index (i,j) is generally used. The frequency index (i,j) indicates the position (i,j) of a transform coefficient in the transform coefficient matrix. In the above case where the transform coefficient matrix is an 8×8 matrix, there are 8×8 frequency indexes (i,j).

The transform coefficients obtained by the above transform are quantized according to quantization that is specified by a quantization matrix and a quantization scale. In the above case where there are 8×8 transform coefficients (8×8 frequency indexes (i,j)), the quantization matrix is given as an 8×8 matrix, having 8×8 quantization matrix elements corresponding to each of the frequency indexes (i,j). The quantization scale is specified for each of the small domains (blocks) for controlling the roughness of the quantization. Incidentally, while terms "quantization matrix" and "quantization scale" will hereafter be used, any other equivalent parameters having the same functions can also be regarded as the "quantization matrix" and "quantization scale". In addition, the above quantization can also be executed without using the quantization matrix (with the quantization scale only). In such cases, a matrix whose matrix elements are the same (a constant) is used as the quantization matrix.

The above quantized values of the transform coefficients are encoded by means of entropy coding (such as Huffman coding, arithmetic coding, etc.). The coded quantized values are multiplexed together with additional information and outputted as the base layer bit-stream.

Meanwhile, the quantized values of the transform coefficients are inversely quantized (de-quantized) and thereby inversely quantized values are obtained. The inversely quantized values are subtracted from the values (i.e. transform coefficients) before quantization, and the results of the subtraction are outputted to the arithmetic coding section 91 as the coding residual values (quantization residual values). As for the quantization scale, frequency distribution of the quantization scale is figured out at predetermined coding periods. The quantization scale frequency distribution and the quantization matrix are supplied from the base layer coding section 520 to the coding residual value occurrence probability calculation section 92.

In the coding residual value occurrence probability calculation section 92, data concerning frequency distribution of the transform coefficients is preliminarily stored with respect to each of the frequency indexes (i,j). The coding residual value occurrence probability calculation section 92 calculates the probability of each possible value with respect to each of the coding residual values (i.e. with respect to each of the frequency indexes (i,j)), using the transform coefficient frequency distribution data, the quantization scale frequency distribution and the quantization matrix. Details of calculation of the coding residual value occurrence probabilities will be described later. The coding residual value occurrence probabilities with respect to each of the frequency indexes (i,j) calculated by the coding residual value occurrence probability calculation section 92 are supplied to the arithmetic coding section 91. Incidentally, the coding residual value occurrence probabilities outputted by the coding residual value occurrence probability calculation section 92 can also be the probabilities multiplied by a constant, approximations, etc.

The arithmetic coding section 91 successively encodes the coding residual values corresponding to each of the frequency indexes (i,j) by means of arithmetic coding, based on the coding residual value occurrence probabilities with respect to each of the frequency indexes (i,j). The arithmetic coding is executed with respect to all the frequency indexes (i,j) successively and the result is outputted as the coding residual value arithmetic code.

The coding residual value arithmetic code supplied from the arithmetic coding section 91, the quantization scale frequency distribution and the quantization matrix supplied from the base layer coding section 520, and other additional information are supplied to the multiplexer 95 and temporarily stored in a buffer of the multiplexer 95. The coding residual value arithmetic code, the quantization scale frequency distribution, the quantization matrix and the additional information stored in the buffer are multiplexed in a predetermined multiplexing order and outputted as the enhancement layer bit-stream.

In the following, a method employed by the coding residual value occurrence probability calculation section 92 for calculating the coding residual value occurrence probabilities with respect to each of the frequency indexes (i,j) will be explained. Hereafter, the probability (frequency distribution) the quantization scale will become "s" (the quantization scale frequency distribution) will be represented as "r(s)", and the probability a coding residual value corresponding to a frequency index (i,j) will become "e" (the coding residual value occurrence probability) will be represented as "Pij(e)". The frequency distribution of a transform coefficient "x" corresponding to the frequency index (i,j) (preliminarily stored in the coding residual value occurrence probability calculation section 92) will be represented as "pij(x)", and a matrix element of the quantization matrix (i.e. a quantization matrix element) corresponding to the frequency index (i,j) will be represented as "Wij". Further, in the case where the quantization matrix element is "w" and the quantization scale is "s", a function which represents (outputs) the quantized value of the transform coefficient "x" will be represented as "Q(x, w, s)", and a function which represents (outputs) an inversely quantized value of a quantized value "y" will be represented as "IQ(y, w, s)". A function which represents (outputs) the coding residual value of the transform coefficient "x" will be represented as "f(x, w, s)". The coding residual value function f(x, w, s) is defined as:

$$f(x, w, s) = x - IQ(Q(x, w, s), w, s) \quad (1).$$

Frequency distribution of the coding residual value "e" (in the case where the quantization scale is "s") will be represented as p'ij(e, s). The coding residual value frequency distribution p'ij(e, s) is given as:

$$p'ij(e, s) = \sum_{x=x0}^{x1} pij(x)\delta(f(x, Wij, s) - e) \quad (2)$$

where the "x0" and "x1" are the lower limit and the upper limit of values which can be regarded as the transform coefficient corresponding to the frequency index (i,j), and $$\delta(x) = \begin{cases} 1 (x = 0) \\ 0 (x \ne 0) \end{cases}. \quad (3)$$

Therefore, the coding residual value occurrence probability Pij(e) is given as:

$$Pij(e) = \sum_{s=s0}^{s1} r(s)p'ij(e, s) \quad (4)$$

where the "s0" and "s1" are the lower limit and the upper limit of values which can be regarded as the quantization scale "s".

As shown above, the coding residual value occurrence probability Pij(e) with respect to a transform coefficient corresponding to the frequency index (i,j) can be obtained using the transform coefficient frequency distribution pij(x) preliminarily stored in the coding residual value occurrence probability calculation section 92, the quantization scale frequency distribution r(s) and the quantization matrix Wij.

Figure 6:
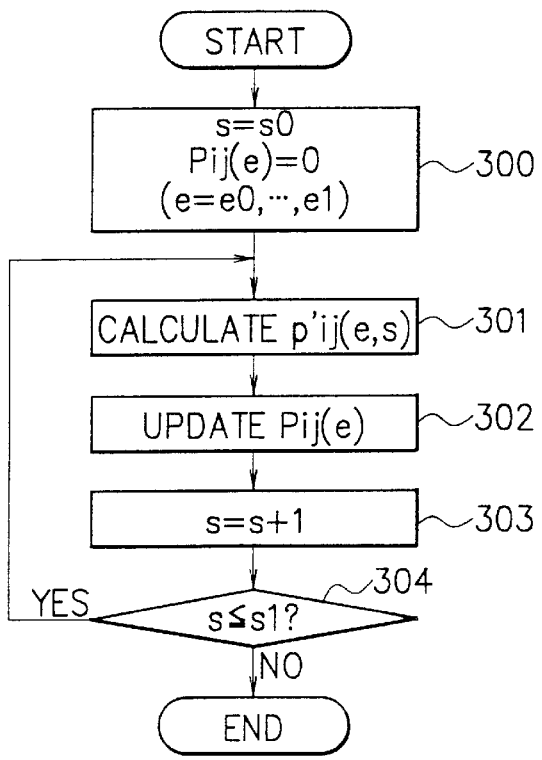
FIG. 6 is a flow chart showing an example of processing executed by a coding residual value occurrence probability calculation section of the hierarchical image coding device of FIG. 5.

Next, an example of processing executed by the coding residual value occurrence probability calculation section 92 for realizing the above calculation will be explained. FIG. 6 is a flow chart showing an example of processing executed by the coding residual value occurrence probability calculation section 92.

In step 300, the quantization scale is set at "s0", and the coding residual value occurrence probability Pij(e) is set at 0 with respect to every integer "e" from "e0" to "e1". Here, the integer "e0" can be an arbitrary integer that is smaller than or equal to the lower limit of possible coding residual values "e", and the integer "e1" can be an arbitrary integer that is larger than or equal to the upper limit of possible coding residual values "e".

In step 301, the coding residual value frequency distribution p'ij(e, s) (in the case where the quantization scale is "s") is calculated. Details of the calculation of the step 301 will be described later. In step 302, the coding residual value occurrence probability Pij(e) is updated using the coding residual value frequency distribution p'ij(e, s) obtained in the step 301 and the quantization scale frequency distribution r(s). Details of the update of the step 302 will also be described later. Subsequently, in step 303, the quantization scale "s" is incremented by 1. In step 304, it is judged whether or not the current quantization scale "s" is smaller or equal to the upper limit "s1". If YES, process is returned to the step 301 and continued. If NO, process is ended. At the end of the process, the coding residual value occurrence probability Pij(e) in the above equation (4) is obtained with respect to each coding residual value "e".

Figure 7:
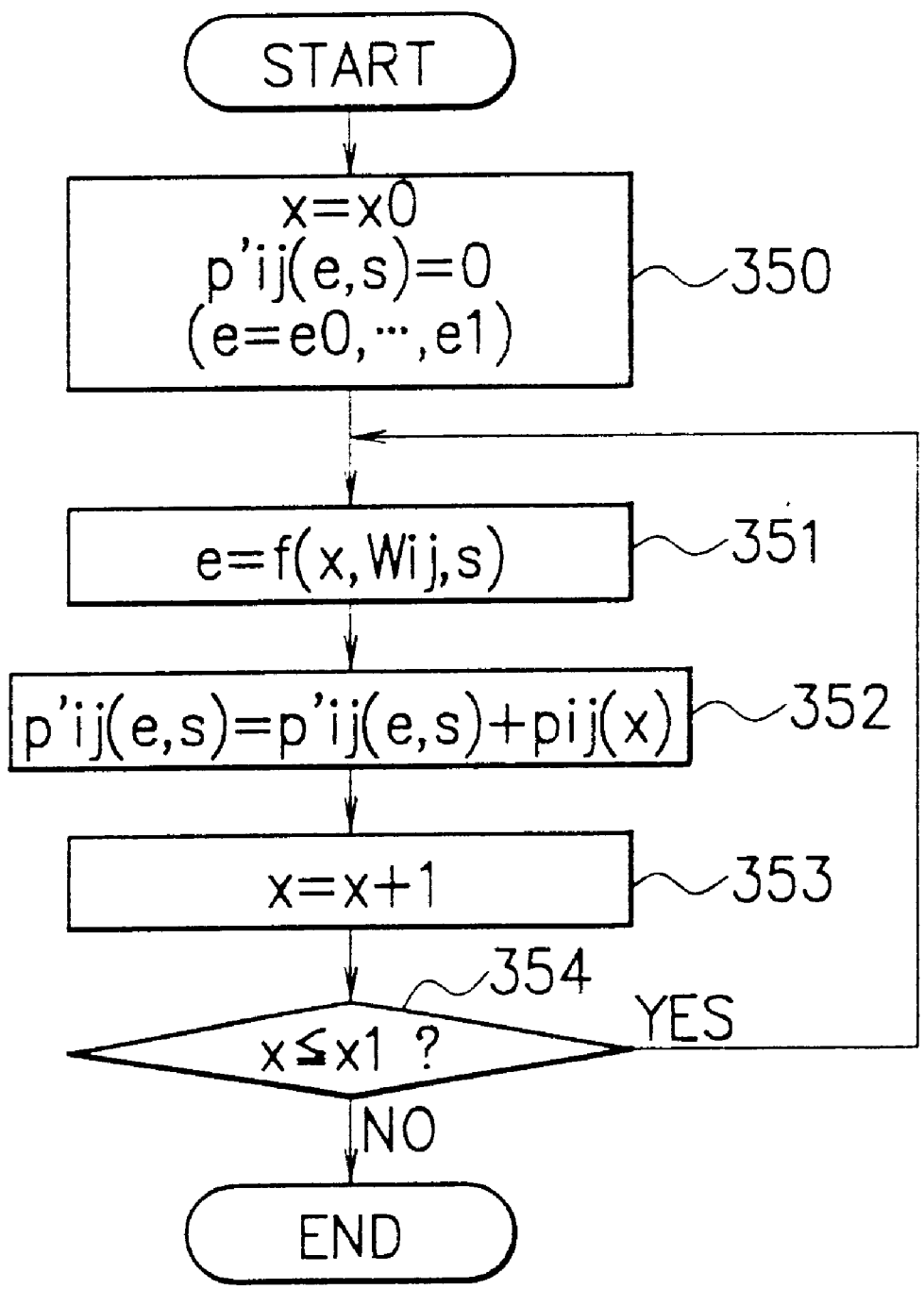
FIG. 7 is a flow chart showing an example of processing executed by the coding residual value occurrence probability calculation section in step 301 of FIG. 6.

Next, a method for calculating the coding residual value frequency distribution p'ij(e, s) in the step 301 of FIG. 6 will be described referring to FIG. 7. FIG. 7 is a flow chart showing an example of processing executed by the coding residual value occurrence probability calculation section 92 in the step 301 of FIG. 6. First, in step 350, the transform coefficient "x" is set at "x0", and the coding residual value frequency distribution p'ij(e, s) (in the case where the quantization scale is "s") is set at 0 with respect to every integer "e" from "e0" to "e1". In step 351, the coding residual value e=f(x, Wij, s) (in the case where the transform coefficient is "x", the quantization matrix is Wij and the quantization scale is "s") is obtained. In step 352, the coding residual value frequency distribution p'ij(e, s) is updated by adding the transform coefficient frequency distribution pij(x) to the coding residual value frequency distribution p'ij(e, s). In step 353, the transform coefficient "x" is incremented by 1. In step 354, it is judged whether or not the current transform coefficient "x" is smaller than or equal to the upper limit "x1". If YES, process is returned to the step 351 and continued. If NO, process of FIG. 7 is ended. At the end of the process of FIG. 7, the coding residual value frequency distribution p'ij(e, s) in the above equation (2) is obtained with respect to each integer "e". Subsequently, process proceeds to the step 302 of FIG. 6.

Figure 8:
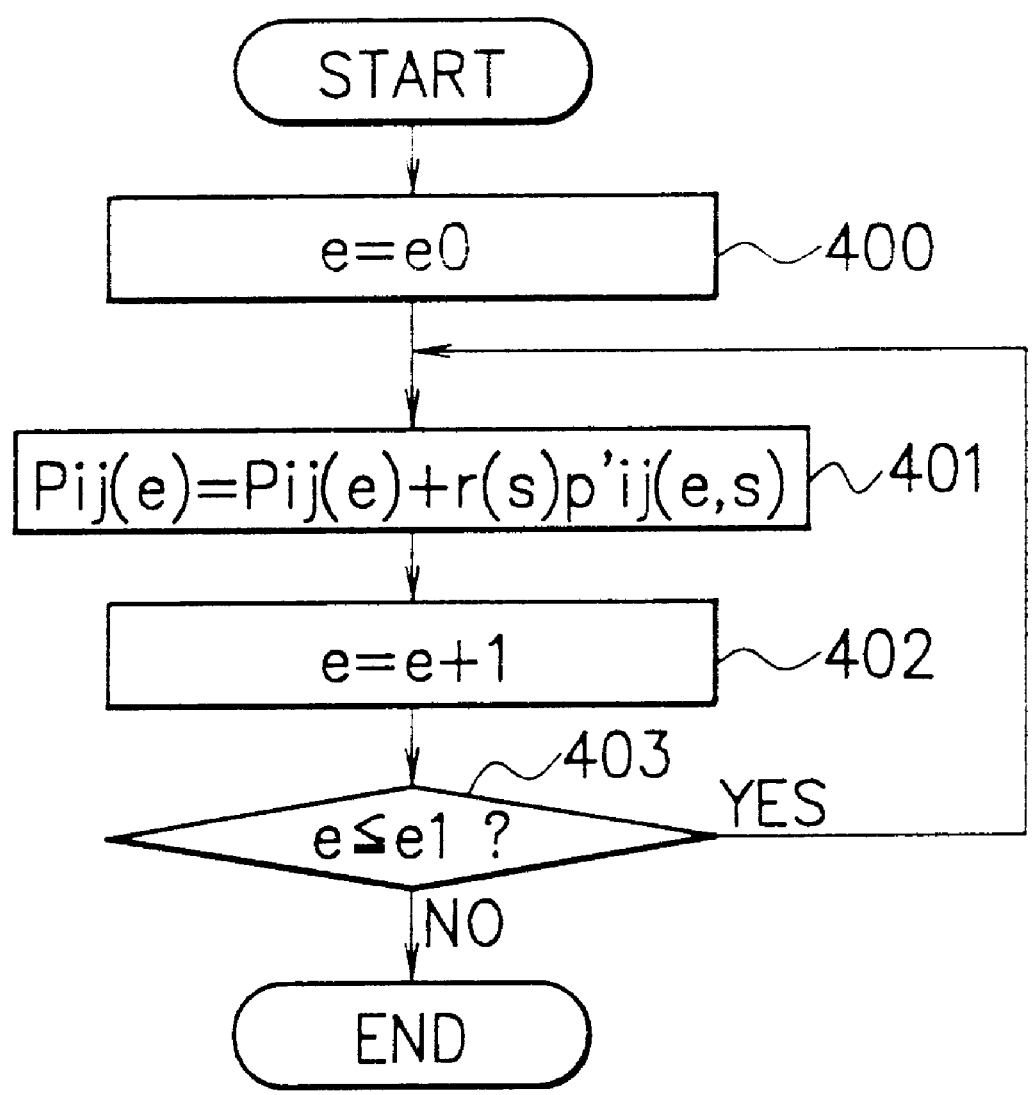
FIG. 8 is a flow chart showing an example of processing executed by the coding residual value occurrence probability calculation section in step 302 of FIG. 6.

Next, a method for updating the coding residual value occurrence probability Pij(e) in the step 302 of FIG. 6 will be described referring to FIG. 8. FIG. 8 is a flow chart showing an example of processing executed by the coding residual value occurrence probability calculation section 92 in the step 302 of FIG. 6. First, in step 400, the coding residual value "e" is set at "e0". In step 401, the coding residual value occurrence probability Pij(e) (with respect to the current coding residual value "e") is updated by multiplying the coding residual value frequency distribution p'ij(e, s) by the quantization scale frequency distribution r(s) and adding the product to the coding residual value occurrence probability Pij(e). In step 402, the current coding residual value "e" is incremented by 1. In step 403, it is judged whether or not the current coding residual value "e" is smaller than or equal to the upper limit "e1". If YES, process is returned to the step 401 and continued. If NO, process of FIG. 8 is ended. At the end of the process of FIG. 8, the update of the coding residual value occurrence probabilities Pij(e) with respect to each coding residual value "e" is completed. The process thereafter proceeds to the step 303 of FIG. 6.

Figure 9:
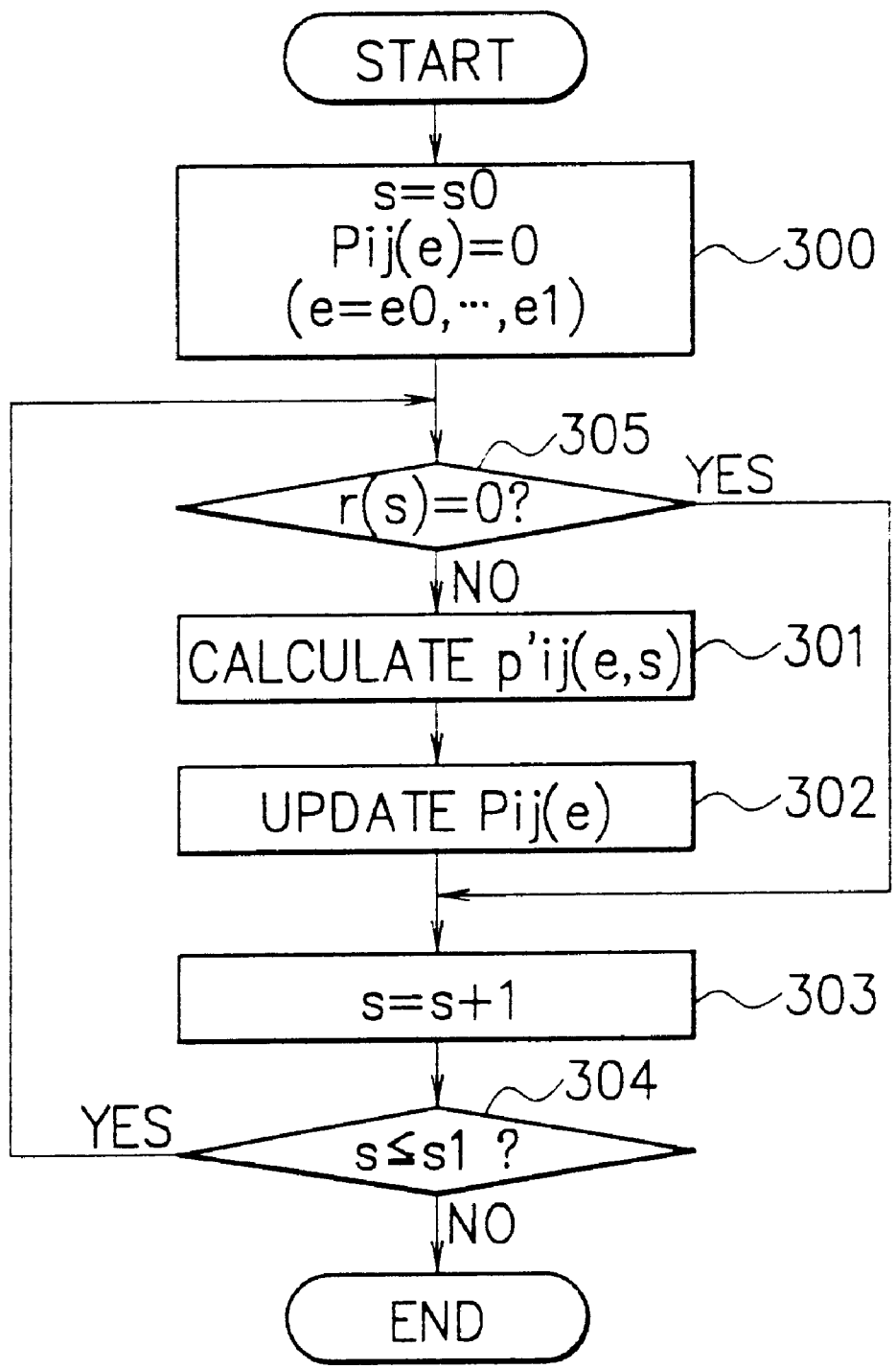
FIG. 9 is a flow chart showing another example of processing executed by the coding residual value occurrence probability calculation section.

Incidentally, the processing of the coding residual value occurrence probability calculation section 92 shown in FIG. 6 can be replaced by processing shown in FIG. 9. Referring to FIG. 9, step 300 is executed in the same way as FIG. 6. After the step 300, process of FIG. 9 proceeds to step 305, in which it is judged whether or not the quantization scale frequency distribution r(s) with respect to the current quantization scale "s" is 0. If YES, process proceeds to the step 303 without executing the steps 301 and 302. If NO, process proceeds to the next step 301. The steps 301, 302 and 303 in FIG. 9 are the same as those in FIG. 6. In the step 304, process is returned to the step 305 if the current quantization scale "s" is smaller than or equal to the upper limit "s1" (i.e. if YES). In the case where the quantization scale frequency distribution r(s) is 0, the coding residual value occurrence probability Pij(e) is not updated regardless of the value of the coding residual value frequency distribution p'ij(e, s). Therefore, the coding residual value occurrence probability Pij (e) obtained at the end of FIG. 9 becomes equal to that of FIG. 6.

Figure 10:
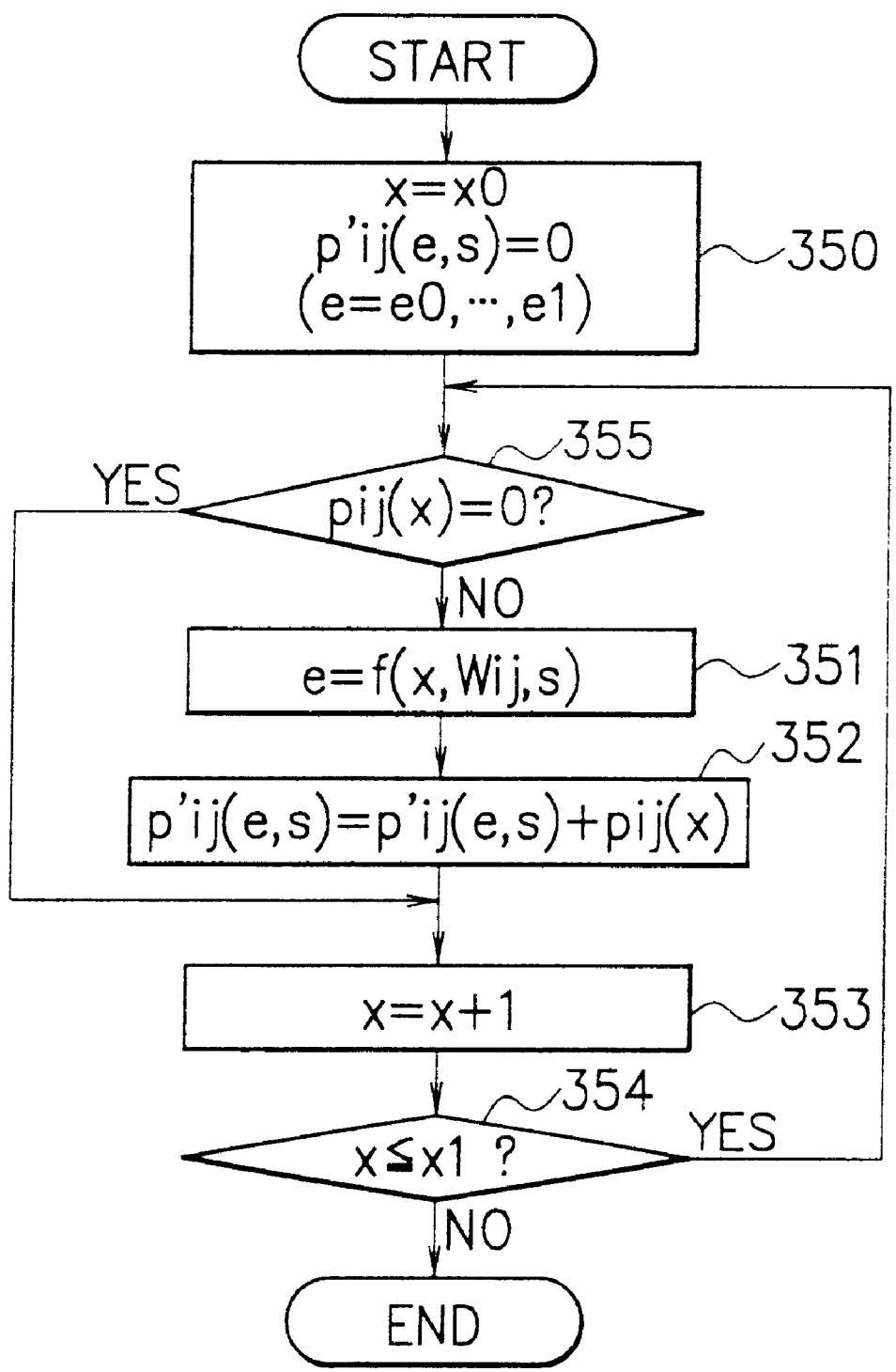
FIG. 10 is a flow chart showing another example of processing executed by the coding residual value occurrence probability calculation section in step 301 of FIG. 6 or FIG. 9.

In addition, the calculation of the coding residual value frequency distribution p'ij(e, s) in the step 301 of FIG. 6 or FIG. 9 (i.e. processing shown in FIG. 7) can be replaced by processing shown in FIG. 10. Referring to FIG. 10, step 350 is executed in the same way as FIG. 7. After the step 350, process of FIG. 10 proceeds to step 355, in which it is judged whether or not the transform coefficient frequency distribution pij(x) with respect to the current transform coefficient "x" is 0. If YES, process proceeds to the step 353 without executing the steps 351 and 352. If NO, process proceeds to the next step 351. The steps 351, 352 and 353 in FIG. 10 are the same as those in FIG. 7. In the step 354, process is returned to the step 355 if the current transform coefficient "x" is smaller than or equal to the upper limit "x1" (i.e. if YES). In the case where the transform coefficient frequency distribution pij(x) is 0, the coding residual value frequency distribution p'ij(e, s) is not updated. Therefore, the coding residual value frequency distribution p'ij(e, s) obtained at the end of FIG. 10 becomes equal to that of FIG. 7.

As described above, in the hierarchical image coding device according to the third embodiment of the present invention, the coding residual value occurrence probabilities Pij(e) (the occurrence probability of each possible value with respect to each of the coding residual values (i.e. with respect to each of the frequency indexes (i,j)) are obtained by the coding residual value occurrence probability calculation section 92 according to the method described above. By calculating the coding residual value occurrence probabilities Pij(e) using the quantization scale frequency distribution based on actually occurred quantization scales, code quantity of the arithmetic code outputted by the arithmetic coding section 91 is decreased.

[Embodiment 4]

Figure 11:
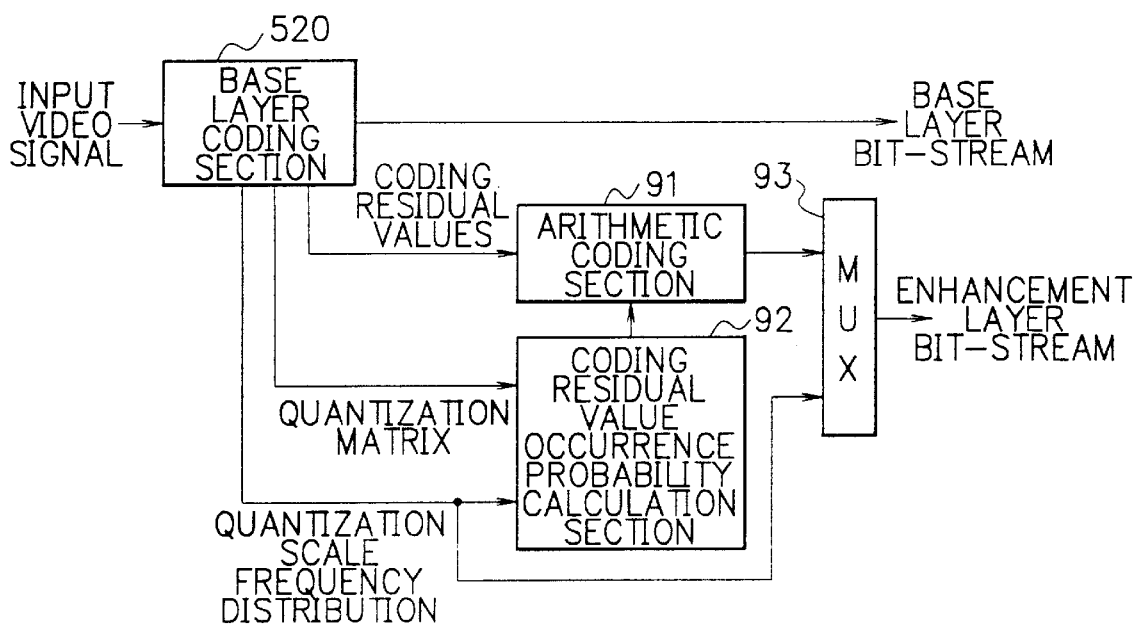
FIG. 11 is a circuit diagram showing a hierarchical image coding device according to a fourth embodiment of the present invention.

FIG. 11 is a circuit diagram showing a hierarchical image coding device according to a fourth embodiment of the present invention.

Referring to FIG. 11, the hierarchical image coding device of the fourth embodiment is basically identical with the hierarchical image coding device of the third embodiment, except for the multiplexer 93. The multiplexer 93 of FIG. 11 multiplexes the coding residual value arithmetic code outputted by the arithmetic coding section 91, the quantization scale frequency distribution outputted by the base layer coding section 520 and other additional information into the enhancement layer bit-stream.

As described above, in the hierarchical image coding device according to the fourth embodiment of the present invention, the multiplexer 93 does not multiplex information concerning the quantization matrix in the enhancement layer bit-stream, differently from the multiplexer 95 of the third embodiment shown in FIG. 5. By this, code quantity of the enhancement layer bit-stream is decreased in comparison with the third embodiment.

[Embodiment 5]

Figure 12:
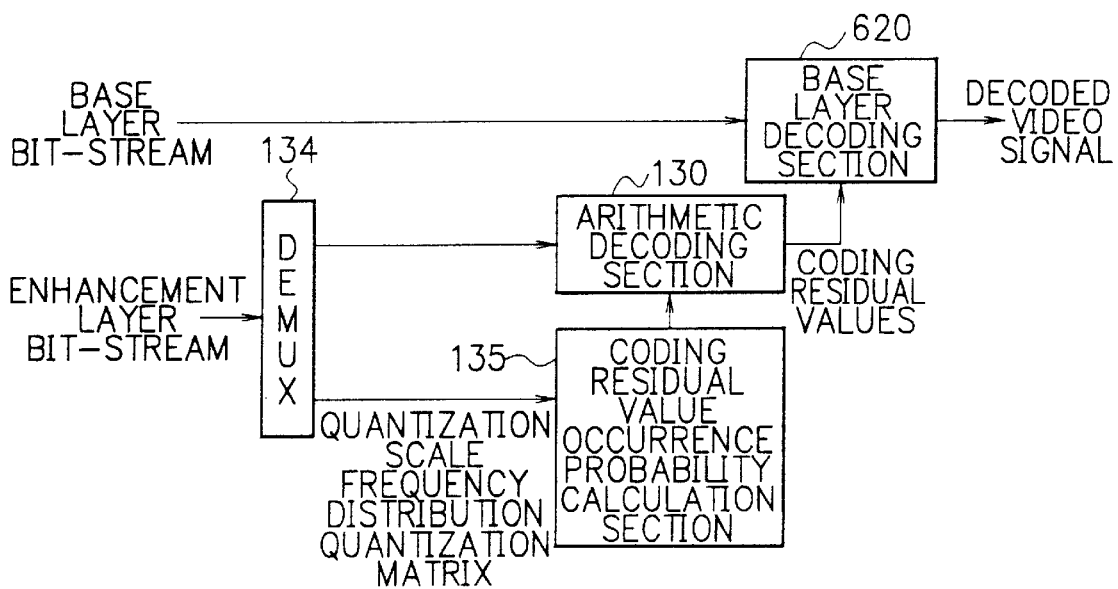
FIG. 12 is a circuit diagram showing a hierarchical image decoding device according to a fifth embodiment of the present invention.

FIG. 12 is a circuit diagram showing a hierarchical image decoding device according to a fifth embodiment of the present invention. The hierarchical image decoding device of FIG. 12 is a device for decoding the video signal (the base layer bit-stream and the enhancement layer bit-stream) which has been coded by the hierarchical image coding device of the third embodiment shown in FIG. 5.

Referring to FIG. 12, the hierarchical image decoding device of the fifth embodiment comprises a base layer decoding section 620, an arithmetic decoding section 130, a coding residual value occurrence probability calculation section 135 and a demultiplexer 134.

The demultiplexer 134 demultiplexes the enhancement layer bit-stream into the coding residual value arithmetic code, the quantization scale frequency distribution, the quantization matrix and other additional information. The coding residual value occurrence probability calculation section 135 calculates and outputs the coding residual value occurrence probabilities based on the quantization scale frequency distribution and the quantization matrix supplied from the demultiplexer 134. The arithmetic decoding section 130 executes arithmetic decoding to the coding residual value arithmetic code supplied from the demultiplexer 134 based on the coding residual value occurrence probabilities outputted by the coding residual value occurrence probability calculation section 135, and outputs the result (i.e. the coding residual values) to the base layer decoding section 620. The base layer decoding section 620 executes decoding and regenerates the original image signal using the base layer bit-stream outputted by the hierarchical image coding device of FIG. 5 and the coding residual values supplied from the arithmetic decoding section 130, and outputs the decoded video signal (the original image signal).

In the following, the operation of the hierarchical image decoding device of FIG. 12 will be described in detail.

The enhancement layer bit-stream outputted by the hierarchical image coding device of FIG. 5 is inputted to the demultiplexer 134. The enhancement layer bit-stream is demultiplexed by the demultiplexer 134 into the coding residual value arithmetic code, the quantization scale frequency distribution, the quantization matrix and the additional information, and temporarily stored in a buffer of the demultiplexer 134. Incidentally, if the demultiplexing (discrimination between the coding residual value arithmetic code, the quantization scale frequency distribution, the quantization matrix and the additional information) by the demultiplexer 134 is impossible without the arithmetic decoding by the arithmetic decoding section 130, it is also possible to combine the demultiplexer 134 and the arithmetic decoding section 130 together so that the demultiplexing and the arithmetic decoding will be executed simultaneously. Subsequently, the quantization scale frequency distribution and the quantization matrix are supplied to the coding residual value occurrence probability calculation section 135 to be used for calculating the coding residual value occurrence probabilities. Data concerning frequency distribution of each transform coefficient (the same data as that stored in the coding residual value occurrence probability calculation section 92 shown in FIG. 5) is preliminarily stored in the coding residual value occurrence probability calculation section 135. The coding residual value occurrence probability calculation section 135 calculates and outputs the coding residual value occurrence probabilities in the same way as the coding residual value occurrence probability calculation section 92. The arithmetic decoding section 130 receives the coding residual value arithmetic code from the demultiplexer 134 and executes arithmetic decoding to the coding residual value arithmetic code, based on the coding residual value occurrence probabilities supplied from the coding residual value occurrence probability calculation section 135. The arithmetic decoding section 130 outputs the result (the coding residual values) to the base layer decoding section 620.

On the other hand, the base layer bit-stream outputted by the base layer coding section 520 of the hierarchical image coding device of FIG. 5 is inputted to the base layer decoding section 620. The base layer decoding section 620 executes decoding (corresponding to the coding that is executed by the base layer coding section 520) to the base layer bit-stream. Concretely, the base layer decoding section 620 executes code conversion (inverse conversion of the code conversion which has been executed by the base layer coding section 520 in FIG. 5) to transform coefficient code in the base layer bit-stream and thereby obtains quantized values, inversely quantizes (de-quantizes) the quantized values of the transform coefficients, and adds the coding residual values supplied from the arithmetic decoding section 130 to the inversely quantized values of the transform coefficients, thereby the transform coefficients of the reversible transform coding are obtained. Subsequently, the base layer decoding section 620 executes inverse transformation (of the reversible transform which has been executed by the base layer coding section 520 for coding) to the transform coefficients and thereby obtains a decoded signal which is exactly the same as the input video signal.

As described above, by the hierarchical image decoding device according to the fifth embodiment of the present invention, a lossless decoded image signal can be obtained from the base layer bit-stream and the enhancement layer bit-stream outputted by the hierarchical image coding device of the third embodiment (FIG. 5).

[Embodiment 6]

Figure 13:
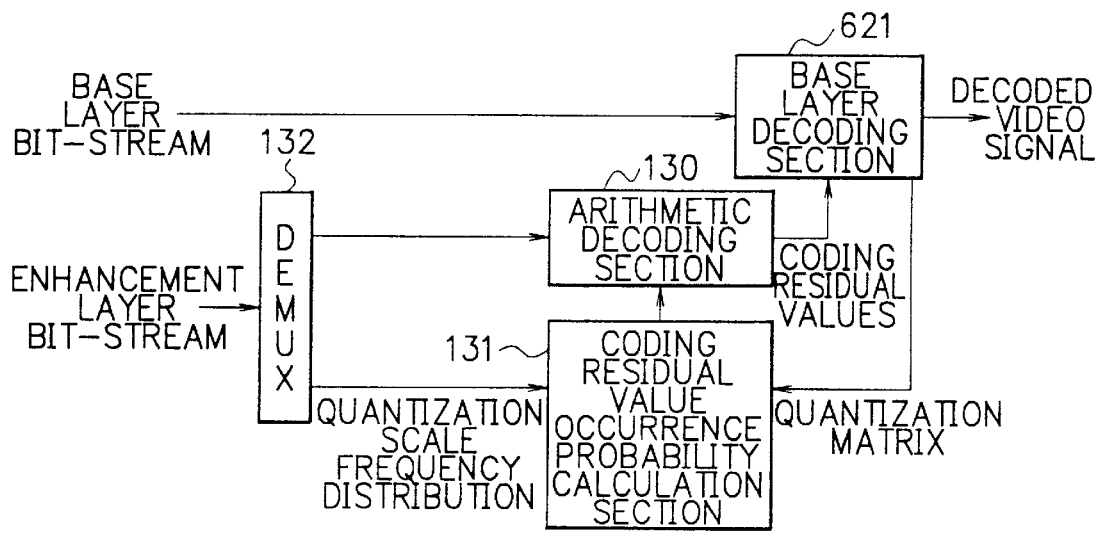
FIG. 13 is a circuit diagram showing a hierarchical image decoding device according to a sixth embodiment of the present invention.

FIG. 13 is a circuit diagram showing a hierarchical image decoding device according to a sixth embodiment of the present invention. The hierarchical image decoding device of FIG. 13 is a device for decoding the video signal (the base layer bit-stream and the enhancement layer bit-stream) which has been coded by the hierarchical image coding device of the fourth embodiment shown in FIG. 11.

Referring to FIG. 13, the hierarchical image decoding device of the sixth embodiment comprises a base layer decoding section 621, an arithmetic decoding section 130, a coding residual value occurrence probability calculation section 131, and a demultiplexer 132.

The arithmetic decoding section 130 is identical with that of the hierarchical image decoding device of FIG. 12. The demultiplexer 132 demultiplexes the enhancement layer bit-stream into the coding residual value arithmetic code, the quantization scale frequency distribution and other additional information. The base layer decoding section 621 demultiplexes the quantization matrix from the base layer bit-stream and supplies the quantization matrix to the coding residual value occurrence probability calculation section 131. The coding residual value occurrence probability calculation section 131 calculates and outputs the coding residual value occurrence probabilities based on the quantization scale frequency distribution outputted by the demultiplexer 132 and the quantization matrix supplied from the base layer decoding section 621. The arithmetic decoding section 130 outputs the coding residual values in the same way as the arithmetic decoding section 130 in FIG. 12. The base layer decoding section 621 regenerates and outputs a lossless decoded image signal (the original image signal, the input video signal) using the base layer bit-stream outputted by the hierarchical image coding device of FIG. 11 and the coding residual values supplied from the arithmetic decoding section 130.

The difference between FIG. 12 and FIG. 13 is that the hierarchical image decoding device of FIG. 13 obtains information concerning the quantization matrix from the base layer bit-stream. The base layer bit-stream contains information concerning the quantization matrix used for quantization of the base layer. The base layer decoding section 621 demultiplexes and outputs the information concerning the quantization matrix from the base layer bit-stream. Incidentally, in the case where the information concerning the quantization matrix is not included in the base layer bit-stream, a predetermined quantization matrix is used for the inverse quantization of the base layer. The coding residual value occurrence probability calculation section 131 utilizes the quantization matrix outputted by the base layer decoding section 621 and thereby calculates the coding residual value occurrence probabilities.

As described above, by the hierarchical image decoding device according to the sixth embodiment of the present invention, a lossless decoded image signal can be obtained from the base layer bit-stream and the enhancement layer bit-stream outputted by the hierarchical image coding device of the fourth embodiment (FIG. 11). The hierarchical image coding device of the fourth embodiment does not multiplex the information concerning the quantization matrix in the enhancement layer bit-stream, and the coding residual value occurrence probability calculation section 131 utilizes the quantization matrix demultiplexed from the base layer bit-stream, therefore, code quantity of the enhancement layer bit-stream is decreased in comparison with the fifth embodiment (FIG. 12).

[Embodiment 7]

Figure 14:
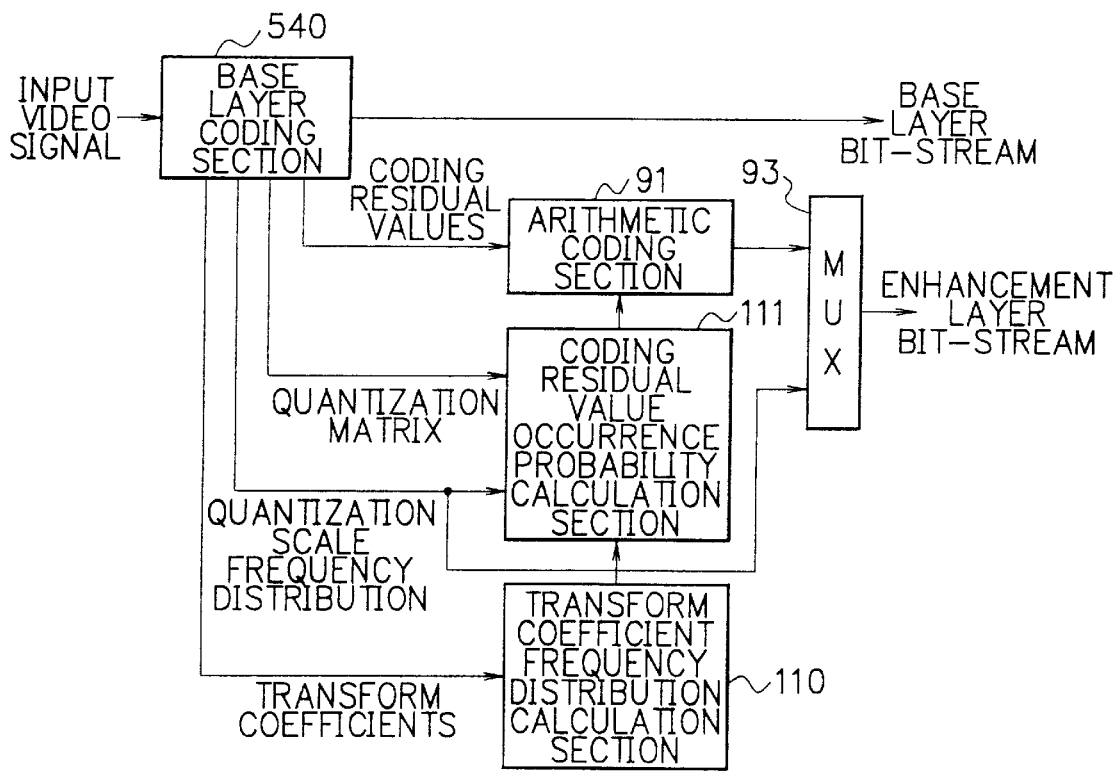
FIG. 14 is a circuit diagram showing a hierarchical image coding device according to a seventh embodiment of the present invention.

FIG. 14 is a circuit diagram showing a hierarchical image coding device according to a seventh embodiment of the present invention.

Referring to FIG. 14, the hierarchical image coding device of the seventh embodiment comprises a base layer coding section 540, an arithmetic coding section 91, a coding residual value occurrence probability calculation section 111, a transform coefficient frequency distribution calculation section 110, and a multiplexer 93.

The arithmetic coding section 91 and the multiplexer 93 are identical with those of the hierarchical image coding device of the fourth embodiment shown in FIG. 11. The base layer coding section 540 is basically the same as the base layer coding section 520 shown in FIG. 11, except that the base layer coding section 540 further outputs the transform coefficients of the reversible transform coding. The transform coefficient frequency distribution calculation section 110 collects the transform coefficients outputted by the base layer coding section 540 and thereby obtains and outputs frequency distribution of each of the transform coefficient. The coding residual value occurrence probability calculation section 111 calculates and outputs the coding residual value occurrence probabilities based on the quantization matrix and the quantization scale frequency distribution outputted by the base layer coding section 540 and the transform coefficient frequency distribution outputted by the transform coefficient frequency distribution calculation section 110. The arithmetic coding section 91 executes arithmetic coding to the coding residual values outputted by the base layer coding section 540 based on the coding residual value occurrence probabilities outputted by the coding residual value occurrence probability calculation section 111, and outputs the result to the multiplexer 93 as the coding residual value arithmetic code. The multiplexer 93 multiplexes the coding residual value arithmetic code outputted by the arithmetic coding section 91, the quantization scale frequency distribution outputted by the base layer coding section 540 and other additional information, and thereby generates and outputs the enhancement layer bit-stream.

In the following, the operation of the hierarchical image coding device of FIG. 13 will be described in detail.

An input video signal is supplied to the base layer coding section 540. The base layer coding section 540 operates in the same way as the base layer coding section 520 shown in FIG. 11, and further outputs the transform coefficients of the reversible transform coding to the transform coefficient frequency distribution calculation section 110.

The transform coefficient frequency distribution calculation section 110 collects the transform coefficients corresponding to each of the frequency indexes (i,j), and counts the number of times of occurrence of each possible value of the transform coefficient corresponding to each frequency index (i,j), at predetermined coding periods. The transform coefficient frequency distribution calculation section 110 thereby obtains and outputs frequency distribution of the transform coefficient with respect to each of the frequency indexes (i,j).

The coding residual value occurrence probability calculation section 111 calculates the coding residual value occurrence probabilities. The operation of the coding residual value occurrence probability calculation section 111 is almost the same as that of the coding residual value occurrence probability calculation section 92 in FIG. 11, except that the coding residual value occurrence probability calculation section 111 updates data concerning frequency distribution of each transform coefficient utilizing the transform coefficient frequency distribution outputted by the transform coefficient frequency distribution calculation section 110. The updated transform coefficient frequency distribution is used for calculation of the coding residual value occurrence probabilities in the next coding period. Various methods can be employed for updating the transform coefficient frequency distribution. For example, if we represent the frequency distribution of a transform coefficient "x" outputted by the transform coefficient frequency distribution calculation section 110 as p"ij(x), the transform coefficient frequency distribution pij(x) in the coding residual value occurrence probability calculation section 111 can be updated as:

$$pij(x)=(1-a)pij(x)+ap''ij(x) \qquad (5).$$

where $0 \leq a \leq 1$. The other components of the hierarchical image coding device (the arithmetic coding section 91 and the multiplexer 93) operate in the same way as those in FIG. 11.

As described above, in the hierarchical image coding device according to the seventh embodiment of the present invention, the frequency distribution of each transform coefficient is successively updated adaptively, based on the actually inputted image signal (the input video signal). Therefore, characteristics of the input video signal can be reflected and incorporated in the arithmetic coding, thereby coding efficiency can be improved further in comparison with the hierarchical image coding device of the fourth embodiment (FIG. 11).

[Embodiment 8]

FIG. 15 is a circuit diagram showing a hierarchical image decoding device according to an eighth embodiment of the present invention. The hierarchical image decoding device of FIG. 15 is a device for decoding the video signal (the base layer bit-stream and the enhancement layer bit-stream) which has been coded by the hierarchical image coding device of the above seventh embodiment shown in FIG. 14.

Referring to FIG. 15, the hierarchical image decoding device of the eighth embodiment comprises a base layer decoding section 640, an arithmetic decoding section 130, a coding residual value occurrence probability calculation section 151, a transform coefficient frequency distribution calculation section 150, and a demultiplexer 132.

The arithmetic decoding section 130 and the demultiplexer 132 are identical with those in FIG. 13. The base layer decoding section 640 is basically identical with the base layer decoding section 621 in FIG. 13, except that the base layer decoding section 640 further outputs the transform coefficients of the reversible transform coding. The transform coefficient frequency distribution. calculation section 150 collects the transform coefficients outputted by the base layer decoding section 640, and thereby obtains and outputs frequency distribution of each transform coefficient. The demultiplexer 132 demultiplexes the enhancement layer bit-stream into the coding residual value arithmetic code, the quantization scale frequency distribution and the additional information. The coding residual value occurrence probability calculation section 151 calculates and outputs occurrence probability of each possible value of each of the coding residual values (i.e. the coding residual value occurrence probabilities), based on the quantization scale frequency distribution outputted by the demultiplexer 132, the quantization matrix outputted by the base layer decoding section 640 and the transform coefficient frequency distribution outputted by the transform coefficient frequency distribution calculation section 150. The arithmetic decoding section 130 executes arithmetic decoding to the coding residual value arithmetic code outputted by the demultiplexer 132 based on the coding residual value occurrence probabilities outputted by the coding residual value occurrence probability calculation section 151, and outputs the result as the coding residual values.

In the following, the operation of the hierarchical image decoding device of FIG. 15 will be described in detail.

The operations of the demultiplexer 132 and the arithmetic decoding section 130 are the same as the operations of those in FIG. 13. The coding residual value occurrence probability calculation section 151 calculates and outputs occurrence probability of each possible value of each of the coding residual values (i.e. the coding residual value occurrence probabilities) in the same way as the coding residual value occurrence probability calculation section 111 of FIG. 14. Incidentally, initial values of the transform coefficient frequency distribution in the coding residual value occurrence probability calculation section 151 are set at the same values as those in the coding residual value occurrence probability calculation section 111 of FIG. 14, thereby the coding residual values outputted by the arithmetic decoding section 130 become the same as those which have been outputted by the base layer coding section 540 of FIG. 14.

The coding residual values outputted by the arithmetic decoding section 130 are supplied to the base layer decoding section 640. The operation of the base layer decoding section 640 is basically the same as that of the base layer decoding section 621 of FIG. 13, except that the base layer decoding section 640 further outputs the transform coefficients of the reversible transform coding which are obtained by adding the coding residual values to the inversely quantized values (which are obtained from the base layer bit-stream by code conversion and inverse quantization) respectively). The transform coefficients outputted by the base layer decoding section 640 become the same as those which have been outputted by the base layer coding section 540 of FIG. 14.

The transform coefficients outputted by the base layer decoding section 640 is supplied to the transform coefficient frequency distribution calculation section 150. The operation of the transform coefficient frequency distribution calculation section 150 is the same as that of the transform coefficient frequency distribution calculation section 110 of FIG. 14. As mentioned above, the transform coefficients supplied to the transform coefficient frequency distribution calculation section 150 are the same as those which have been outputted by the base layer coding section 540 of FIG. 14, therefore, the transform coefficient frequency distribution outputted by the transform coefficient frequency distribution calculation section 150 also becomes the same as that which has been outputted by the transform coefficient frequency distribution calculation section 110 of FIG. 14.

The transform coefficient frequency distribution (with respect to each frequency index (i,j)) outputted by the transform coefficient frequency distribution calculation section 150 is supplied to the coding residual value occurrence probability calculation section 151, and thereby the data concerning the transform coefficient frequency distribution stored therein is updated, in the same way as the coding residual value occurrence probability calculation section 111 of FIG. 14. Consequently, the updated data concerning the transform coefficient frequency distribution in the coding residual value occurrence probability calculation section 151 becomes the same as that in the coding residual value occurrence probability calculation section 111 of FIG. 14.

As above, the coding residual value occurrence probabilities outputted by the coding residual value occurrence probability calculation section 151 constantly become the same as those which has been outputted by the coding residual value occurrence probability calculation section 111 of FIG. 14. Therefore, the enhancement layer bit-stream generated by the hierarchical image coding device of FIG. 14 can be decoded correctly. Consequently, a lossless decoded image signal (the input video signal) can be obtained in the base layer decoding section 640.

As described above, by the hierarchical image decoding device according to the eighth embodiment of the present invention, a lossless decoded image signal can be obtained from the base layer bit-stream and the enhancement layer bit-stream outputted by the hierarchical image coding device of the seventh embodiment (FIG. 14).

Incidentally, the transform coefficient frequency distribution with respect to each transform coefficient outputted by the transform coefficient frequency distribution calculation section 150 becomes exactly the same as the transform coefficient frequency distribution with respect to each transform coefficient which has been outputted by the transform coefficient frequency distribution calculation section 110 of the hierarchical image coding device of FIG. 14, as mentioned above, since the base layer coding section 540 in FIG. 14 executes reversible transform (reversible discrete cosine transform etc.) and thereby transform coefficients of integers (discrete values) are obtained and rounding error can be avoided. By this, the coding residual value occurrence probabilities outputted by the coding residual value occurrence probability calculation section 151 become the same as the coding residual value occurrence probabilities which have been outputted by the coding residual value occurrence probability calculation section 111, and the coding residual values outputted by the arithmetic decoding section 130 become the same as the coding residual values which have been inputted to the arithmetic coding section 91, thereby the lossless decoding (regeneration of the original image signal) is realized.

[Embodiment 9]

Figure 16:
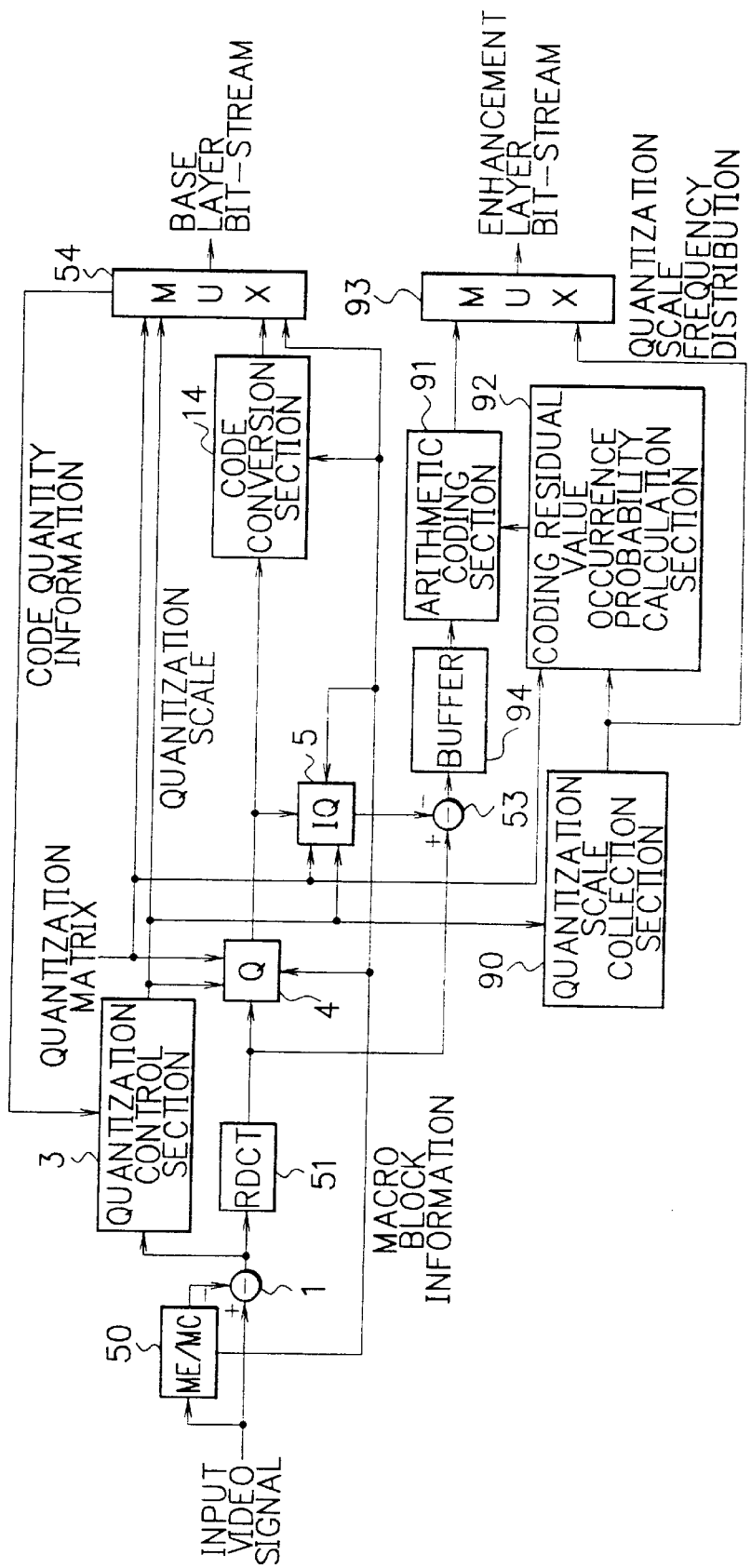
FIG. 16 is a circuit diagram showing a hierarchical image coding device according to a ninth embodiment of the present invention.

FIG. 16 is a circuit diagram showing a hierarchical image coding device according to a ninth embodiment of the present invention.

Referring to FIG. 16, the hierarchical image coding device of the ninth embodiment comprises a quantization control section 3, a quantizer 4, an inverse quantizer (dequantizer) 5, a code conversion section 14, a motion estimation/compensation circuit (ME/MC) 50, a reversible discrete cosine transform circuit (RDCT) (lossless discrete cosine transform circuit (LDCT)) 51, subtracters 1 and 53, a multiplexer 54, a quantization scale collection section 90, an arithmetic coding section 91, a coding residual value occurrence probability calculation section 92, a multiplexer 93, and a buffer 94.

The quantization control section 3, the quantizer 4, the inverse quantizer 5, the code conversion section 14, the motion estimation/compensation circuit 50, the reversible discrete cosine transform circuit 51, the subtracters 1 and 53, and the multiplexer 54 are identical with those of the hierarchical image coding device which has been shown in FIG. 1.

The quantization scale collection section 90 collects the quantization scales, which are outputted by the quantization control section 3 with respect to each macro block, at predetermined coding periods (at every picture (image) etc.), and thereby obtains and outputs frequency distribution of the quantization scale. The coding residual value occurrence probability calculation section 92 calculates and outputs occurrence probability of each possible value of each of the coding residual values (i.e. the coding residual value occurrence probabilities) with respect to each transform coefficient, based on the quantization scale frequency distribution outputted by the quantization scale collection section 90, the quantization matrix and frequency distribution of each transform coefficient which has preliminarily been obtained and stored therein. The buffer 94 temporarily stores the coding residual values outputted by the subtracter 53. The arithmetic coding section 91 executes arithmetic coding to the coding residual values outputted by the buffer 94 based on the coding residual value occurrence probabilities (with respect to each frequency index (i,j)) outputted by the coding residual value occurrence probability calculation section 92, and outputs the result as the coding residual value arithmetic code. The multiplexer 93 multiplexes the coding residual value arithmetic code outputted by the arithmetic coding section 91, the quantization scale frequency distribution outputted by the quantization scale collection section 90, and other additional information, and thereby generates and outputs the enhancement layer bitstream.

The components of the hierarchical image coding device of FIG. 16 are realized by, for example, one or more microprocessor units which are composed of one or more CPUs (Central Processing Units), ROM (Read Only Memory), RAM (Random Access Memory), etc. It is also possible to realize the components by software on a computer.

In the following, the operation of the hierarchical image coding device of FIG. 16 will be described in detail.

An input video signal is partitioned into pictures etc., and inputted to the hierarchical image coding device in order of coding (depending on coding methods). The input video signal is supplied to the motion estimation/compensation circuit 50 and the subtracter 1. In the motion estimation/compensation circuit 50, data concerning reference images to be used for motion estimation (to which coding has already been executed) is stored, and motion estimation between the input video signal and the reference image data is executed. Subsequently, macro block information is obtained with respect to each macro block. The macro block information includes information concerning prediction mode (such as intra mode, non-intra mode, etc.), motion vectors, etc. Subsequently, motion compensation is executed according to the macro block information, and thereby a motion compensated prediction image signal is generated. The macro block information obtained here is also supplied to the quantizer 4, the inverse quantizer 5 and the code conversion section 14 for controlling them.

The motion compensated prediction image signal is inputted to the subtracter 1. The subtracter 1 subtracts the motion compensated prediction image signal from the input video signal, and outputs the result of subtraction as a prediction error image signal. The prediction error image signal is supplied to the reversible discrete cosine transform circuit 51 and the quantization control section 3. The reversible discrete cosine transform circuit 51 executes reversible discrete cosine transform to each block of the prediction error image. The result of the reversible discrete cosine transform is outputted to the quantizer 4 and the subtracter 53 as reversible discrete cosine transform coefficients. The quantization control section 3 calculates the quantization scale for each macro block, using the prediction error image signal supplied from the subtracter 1 and code quantity information which is supplied from the multiplexer 54 as feedback. The calculation of the quantization scale can be executed according to a calculation method of MPEG-2 TM5 (Test Model 5), for example. The MPEG-2 TM5 is elaborated on in "Rate control and buffer control," Journal of the institute of Television Engineers of Japan (special issue "MPEG" 3-2-5), vol.49, No.4, pages 455–458 (April 1995).

The quantizer 4 quantizes the reversible discrete cosine transform coefficients based on the quantization scale determined by the quantization control section 3 for each macro block, the macro block information outputted by the motion estimation/compensation circuit 50, and the quantization matrix which has preliminarily been determined or which is calculated at predetermined coding periods. The quantized values obtained by the quantizer 4 are supplied to the code conversion section 14. The code conversion section 14 executes one-dimensional scanning (zigzag scanning etc.) to the quantized values, and thereby encodes the quantized values of the reversible discrete cosine transform coefficients into a variable length code. For the variable length coding, Huffman coding can be employed, for example. In the Huffman coding, the number of successive zero quantized values (0-run length) and the absolute value (level) of the next non-zero quantized value are obtained, and the combination of the 0-run length and the level is encoded according to a predetermined coding table, for example. Incidentally, of course it is also possible to employ arithmetic coding instead of Huffman coding.

The variable length code outputted by the code conversion section 14, the quantization scale outputted by the quantization control section 3, the quantization matrix, the macro block information outputted by the motion estimation/compensation circuit 50, and other additional information are supplied to the multiplexer 54 and temporarily stored in a buffer of the multiplexer 54. The multiplexer 54 multiplexes the variable length code, the quantization scale, the quantization matrix, the macro block information and the additional information in a predetermined multiplexing order, and thereby generates and outputs the base layer bit-stream. Further, the multiplexer 54 counts the amount of code which actually occurred, and outputs the result to the quantization control section 3 as the code quantity information. Incidentally, the base layer bit-stream becomes MPEG-2-compatible if the code conversion section 14 executes variable length coding according to MPEG-2 and the multiplexer 54 executes multiplexing as specified by MPEG-2. Of course, MPEG-1, MPEG-4, H.261, H.263, etc. can also be employed instead of MPEG-2, and the base layer bit-stream can be generated so as to be compatible with arbitrary one of them.

The quantized values outputted by the quantizer 4 is also supplied to the inverse quantizer 5. The inverse quantizer 5 inversely quantizes the quantized values based on the quantization scale, the quantization matrix and the macro block information, and outputs the inversely quantized values to the subtracter 53. The subtracter 53 subtracts the inversely quantized values from the values before quantization (i.e. the reversible discrete cosine transform coefficients) respectively, and thereby obtains the coding residual values. The coding residual values obtained by the subtracter 53 are inputted to the buffer 94. The coding residual values temporarily stored in the buffer 94 are read out by the arithmetic coding section 91 in a predetermined order. The arithmetic coding section 91 executes arithmetic coding to the coding residual values and outputs the coding residual value arithmetic code, in the same way as has been explained referring to FIG. 5.

The quantization scale outputted by the quantization control section 3 is also supplied to the quantization scale collection section 90. The quantization scale collection section 90 collects the quantization scales supplied thereto. In the collection, the quantization scale collection section 90 counts the number of times of occurrence with respect to each possible value of the quantization scale in a predetermined coding period (on every picture etc.). Incidentally, the quantization matrix takes on a fixed value during the coding period. Based on the counting, the quantization scale collection section 90 figures out and outputs the quantization scale frequency distribution r(s). Incidentally, the quantization scale frequency distribution r(s) outputted by the quantization scale collection section 90 can be normalized frequency distribution multiplied by a constant, an approximation, etc.

The quantization scale frequency distribution r(s) is supplied to the coding residual value occurrence probability calculation section 92. The coding residual value occurrence probability calculation section 92 calculates the coding residual value occurrence probabilities with respect to each frequency index (i,j) of the transform coefficients, in the same way as has been explained referring to FIG. 5.

The coding residual value arithmetic code outputted by the arithmetic coding section 91, the quantization scale frequency distribution outputted by the quantization scale collection section 90, and other additional information are multiplexed by the multiplexer 93, and thereby the enhancement layer bit-stream is generated and outputted.

Figure 17:
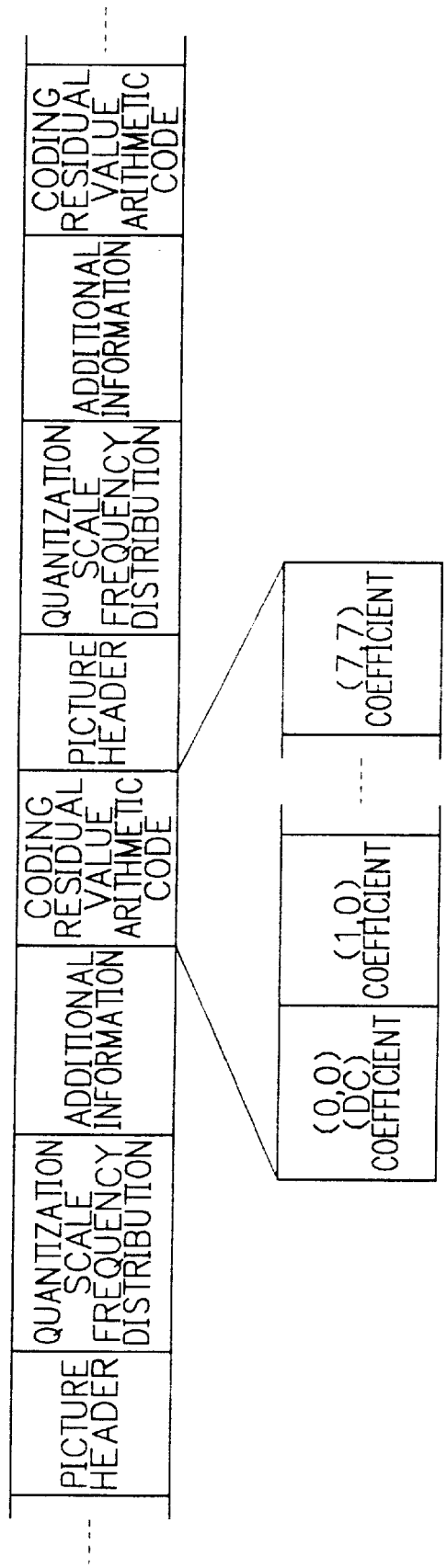
FIG. 17 is a schematic diagram showing an example of the enhancement layer bit-stream.

FIG. 17 shows an example of the enhancement layer bit-stream in the case where the quantization scale collection section 90 executes the collection of the quantization scale on every picture. Referring to FIG. 17, part of the enhancement layer bit-stream with respect to one picture (image) is composed of a picture header, code for the quantization scale frequency distribution, code for the additional information, and the coding residual value arithmetic code. In this case, arithmetic coding by the arithmetic coding section 91 has been executed by repeating arithmetic coding of coding residual values concerning each frequency index (i,j), and thereby arithmetic coding concerning all the frequency indexes (i,j) has been completed. Therefore, the coding residual value arithmetic code is composed of code for DC (Direct Current) coefficient, code for (1,0) coefficient, . . . , and code for (7,7) coefficient, As described above, by the hierarchical image coding device according to the ninth embodiment of the present invention, the same effects as those of the hierarchical image coding device of the fourth embodiment (FIG. 11) can be obtained.

[Embodiment 10]

Figure 18:
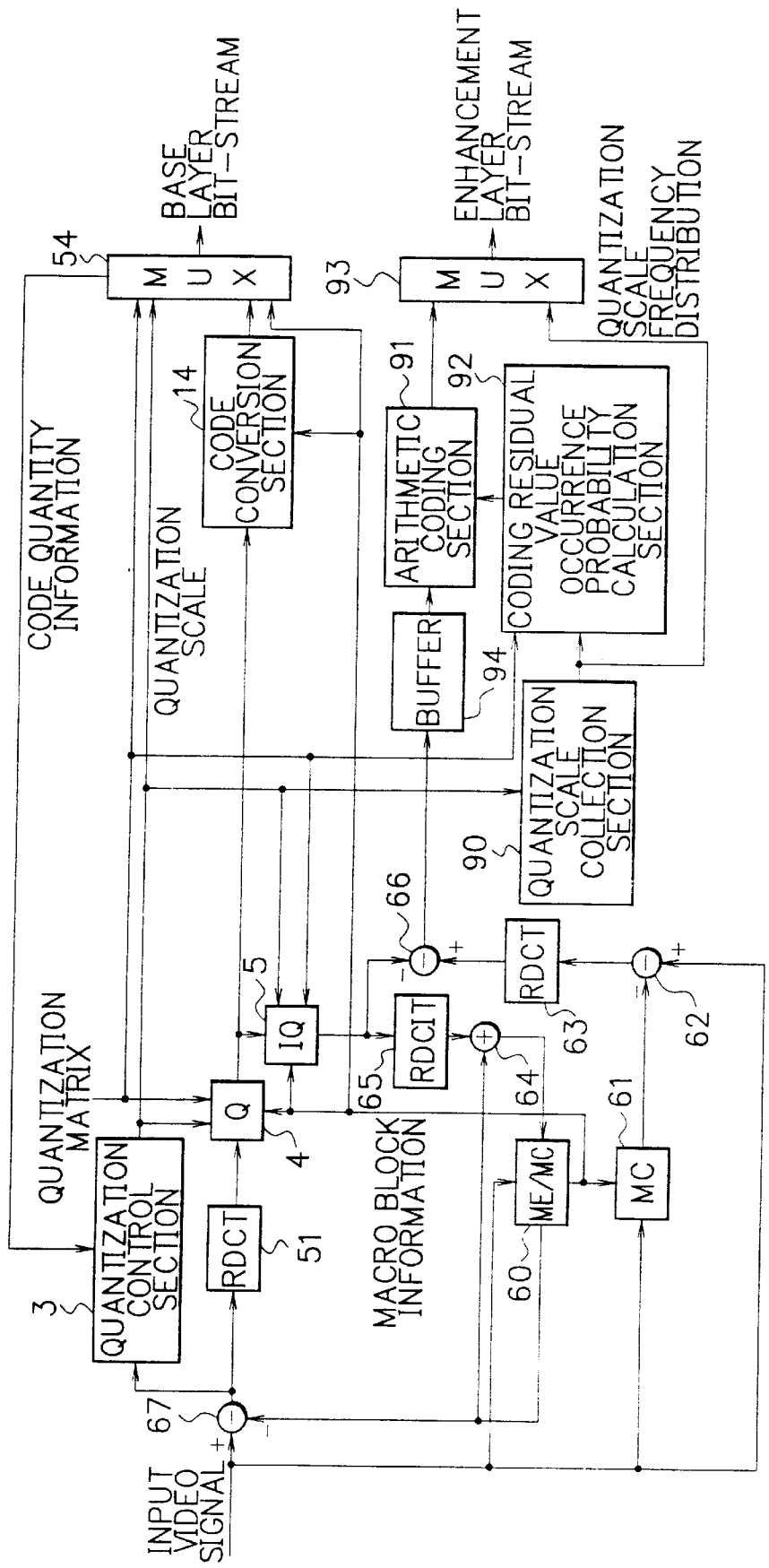
FIG. 18 is a circuit diagram showing a hierarchical image coding device according to a tenth embodiment of the present invention.

FIG. 18 is a circuit diagram showing a hierarchical image coding device according to a tenth embodiment of the present invention.

Referring to FIG. 18, the hierarchical image coding device of the tenth embodiment comprises a quantization control section 3, a quantizer 4, an inverse quantizer (dequantizer) 5, a code conversion section 14, a reversible discrete cosine transform circuit (RDCT) (lossless discrete cosine transform circuit (LDCT)) 51, multiplexers 54 and 93, a quantization scale collection section 90, an arithmetic coding section 91, a coding residual value occurrence probability calculation section 92, and a buffer 94, in the same way as the hierarchical image coding device of FIG. 16. The above components are basically the same as those in FIG. 16.

The hierarchical image coding device of FIG. 18 further comprises a motion estimation/compensation circuit (ME/MC) 60, a motion compensation circuit (MC) 61, subtracters 62, 66 and 67, a reversible discrete cosine transform circuit (RDCT) (lossless discrete cosine transform circuit (LDCT)) 63, an adder 64, and a reversible discrete cosine inverse transform circuit (RDCIT) 65.

The motion estimation/compensation circuit 60 executes motion estimation between the input video signal and a locally decoded image signal outputted by the adder 64 and thereby obtains motion vectors, executes motion compensation to a reference image signal based on the motion vector, and thereby obtains and outputs a first motion compensated prediction image signal. At the same time, the motion estimation/compensation circuit 60 also outputs macro block information.

The subtracter 67 subtracts the first motion compensated prediction image signal outputted by the motion estimation/compensation circuit 60 from the input video signal, and thereby obtains and outputs a first prediction error image signal. The reversible discrete cosine transform circuit 51 executes reversible discrete cosine transform to the first prediction error image signal outputted by the subtracter 67, and thereby outputs first reversible discrete cosine transform coefficients. The quantization control section 3 calculates and outputs a quantization scale based on the first prediction error image signal outputted by the subtracter 67 and code quantity information outputted by the multiplexer 54. The quantizer 4 quantizes the first reversible discrete cosine transform coefficients outputted by the reversible discrete cosine transform circuit 51 based on the quantization scale outputted by the quantization control section 3, the quantization matrix, and the macro block information outputted by the motion estimation/compensation circuit 60, and thereby outputs the quantized values (of the first reversible discrete cosine transform coefficients) to the code conversion section 14. The code conversion section 14 executes variable length coding to the quantized values outputted by the quantizer 4, and thereby outputs a variable length code of the quantized values (of the first reversible discrete cosine transform coefficients). The multiplexer 54 multiplexes the quantization matrix, the quantization scale outputted by the quantization control section 3, the macro block information outputted by the motion estimation/compensation circuit 60, the variable length code of the quantized values (of the first reversible discrete cosine transform coefficients) outputted by the code conversion section 14, and other additional information, and thereby generates and outputs the base layer bit-stream.

The inverse quantizer 5 executes inverse quantization (de-quantization) to the quantized values outputted by the quantizer 4 based on the quantization matrix, the quantization scale outputted by the quantization control section 3, and the macro block information outputted by the motion estimation/compensation circuit 60, and thereby outputs the inversely quantized values. The reversible discrete cosine inverse transform circuit 65 executes inverse transformation of the reversible discrete cosine transform to the inversely quantized values outputted by the inverse quantizer 5, and thereby outputs a locally decoded prediction error image signal. The adder 64 adds the locally decoded prediction error image signal outputted by the reversible discrete cosine inverse transform circuit 65 to the first motion compensated prediction image signal outputted by the motion estimation/compensation circuit 60, and thereby outputs the aforementioned locally decoded image signal.

The motion compensation circuit 61 executes motion compensation to the input video signal based on the macro block information outputted by the motion estimation/compensation circuit 60, and thereby generates and outputs a second motion compensated prediction image signal. The subtracter 62 subtracts the second motion compensated prediction image signal from the input video signal, and thereby outputs a second prediction error image signal. The reversible discrete cosine transform circuit 63 executes reversible discrete cosine transform to the second prediction error image signal outputted by the subtracter 62, and thereby outputs second reversible discrete cosine transform coefficients. The subtracter 66 subtracts the inversely quantized values outputted by the inverse quantizer 5 from the second reversible discrete cosine transform coefficients outputted by the reversible discrete cosine transform circuit 63, and thereby obtains and outputs coding residual values. The buffer 94 temporarily stores the coding residual values supplied from the subtracter 66. The operations of the other components (i.e. the quantization scale collection section 90, the coding residual value occurrence probability calculation section 92, the arithmetic coding section 91 and the multiplexer 93) are the same as the operations of those in FIG. 16.

In the following, the operation of the hierarchical image coding device of FIG. 18 will be described in detail.

An input video signal is portioned into pictures etc., and inputted to the hierarchical image coding device in order of coding (depending on coding methods). The input video signal is supplied to the motion estimation/compensation circuit 60, the motion compensation circuit 61, the subtracter 67 and the subtracter 62. In the motion estimation/compensation circuit 60, data concerning reference images to be used for motion estimation (to which coding and local decoding have already been executed) is stored, and motion estimation between the input video signal and the reference image data is executed. Subsequently, macro block information (including information concerning prediction mode (intra mode, non-intra mode, etc.), motion vectors, etc.) is obtained with respect to each macro block. Subsequently, motion compensation is executed according to the macro block information, and thereby the first motion compensated prediction image signal is generated. The macro block information obtained here is also supplied to the motion compensation circuit 61, the quantizer 4, the inverse quantizer 5 and the code conversion section 14 for controlling them.

The first motion compensated prediction image signal is subtracted from the input video signal by the subtracter 67, and thereby the first prediction error image signal is generated. The first prediction error image signal is supplied to the reversible discrete cosine transform circuit 51 and the quantization control section 3. The reversible discrete cosine transform circuit 51, the quantizer 4, the inverse quantizer 5, the code conversion section 14, the multiplexer 54 and the quantization control section 3 operate in the same way as those in FIG. 16.

Meanwhile, in the motion compensation circuit 61, data concerning reference images to be used for motion estimation (to which coding has already been executed) is stored, and motion estimation is executed to the reference image data based on the macro block information outputted by the motion estimation/compensation circuit 60, and thereby the second motion compensated prediction image signal is generated. The second motion compensated prediction image signal is subtracted from the input video signal by the subtracter 62, and thereby the second prediction error image signal is generated. The second prediction error image signal is inputted to the reversible discrete cosine transform circuit 63 and reversible discrete cosine transform is executed to each block of the second prediction error image signal. The reversible discrete cosine transform circuit 63 executes reversible discrete cosine transform in the same way as the reversible discrete cosine transform circuit 51, and thereby the second reversible discrete cosine transform coefficients are obtained and outputted.

The second reversible discrete cosine transform coefficients are supplied to the subtracter 66. The subtracter 66 is also supplied with the inversely quantized values outputted by the inverse quantizer 5. The subtracter 66 subtracts the inversely quantized values from the second reversible discrete cosine transform coefficients respectively, and thereby obtains the coding residual values. The coding residual values obtained by the subtracter 66 are supplied to the buffer 94. The operations of the buffer 94, the quantization scale collection section 90, the arithmetic coding section 91, the coding residual value occurrence probability calculation section 92 and the multiplexer 93 are the same as the operations of those in FIG. 16.

The inversely quantized values outputted by the inverse quantizer 5 is also supplied to the reversible discrete cosine inverse transform circuit 65, in which inverse transformation of the reversible discrete cosine inverse transform is executed to each block of the inversely quantized values, and thereby the locally decoded prediction error image signal is generated and outputted. The locally decoded prediction error image signal is inputted to the adder 64 and thereby added to the first motion compensated prediction image signal outputted by the motion estimation/compensation circuit 60, thereby the locally decoded image signal is generated. The locally decoded image signal is supplied to the motion estimation/compensation circuit 60 and stored therein, as the reference image data to be used for subsequent motion estimation/compensation.

As described above, the hierarchical image coding device according to the tenth embodiment of the present invention is provided with two prediction loops. Therefore, even in the case where decoding is executed using the base layer bit-stream only (without the enhancement layer bit-stream), error accumulation in the decoded image can be reduced.

[Embodiment 11]

Figure 19:
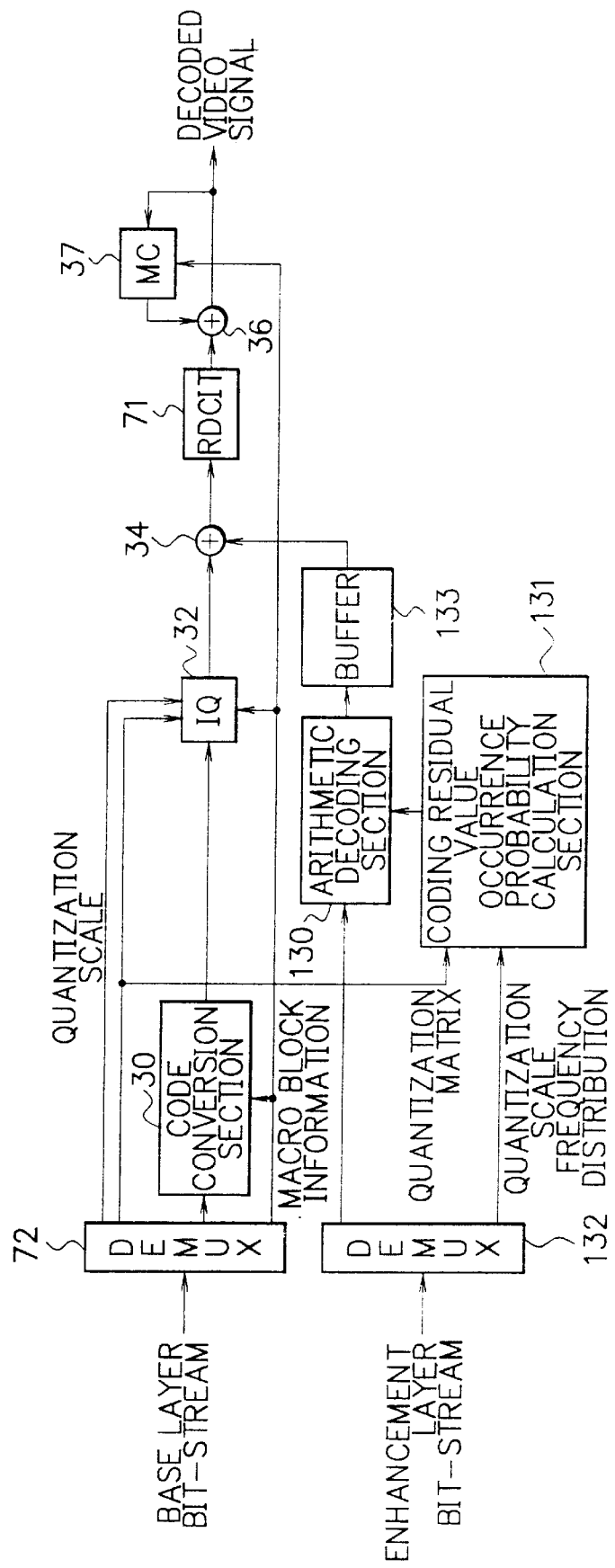
FIG. 19 is a circuit diagram showing a hierarchical image decoding device according to an eleventh embodiment of the present invention.

FIG. 19 is a circuit diagram showing a hierarchical image decoding device according to an eleventh embodiment of the present invention. The hierarchical image decoding device of FIG. 19 is a device for decoding the video signal (the base layer bit-stream and the enhancement layer bit-stream) which has been coded by the hierarchical image coding device of the ninth embodiment shown in FIG. 16 or the tenth embodiment shown in FIG. 18.

Referring to FIG. 19, the hierarchical image decoding device of the eleventh embodiment comprises demultiplexers 72 and 132, a code conversion sections 30, an inverse quantizer (de-quantizer) 32, adders 34 and 36, a reversible discrete cosine inverse transform circuit (RDCIT) 71, a motion compensation circuit (MC) 37, an arithmetic decoding section 130, a buffer 133. and a coding residual value occurrence probability calculation section 131.

Figure 2:
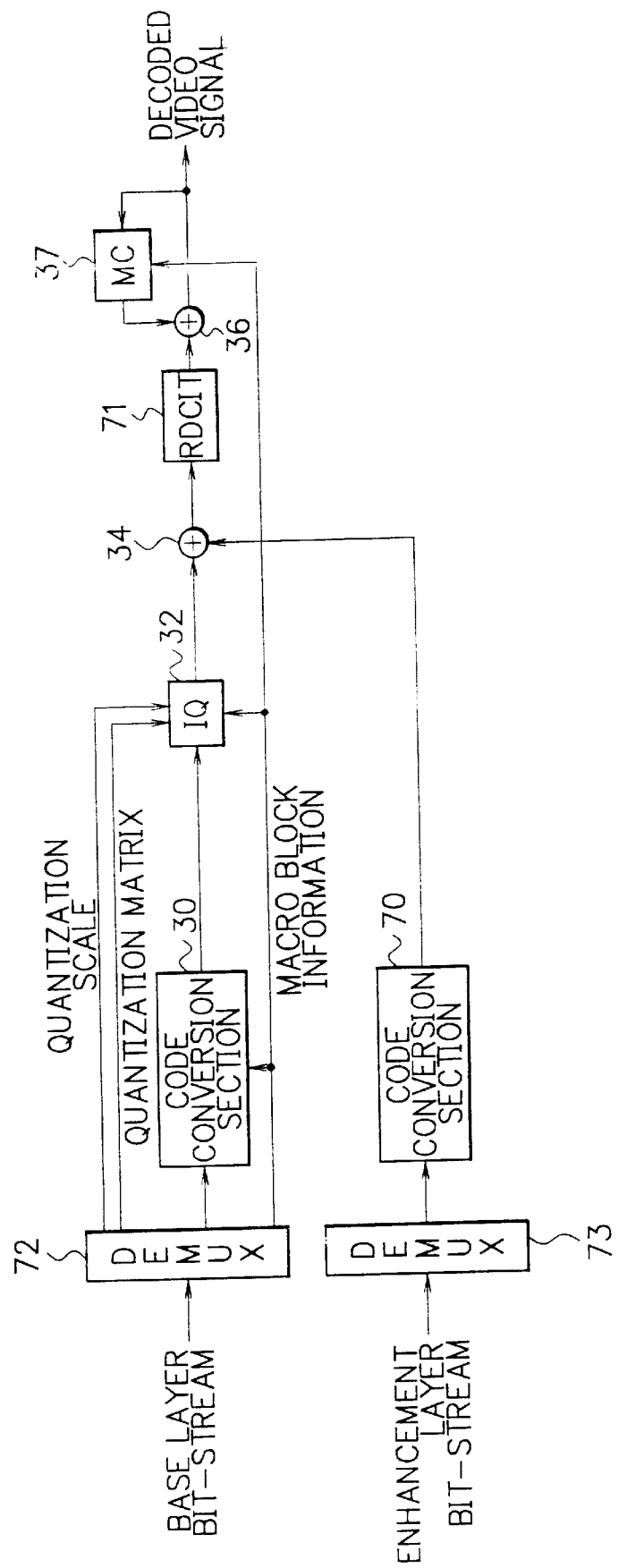
FIG. 2 is a circuit diagram showing an example of a hierarchical image decoding device for decoding a video signal which has been coded by the hierarchical image coding device of FIG. 1.

The demultiplexer 72, the code conversion section 30 and the inverse quantizer 32 are identical with those of the hierarchical image decoding device which has been shown in FIG. 2. The demultiplexer 132 demultiplexes the enhancement layer bit-stream into the coding residual value arithmetic code, the quantization scale frequency distribution and the additional information. The coding residual value occurrence probability calculation section 131 calculates and outputs the coding residual value occurrence probabilities (with respect to each possible value of each of the transform coefficients), based on the quantization scale frequency distribution outputted by the demultiplexer 132 and the quantization matrix outputted by the demultiplexer 72. The arithmetic decoding section 130 executes arithmetic decoding to the coding residual value arithmetic code outputted by the demultiplexer 132 based on the coding residual value occurrence probabilities outputted by the coding residual value occurrence probability calculation section 131, and outputs the result (coding residual values) to the buffer 133. The buffer 133 temporarily stores the coding residual values supplied from the arithmetic decoding section 130. The adder 34 adds the coding residual values outputted by the buffer 133 to the inversely quantized values outputted by the inverse quantizer 32 respectively, and outputs the result of the addition as reversible discrete cosine transform coefficients. The reversible discrete cosine inverse transform circuit 71, the adder 36, the motion compensation circuit 37 operate in the same way as those in the image decoding device which has been shown in FIG. 2.

The components of the hierarchical image decoding device of FIG. 19 are realized by, for example, one or more microprocessor units which are composed of one or more CPUs (Central Processing Units), ROM (Read Only Memory), RAM (Random Access Memory), etc. It is also possible to realize the components by software on a computer.

In the following, the operation of the hierarchical image decoding device of FIG. 19 will be described in detail.

The base layer bit-stream is inputted to the demultiplexer 72. The base layer bit-stream supplied to the demultiplexer 72 is demultiplexed into the variable length code of the quantized values, the quantization matrix, the quantization scale, the macro block information and the additional information, and temporarily stored in a buffer of the demultiplexer 72. Incidentally, if the demultiplexing by the demultiplexer 72 is impossible without variable length decoding by the code conversion section 30, it is also possible to combine the demultiplexer 72 and the code conversion section 30 together so that the demultiplexing and the variable length decoding will be executed simultaneously.

In the code conversion section 30, the variable length decoding is executed to the variable length code of the quantized values using a predetermined coding table, and thereby a one-dimensional quantized value sequence is obtained. Inverse scanning transform is further executed to the one-dimensional quantized value sequence, and thereby the quantized values are obtained. In the case where MPEG-2 variable length coding is executed in the hierarchical image coding device, the variable length code of the quantized values is converted into a combination of the 0-run length and the level according to an MPEG-2 coding table, and thereafter converted to the one-dimensional quantized value sequence, and to the quantized values. In the case where arithmetic coding is executed in the hierarchical image coding device, arithmetic decoding corresponding to the arithmetic coding is executed by the code conversion section 30. The quantized values obtained by the code conversion section 30 are supplied to the inverse quantizer 32, and inverse quantization is executed to the quantized values based on the quantization scale, the quantization matrix and the macro block information.

Meanwhile, the enhancement layer bit-stream is inputted to the demultiplexer 132, and demultiplexed into the coding residual value arithmetic code, the quantization scale frequency distribution and the additional information. The operation of the demultiplexer 132 is the same as that of the demultiplexer 132 in FIG. 13. The quantization scale frequency distribution and the quantization matrix obtained from the base layer bit-stream are supplied to the coding residual value occurrence probability calculation section 131, and thereby the coding residual value occurrence probabilities are calculated. The operation of the coding residual value occurrence probability calculation section 131 is the same as that of the coding residual value occurrence probability calculation section 131 in FIG. 13. Incidentally, the data concerning frequency distribution of each transform coefficient which is preliminarily stored in the coding residual value occurrence probability calculation section 131 is the same as the data stored in the coding residual value occurrence probability calculation section 92 of FIG. 16 or FIG. 18. The arithmetic decoding section 130 executes arithmetic decoding to the coding residual value arithmetic code supplied from the demultiplexer 132, based on the coding residual value occurrence probabilities supplied from the coding residual value occurrence probability calculation section 131, and outputs the result (coding residual values) to the buffer 133.

The inversely quantized values outputted by the inverse quantizer 32 is supplied to the adder 34. The adder 34 reads out corresponding coding residual values from the buffer 133 and adds the coding residual values to the inversely quantized values respectively, and thereby obtains the reversible discrete cosine transform coefficients. The reversible discrete cosine inverse transform circuit 71 executes inverse transformation of the reversible discrete cosine transform to each block of the reversible discrete cosine transform coefficients, and thereby generates the prediction error image signal. In the motion compensation circuit 37, data concerning reference images to be used for motion compensation (to which coding has already been executed) is stored, and motion compensation is executed to the reference image data based on the macro block information outputted by the demultiplexer 72. The adder 36 adds the prediction error image signal outputted by the reversible discrete cosine inverse transform circuit 71 to the motion compensated prediction image signal outputted by the motion compensation circuit 37, and thereby generates and outputs the decoded image signal.

As described above, by the hierarchical image decoding device according to the eleventh embodiment of the present invention, a lossless decoded image signal can be obtained from the base layer bit-stream and the enhancement layer bit-stream outputted by the hierarchical image coding device of the ninth embodiment (FIG. 16) or tenth embodiment (FIG. 18).

[Embodiment 12]

Figure 20:
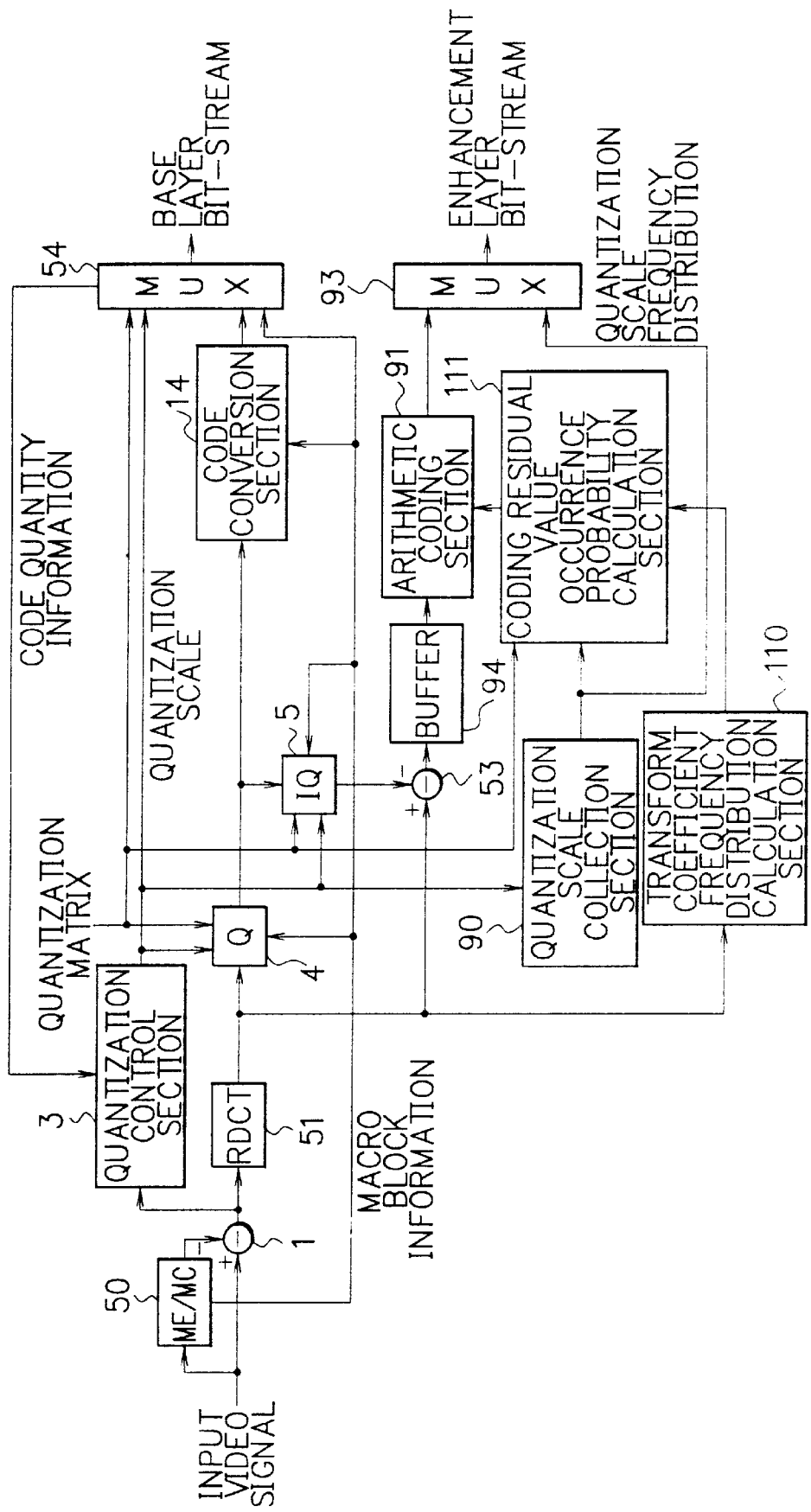
FIG. 20 is a circuit diagram showing a hierarchical image coding device according to a twelfth embodiment of the present invention.

FIG. 20 is a circuit diagram showing a hierarchical image coding device according to a twelfth embodiment of the present invention.

Referring to FIG. 20, the hierarchical image coding device of the twelfth embodiment is basically identical with the hierarchical image coding device of FIG. 16, except for the transform coefficient frequency distribution calculation section 110 and the coding residual value occurrence probability calculation section 111.

The transform coefficient frequency distribution calculation section 110 collects the transform coefficients outputted by the reversible discrete cosine transform circuit 51, and thereby obtains and outputs frequency distribution of each transform coefficient. The coding residual value occurrence probability calculation section 111 calculates and outputs the coding residual value occurrence probabilities, based on the quantization scale frequency distribution outputted by the quantization scale collection section 90, the quantization matrix, and the transform coefficient frequency distribution (with respect to each transform coefficient) outputted by the transform coefficient frequency distribution calculation section 110.

In the following, the operation of the hierarchical image coding device of FIG. 20 will be described.

The operation of the hierarchical image coding device of FIG. 20 is basically the same as that of the hierarchical image coding device of FIG. 16. However, the transform coefficients outputted by the reversible discrete cosine transform circuit 51 are also supplied to the transform coefficient frequency distribution calculation section 110. The operation of the transform coefficient frequency distribution calculation section 110 is the same as that which has been described referring to FIG. 14. The transform coefficient frequency distribution with respect to each transform coefficient outputted by the transform coefficient frequency distribution calculation section 110 is supplied to the coding residual value occurrence probability calculation section 111. The coding residual value occurrence probability calculation section 111 outputs the coding residual value occurrence probabilities in the same way as has been described referring to FIG. 14. The other components of the hierarchical image coding device of FIG. 20 operate in the same way as those of FIG. 16.

As described above, in the hierarchical image coding device according to the twelfth embodiment of the present invention, the frequency distribution of each transform coefficient is successively updated adaptively by the transform coefficient frequency distribution calculation section 110, based on the actually inputted image signal (the input video signal), similarly to the seventh embodiment of FIG. 14. Therefore, characteristics of the input video signal can be reflected and incorporated in the arithmetic coding, thereby coding efficiency can be improved further in comparison with the hierarchical image coding device of the ninth embodiment (FIG. 16).

[Embodiment 13]

Figure 21:
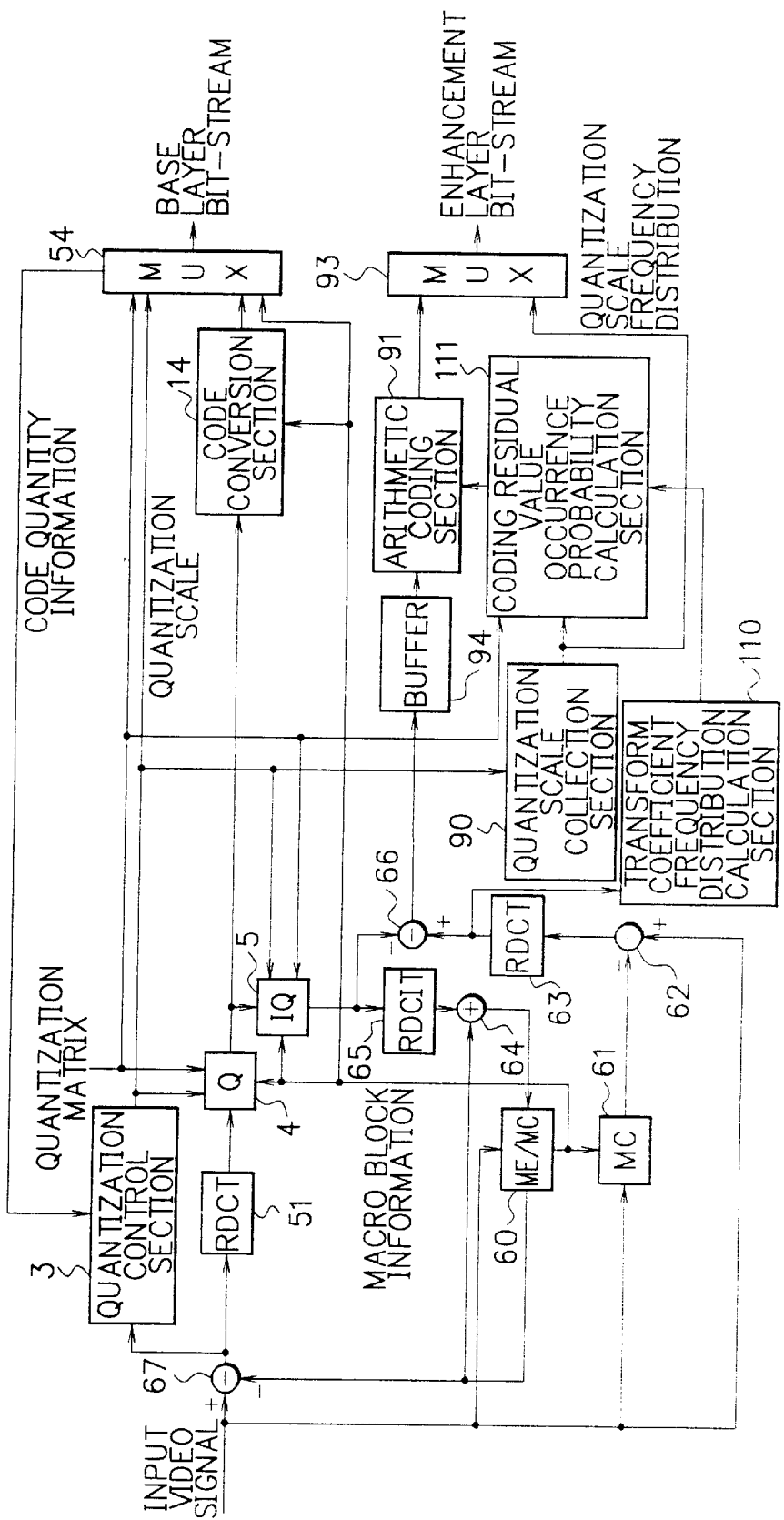
FIG. 21 is a circuit diagram showing a hierarchical image coding device according to a thirteenth embodiment of the present invention.

FIG. 21 is a circuit diagram showing a hierarchical image coding device according to a thirteenth embodiment of the present invention.

Referring to FIG. 21, the hierarchical image coding device of the thirteenth embodiment is basically identical with the hierarchical image coding device of FIG. 18, except for the transform coefficient frequency distribution calculation section 110 and the coding residual value occurrence probability calculation section 111.

The transform coefficient frequency distribution calculation section 110 collects the transform coefficients outputted by the reversible discrete cosine transform circuit 63, and thereby obtains and outputs frequency distribution of each transform coefficient. The coding residual value occurrence probability calculation section 111 calculates and outputs the coding residual value occurrence probabilities, based on the quantization scale frequency distribution outputted by the quantization scale collection section 90, the quantization matrix, and the transform coefficient frequency distribution (with respect to each transform coefficient) outputted by the transform coefficient frequency distribution calculation section 110.

In the following, the operation of the hierarchical image coding device of FIG. 21 will be described.

The operation of the hierarchical image coding device of FIG. 21 is basically the same as that of the hierarchical image coding device of FIG. 18. However, the transform coefficients outputted by the reversible discrete cosine transform circuit 63 are also supplied to the transform coefficient frequency distribution calculation section 110. The operation of the transform coefficient frequency distribution calculation section 110 is the same as that which has been described referring to FIG. 14. The transform coefficient frequency distribution with respect to each transform coefficient outputted by the transform coefficient frequency distribution calculation section 110 is supplied to the coding residual value occurrence probability calculation section 111. The coding residual value occurrence probability calculation section 111 outputs the coding residual value occurrence probabilities in the same way as has been described referring to FIG. 14. The other components of the hierarchical image coding device of FIG. 21 operate in the same way as those of FIG. 18.

As described above, in the hierarchical image coding device according to the thirteenth embodiment of the present invention, the frequency distribution of each transform coefficient is successively updated adaptively by the transform coefficient frequency distribution calculation section 110, based on the actually inputted image signal (the input video signal), similarly to the seventh embodiment of FIG. 14. Therefore, characteristics of the input video signal can be reflected and incorporated in the arithmetic coding, thereby coding efficiency can be improved further in comparison with the hierarchical image coding device of the tenth embodiment (FIG. 18).

[Embodiment 14]

Figure 22:
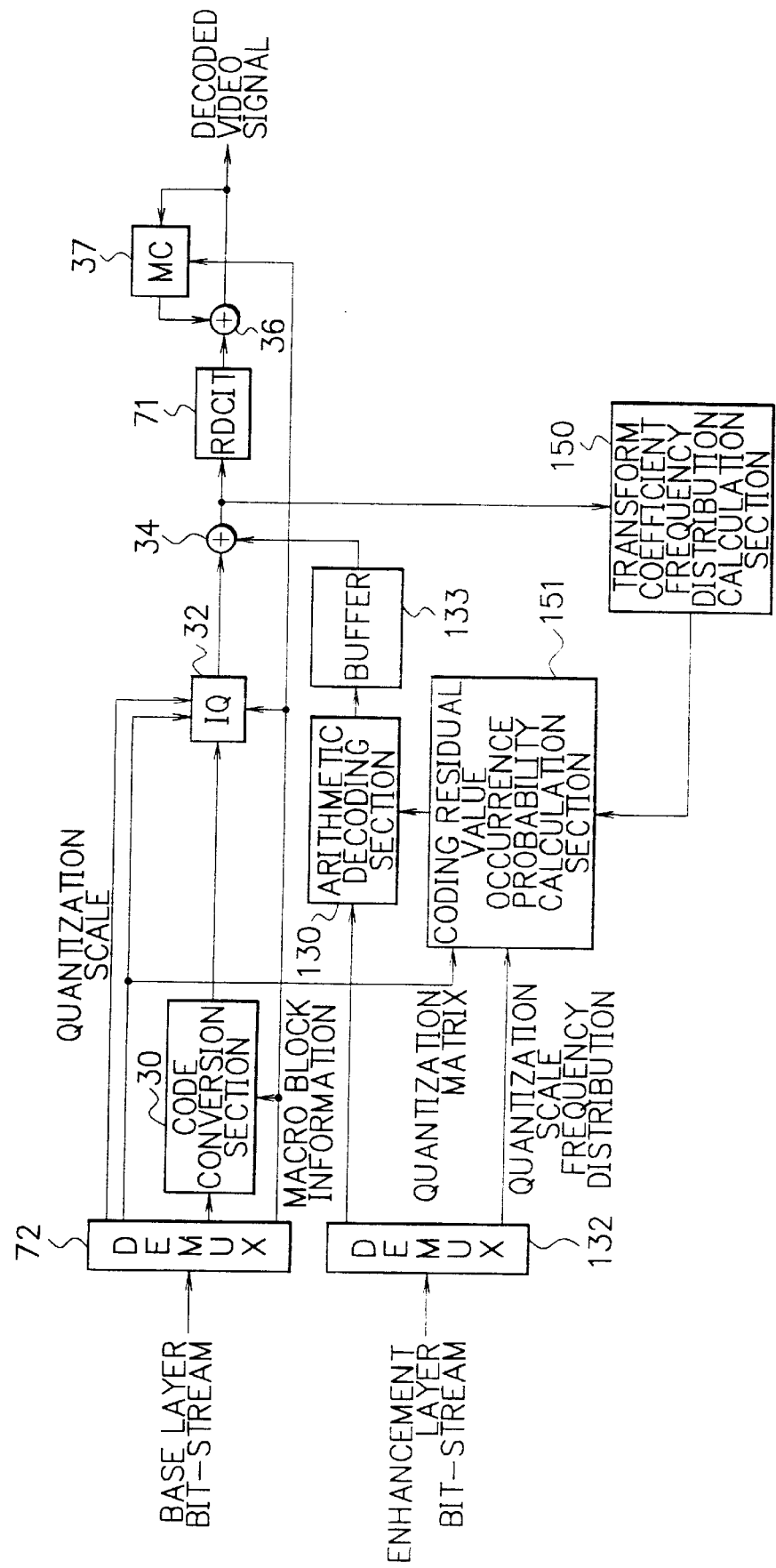
FIG. 22 is a circuit diagram showing a hierarchical image decoding device according to a fourteenth embodiment of the present invention.

FIG. 22 is a circuit diagram showing a hierarchical image decoding device according to a fourteenth embodiment of the present invention. The hierarchical image decoding device of FIG. 22 is a device for decoding the video signal (the base layer bit-stream and the enhancement layer bitstream) which has been coded by the hierarchical image coding device of the twelfth embodiment shown in FIG. 20 or the thirteenth embodiment shown in FIG. 21.

Referring to FIG. 22, the hierarchical image decoding device of the fourteenth embodiment is basically identical with the hierarchical image decoding device of FIG. 19, except for the transform coefficient frequency distribution calculation section 150 and the coding residual value occurrence probability calculation section 151.

The transform coefficient frequency distribution calculation section 150 collects the transform coefficients outputted by the adder 34, and thereby obtains and outputs frequency distribution of each transform coefficient. The coding residual value occurrence probability calculation section 151 calculates and outputs the coding residual value occurrence probabilities, based on the quantization scale frequency distribution outputted by the demultiplexer 132, the quantization matrix outputted by the demultiplexer 72, and the transform coefficient frequency distribution outputted by the transform coefficient frequency distribution calculation section 150.

In the following, the operation of the hierarchical image decoding device of FIG. 22 will be described.

The operation of the hierarchical image decoding device of FIG. 22 is basically the same as that of the hierarchical image decoding device of FIG. 19. However, the transform coefficients outputted by the adder 34 are also supplied to the transform coefficient frequency distribution calculation section 150. The operation of the transform coefficient frequency distribution calculation section 150 is the same as that which has been described referring to FIG. 15. The transform coefficient frequency distribution with respect to each transform coefficient outputted by the transform coefficient frequency distribution calculation section 150 is supplied to the coding residual value occurrence probability calculation section 151. The coding residual value occurrence probability calculation section 151 outputs the coding residual value occurrence probabilities in the same way as has been described referring to FIG. 15. The other components of the hierarchical image decoding device of FIG. 22 operate in the same way as those of FIG. 19.

As described above, by the hierarchical image decoding device according to the fourteenth embodiment of the present invention, a lossless decoded image signal can be obtained from the base layer bit-stream and the enhancement layer bit-stream outputted by the hierarchical image coding device of the twelfth embodiment (FIG. 20) or the thirteenth embodiment (FIG. 21).

Incidentally, the transform coefficient frequency distribution with respect to each transform coefficient outputted by the transform w coefficient frequency distribution calculation section 150 becomes exactly the same as the transform coefficient frequency distribution with respect to each transform coefficient which has been outputted by the transform coefficient frequency distribution calculation section 110 of the hierarchical image coding device of FIG. 20 or FIG. 21, since the reversible discrete cosine transform circuit 51 in the hierarchical image coding device of FIG. 20 or the reversible discrete cosine transform circuit 63 in the hierarchical image coding device of FIG. 21 executes reversible transform (reversible discrete cosine transform etc.) and thereby transform coefficients of integers (discrete values) are obtained and rounding error can be avoided. By this, the coding residual value occurrence probabilities outputted by the coding residual value occurrence probability calculation section 151 become the same as the coding residual value occurrence probabilities which have been outputted by the coding residual value occurrence probability calculation section 111, and the coding residual values outputted by the arithmetic decoding section 130 become the same as the coding residual values which have been inputted to the arithmetic coding section 91, thereby the lossless decoding (regeneration of the original image signal) is realized.

[Embodiment 15]

Figure 23:
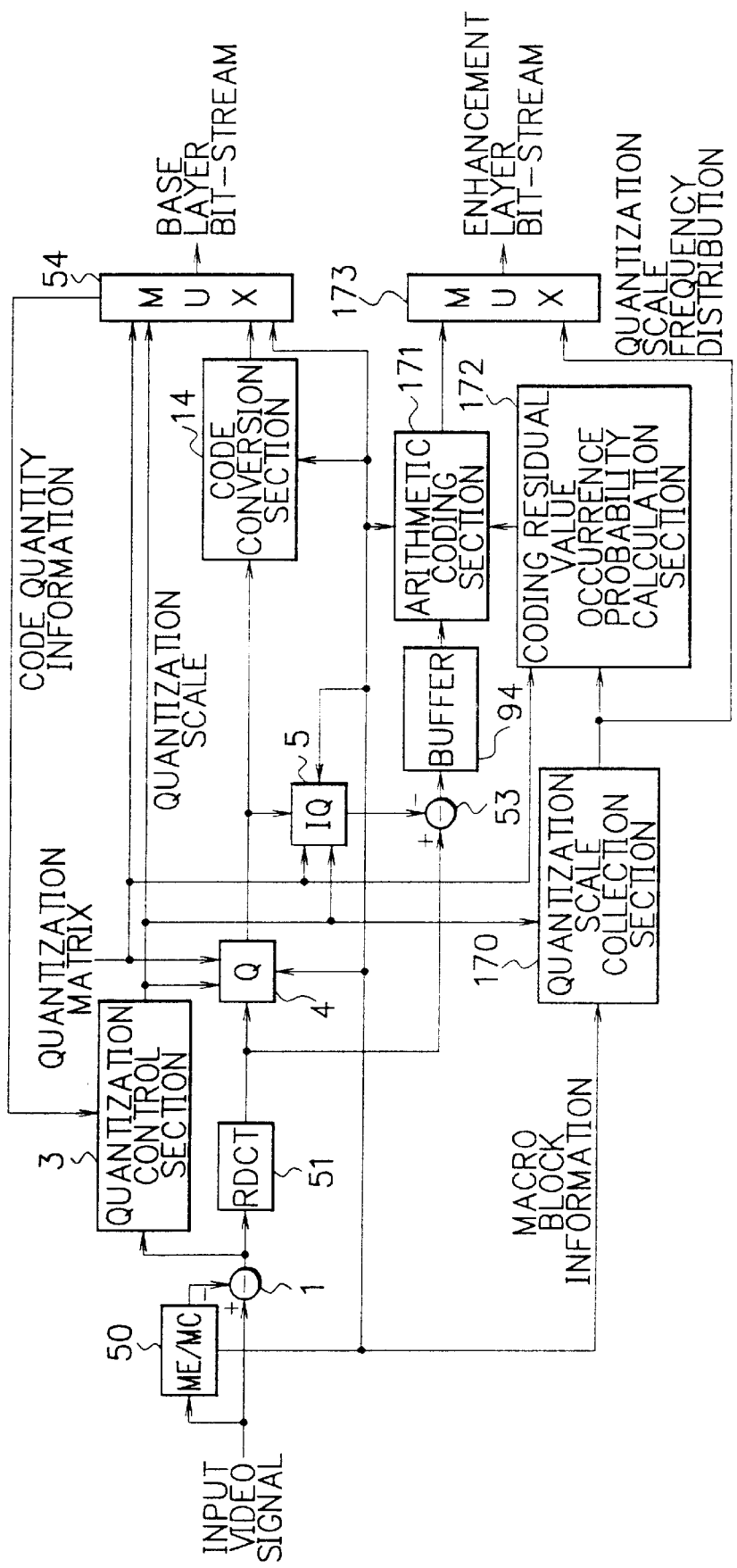
FIG. 23 is a circuit diagram showing a hierarchical image coding device according to a fifteenth embodiment of the present invention.

FIG. 23 is a circuit diagram showing a hierarchical image coding device according to a fifteenth embodiment of the present invention.

Referring to FIG. 23, the hierarchical image coding device of the fifteenth embodiment is basically identical with the hierarchical image coding device of FIG. 16, except for the quantization scale collection section 170, the arithmetic coding section 171, the coding residual value occurrence probability calculation section 172 and the multiplexer 173.

The quantization scale collection section 170 collects the quantization scales outputted by the quantization control section 3, and thereby obtains and outputs the quantization scale frequency distribution, based on the quantization scales outputted by the quantization control section 3 and the macro block information outputted by the motion estimation/compensation circuit 50. The operation of the quantization scale collection section 170 of the fifteenth embodiment will be described later. The coding residual value occurrence probability calculation section 172 calculates and outputs the coding residual value occurrence probabilities based on the quantization scale frequency distribution outputted by the quantization scale collection section 170 and the quantization matrix.

The arithmetic coding section 171 reads out the coding residual values from the buffer 94 and executes arithmetic coding to the coding residual values based on the macro block information outputted by the motion estimation/compensation circuit 50 and the coding residual value occurrence probabilities outputted by the coding residual value occurrence probability calculation section 172, and outputs the result of the arithmetic coding as the coding residual value arithmetic code. The multiplexer 173 multiplexes the coding residual value arithmetic code outputted by the arithmetic coding section 171, the quantization scale frequency distribution outputted by the quantization scale collection section 170, and other additional information, and thereby generates and outputs the enhancement layer bit-stream.

In the following, the operation of the hierarchical image coding device of FIG. 23 will be described in detail.

The operation of the hierarchical image coding device of FIG. 23 is basically the same as that of the hierarchical image coding device of FIG. 16, except for the operations of the quantization scale collection section 170, the arithmetic coding section 171, the coding residual value occurrence probability calculation section 172 and the multiplexer 173.

In the quantization scale collection section 170, the quantization scales outputted by the quantization control section 3 are collected. In the collection, the number of times of occurrence with respect to each possible value of the quantization scale is counted during every predetermined coding period. In this counting, it is judged whether the inputted quantization scale is that of an intra macro block or that of a non-intra macro block, based on the macro block information supplied from the motion estimation/compensation circuit 50, and the number of times concerning the intra macro blocks and the number of times concerning the non-intra macro blocks are counted separately. The result of the counting concerning the intra macro blocks and the result of the counting concerning the non-intra macro blocks (quantization scale frequency distribution concerning intra macro blocks and quantization scale frequency distribution concerning non-intra macro blocks) are outputted to the coding residual value occurrence probability calculation section 172 and the multiplexer 173 as the quantization scale frequency distribution.

In the coding residual value occurrence probability calculation section 172, occurrence probability of each possible value with respect to each of the coding residual values (with respect to each of the frequency indexes (i,j)) is calculated with respect to intra macro blocks and non-intra macro blocks, based on the quantization scale frequency distribution concerning intra macro blocks and the quantization scale frequency distribution concerning non-intra macro blocks supplied from the quantization scale collection section 170 and frequency distribution of each transform coefficient concerning intra macro blocks and frequency distribution of each transform coefficient concerning non-intra macro blocks which have preliminarily been stored in the coding residual value occurrence probability calculation section 172. Details of calculation of the coding residual value occurrence probabilities are basically the same as have been explained as to the coding residual value occurrence probability calculation section 92 of FIG. 5, except that the coding residual value occurrence probability calculation section 172 calculates both coding residual value occurrence probabilities concerning intra macro blocks and coding residual value occurrence probabilities concerning non-intra macro blocks. The result is supplied to the arithmetic coding section 171.

In the arithmetic coding section 171, coding residual values corresponding to each of the frequency indexes (i,j) are read out from the buffer 94, and arithmetic coding is executed to the coding residual values. In the arithmetic coding, it is judged whether the coding residual values to be encoded are those concerning intra macro blocks or those concerning non-intra macro blocks based on the macro block information supplied from the motion estimation/compensation circuit 50. In the case of coding residual values concerning intra macro blocks, the coding residual values are encoded using the coding residual value occurrence probabilities concerning intra macro blocks. And in the case of coding residual values concerning non-intra macro blocks, the coding residual values are encoded using the coding residual value occurrence probabilities concerning non-intra macro blocks. The result (the coding residual value arithmetic code) is outputted to the multiplexer 173.

And in the multiplexer 173, the coding residual value arithmetic code outputted by the arithmetic coding section 171, the quantization scale frequency distribution (the quantization scale frequency distribution concerning intra macro blocks and the quantization scale frequency distribution concerning non-intra macro blocks) outputted by the quantization scale collection section 170, and other additional information are multiplexed, and thereby the enhancement layer bit-stream is generated and outputted.

Incidentally, the hierarchical image coding device of FIG. 23 is obtained by modifying the hierarchical image coding device of FIG. 16. It is also possible to modify the hierarchical image coding device of FIG. 18 in the same way.

As described above, in the hierarchical image coding device according to the fifteenth embodiment of the present invention, arithmetic coding of the coding residual values concerning intra macro blocks and arithmetic coding of the coding residual values concerning non-intra macro blocks are executed using different coding residual value occurrence probabilities (coding residual value occurrence probabilities concerning intra macro blocks and coding residual value occurrence probabilities concerning non-intra macro blocks), since characteristics of coding residual values of the transform coefficients are different between intra macro blocks and non-intra macro blocks. Therefore, coding efficiency can be improved further in comparison with the hierarchical image coding device of the ninth embodiment (FIG. 16) or the tenth embodiment (FIG. 18).

[Embodiment 16]

FIG. 24 is a circuit diagram showing a hierarchical image decoding device according to a sixteenth embodiment of the present invention. The hierarchical image decoding device of FIG. 24 is a device for decoding the video signal (the base layer bit-stream and the enhancement layer bit-stream) which has been coded by the hierarchical image coding device of the above fifteenth embodiment shown in FIG. 23.

Referring to FIG. 24, the hierarchical image decoding device of the sixteenth embodiment is basically identical with the hierarchical image decoding device of FIG. 19, except for the arithmetic decoding section 190, the coding residual value occurrence probability calculation section 191 and the demultiplexer 192.

The demultiplexer 192 demultiplexes the enhancement layer bit-stream into the coding residual value arithmetic code, the quantization scale frequency distribution and the additional information. The coding residual value occurrence probability calculation section 191 calculates and outputs the coding residual value occurrence probabilities based on the quantization scale frequency distribution outputted by the demultiplexer 192 and the quantization matrix outputted by the demultiplexer 72. The arithmetic decoding section 190 executes arithmetic decoding to the coding residual value arithmetic code outputted by the demultiplexer 192, based on the macro block information outputted by the demultiplexer 72 and the coding residual value occurrence probabilities outputted by the coding residual value occurrence probability calculation section 191, and outputs the result of the arithmetic decoding (coding residual values).

In the following, the operation of the hierarchical image decoding device of FIG. 24 will be described.

The operation of the hierarchical image decoding device of FIG. 24 is basically the same as that of the hierarchical image decoding device of FIG. 19, except for the operations of the arithmetic decoding section 190, the coding residual value occurrence probability calculation section 191 and the demultiplexer 192. The enhancement layer bit-stream is inputted to the demultiplexer 192. The demultiplexer 192 demultiplexes the enhancement layer bit-stream into the coding residual value arithmetic code, the quantization scale frequency distribution concerning intra macro blocks, the quantization scale frequency distribution concerning non-intra macro blocks and the additional information, and temporarily stores them in its buffer. Incidentally, if the demultiplexing by the demultiplexer 192 is impossible without arithmetic decoding by the arithmetic decoding section 190, it is also possible to combine the demultiplexer 192 and the arithmetic decoding section 190 together so that the demultiplexing and the arithmetic decoding will be executed simultaneously.

The quantization scale frequency distribution (i.e. the quantization scale frequency distribution concerning intra macro blocks and the quantization scale frequency distribution concerning non-intra macro blocks) outputted by the demultiplexer 192 and the quantization matrix obtained from the base layer bit-stream are supplied to the coding residual value occurrence probability calculation section 191 to be used for calculating the coding residual value occurrence probabilities. The coding residual value occurrence probability calculation section 191 calculates and outputs the coding residual value occurrence probabilities concerning intra macro blocks and the coding residual value occurrence probabilities concerning non-intra macro blocks, in the same way as the coding residual value occurrence probability calculation section 172 of FIG. 23. Incidentally, the frequency distribution of each transform coefficient concerning intra macro blocks and the frequency distribution of each transform coefficient concerning non-intra macro blocks preliminarily stored in the coding residual value occurrence probability calculation section 191 are the same as those stored in the coding residual value occurrence probability calculation section 172 of FIG. 23.

After the coding residual value occurrence probabilities concerning intra macro blocks and the coding residual value occurrence probabilities concerning non-intra macro blocks are supplied from the coding residual value occurrence probability calculation section 191, the arithmetic decoding section 190 reads the coding residual value arithmetic code out of the demultiplexer 192 and executes arithmetic decoding to the coding residual value arithmetic code. In the arithmetic decoding, it is judged whether coding residual value arithmetic code to be decoded is that concerning intra macro blocks or that concerning non-intra macro blocks, based on the macro block information supplied from the demultiplexer 72. If the order of arithmetic coding (of coding residual values concerning intra macro blocks and coding residual values concerning non-intra macro blocks) is fixed in the arithmetic coding section 171 of FIG. 23, the above judgment becomes unnecessary or is simplified. In the case of coding residual value arithmetic code concerning intra macro blocks, the coding residual value arithmetic code is decoded using the coding residual value occurrence probabilities concerning intra macro blocks. And in the case of coding residual value arithmetic code concerning non-intra macro blocks, the coding residual value arithmetic code is decoded using the coding residual value occurrence probabilities concerning non-intra macro blocks. The coding residual value arithmetic code is decoded by the arithmetic decoding section 190 as above, and thereby the coding residual values are obtained.

As described above, by the hierarchical image decoding device according to the sixteenth embodiment of the present invention, a lossless decoded image signal can be obtained from the base layer bit-stream and the enhancement layer bit-stream outputted by the hierarchical image coding device of the fifteenth embodiment (FIG. 23).

[Embodiment 17]

Figure 25:
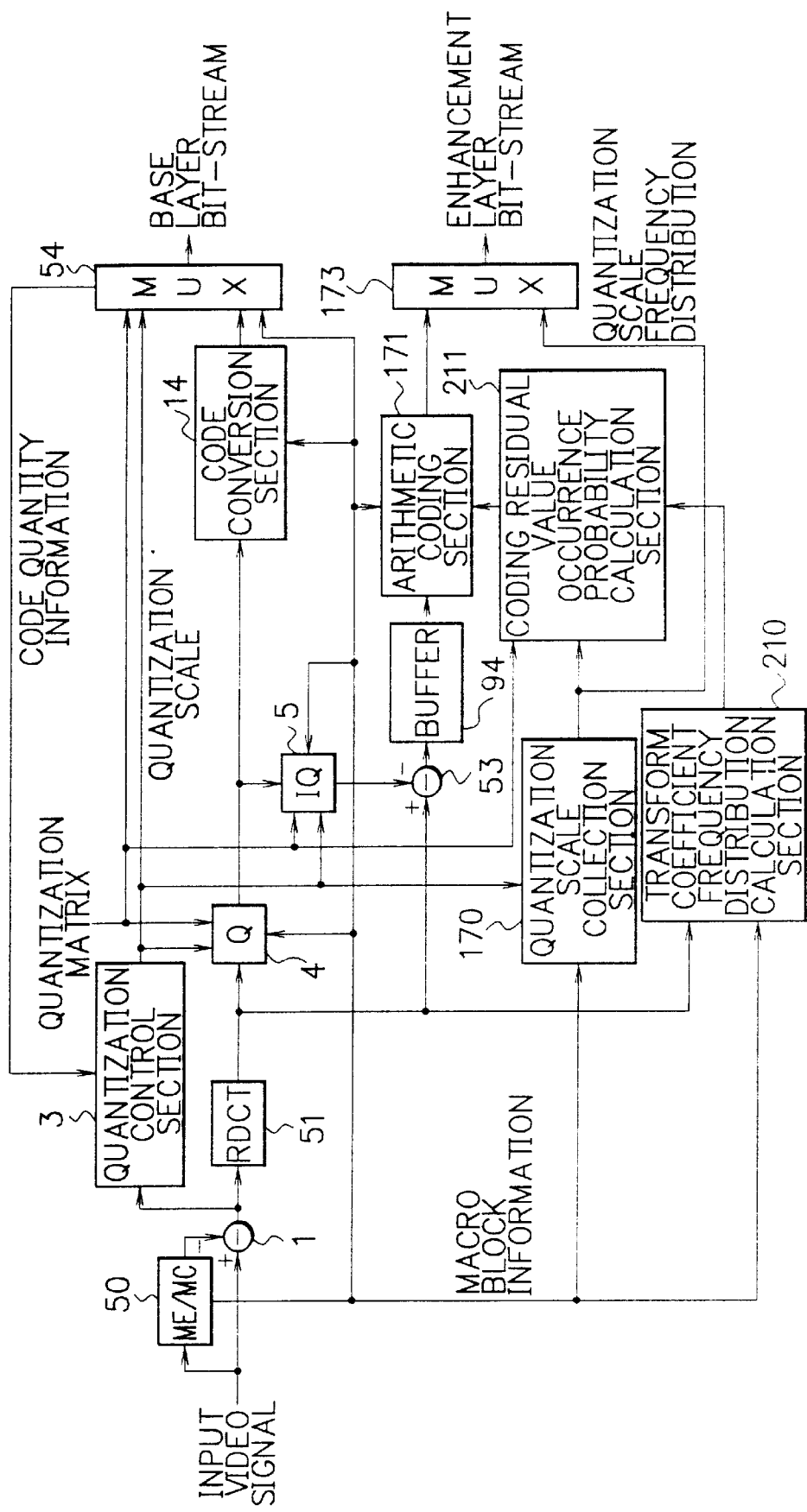
FIG. 25 is a circuit diagram showing a hierarchical image coding device according to a seventeenth embodiment of the present invention.

FIG. 25 is a circuit diagram showing a hierarchical image coding device according to a seventeenth embodiment of the present invention.

Referring to FIG. 25, the hierarchical image coding device of the seventeenth embodiment is basically identical with the hierarchical image coding device of FIG. 23, except for the transform coefficient frequency distribution calculation section 210 and the coding residual value occurrence probability calculation section 211.

The transform coefficient frequency distribution calculation section 210 collects the transform coefficients outputted by the reversible discrete cosine transform circuit 51 based on the macro block information outputted by the motion estimation/compensation circuit 50, and thereby obtains and outputs frequency distribution of each transform coefficient. The coding residual value occurrence probability calculation section 211 calculates and outputs the coding residual value occurrence probabilities based on the quantization scale frequency distribution outputted by the quantization scale collection section 170, the quantization matrix, and the transform coefficient frequency distribution (with respect to each of the transform coefficients (i.e. with respect to each of the frequency indexes (i,j))) outputted by the transform coefficient frequency distribution calculation section 210.

In the following, the operation of the hierarchical image coding device of FIG. 25 will be described in detail.

The operation of the hierarchical image coding device of FIG. 25 is basically the same as that of the hierarchical image coding device of FIG. 23. However, the transform coefficients outputted by the reversible discrete cosine transform circuit 51 are also supplied to the transform coefficient frequency distribution calculation section 210.

The transform coefficient frequency distribution calculation section 210 collects the (reversible discrete cosine) transform coefficients corresponding to each of the frequency indexes (i,j), and counts the number of times of occurrence of each possible value of the transform coefficient corresponding to each frequency index (i,j), at predetermined coding periods. In the counting, it is judged whether the transform coefficient supplied from the reversible discrete cosine transform circuit 51 is a transform coefficient concerning intra macro blocks or a transform coefficient concerning non-intra macro blocks, based on the macro block information supplied from the motion estimation/compensation circuit 50, and thereby counting concerning intra macro blocks and counting concerning non-intra macro blocks are executed separately. By the counting, transform coefficient frequency distribution (with respect to each of the frequency indexes (i,j)) concerning intra macro blocks and transform coefficient frequency distribution (with respect to each of the frequency indexes (i,j)) concerning non-intra macro blocks are obtained and outputted to the coding residual value occurrence probability calculation section 211.

The coding residual value occurrence probability calculation section 211 calculates and outputs the coding residual value occurrence probabilities (i.e. the coding residual value occurrence probabilities concerning intra macro blocks and the coding residual value occurrence probabilities concerning non-intra macro blocks), basically in the same way as the coding residual value occurrence probability calculation section 172 of FIG. 23. However, the coding residual value occurrence probability calculation section 211 updates its data concerning frequency distribution of each transform coefficient using the transform coefficient frequency distribution concerning intra macro blocks and the transform coefficient frequency distribution concerning non-intra macro blocks supplied from the transform coefficient frequency distribution calculation section 210. The updated transform coefficient frequency distribution is used for calculation of the coding residual value occurrence probabilities in the next coding period. The update of the transform coefficient frequency distribution can be executed, for example, by the method which has been explained with respect to the coding residual value occurrence probability calculation section 111 of FIG. 14. The other components of the hierarchical image coding device of FIG. 25 operate in the same way as those in FIG. 23.

Incidentally, while the hierarchical image coding device of FIG. 25 is obtained by modifying the hierarchical image coding device of FIG. 20, it is also possible to modify the hierarchical image coding device of FIG. 21 in the same way.

As described above, in the hierarchical image coding device according to the seventeenth embodiment of the present invention, the frequency distribution of each transform coefficient is successively updated adaptively, based on the actually inputted image signal (the input video signal), therefore, characteristics of the input video signal can be reflected and incorporated in the arithmetic coding, thereby coding efficiency can be improved. Further, arithmetic coding of the coding residual values concerning intra macro blocks and arithmetic coding of the coding residual values concerning non-intra macro blocks are executed using different coding residual value occurrence probabilities (coding residual value occurrence probabilities concerning intra macro blocks and coding residual value occurrence probabilities concerning non-intra macro blocks), since characteristics of coding residual values of the transform coefficients are different between intra macro blocks and non-intra macro blocks. Therefore, coding efficiency can be further improved.

[Embodiment 18]

Figure 26:
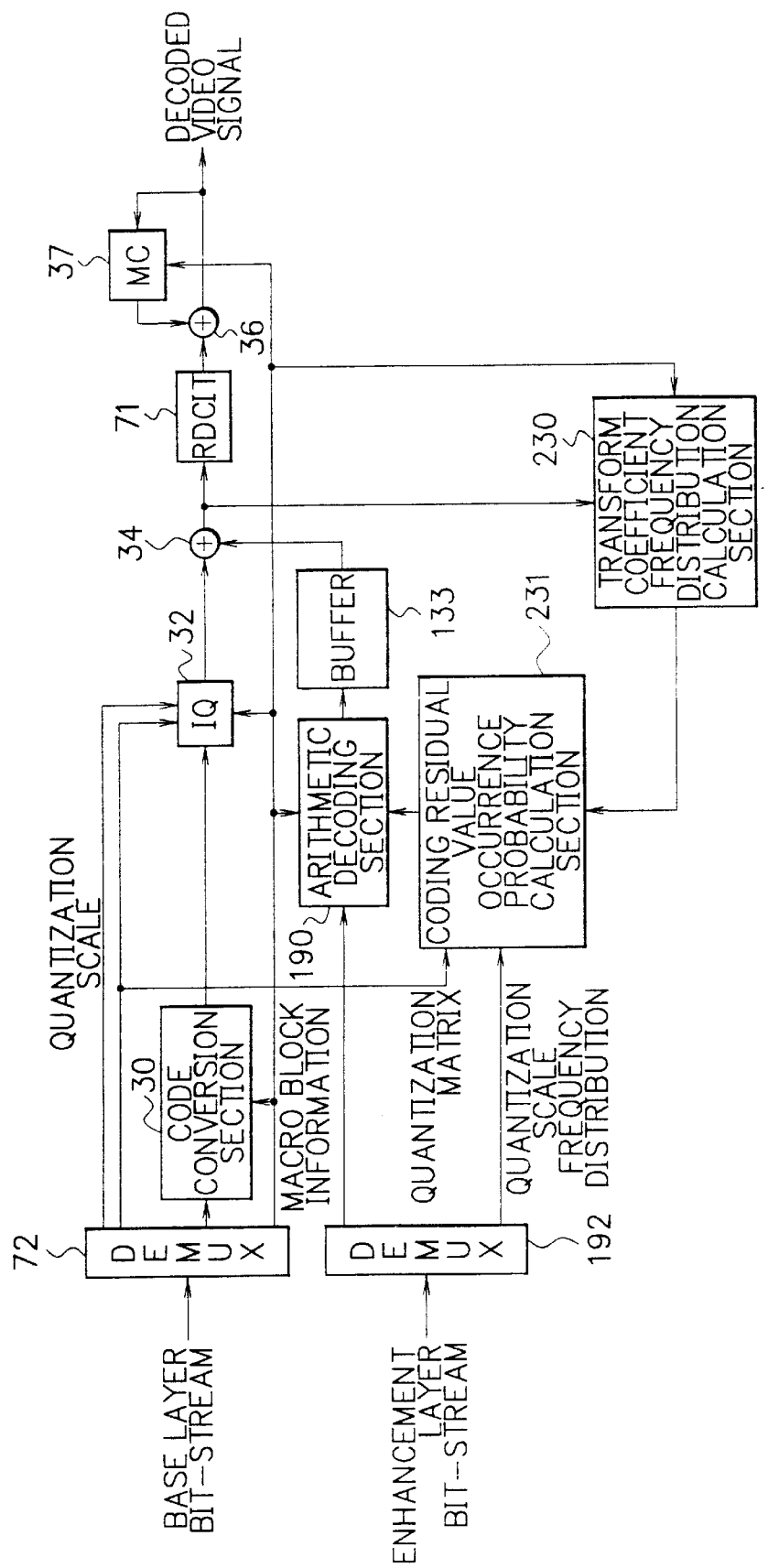
FIG. 26 is a circuit diagram showing a hierarchical image decoding device according to an eighteenth embodiment of the present invention.

FIG. 26 is a circuit diagram showing a hierarchical image decoding device according to an eighteenth embodiment of the present invention. The hierarchical image decoding device of FIG. 26 is a device for decoding the video signal (the base layer bit-stream and the enhancement layer bit-stream) which has been coded by the hierarchical image coding device of the above seventeenth embodiment shown in FIG. 25.

Referring to FIG. 26, the hierarchical image decoding device of the eighteenth embodiment is basically identical with the hierarchical image decoding device of FIG. 24, except for the transform coefficient frequency distribution calculation section 230 and the coding residual value occurrence probability calculation section 231.

The transform coefficient frequency distribution calculation section 230 collects the transform coefficients outputted by the adder 34 based on the macro block information outputted by the demultiplexer 72, and thereby obtains and outputs frequency distribution of each transform coefficient. The coding residual value occurrence probability calculation section 231 calculates and outputs the coding residual value occurrence probabilities based on the quantization scale frequency distribution outputted by the demultiplexer 192, the quantization matrix outputted by the demultiplexer 72, and the transform coefficient frequency distribution outputted by the transform coefficient frequency distribution calculation section 230.

In the following, the operation of the hierarchical image decoding device of FIG. 26 will be described.

The operation of the hierarchical image decoding device of FIG. 26 is basically the same as that of the hierarchical image decoding device of FIG. 24. However, the transform coefficients outputted by the adder 34 are also supplied to the transform coefficient frequency distribution calculation section 230. The transform coefficient frequency distribution calculation section 230 calculates the transform coefficient frequency distribution (the transform coefficient frequency distribution concerning intra macro blocks and the transform coefficient frequency distribution concerning non-intra macro blocks), in the same way as the transform coefficient frequency distribution calculation section 210 of FIG. 25, and outputs the transform coefficient frequency distribution to the coding residual value occurrence probability calculation section 231. The coding residual value occurrence probability calculation section 231 calculates and outputs the coding residual value occurrence probabilities (i.e. the coding residual value occurrence probabilities concerning intra macro blocks and the coding residual value occurrence probabilities concerning non-intra macro blocks) in the same way as the coding residual value occurrence probability calculation section 211 of FIG. 25. In the coding residual value occurrence probability calculation section 231, data concerning frequency distribution of each transform coefficient is successively updated using the transform coefficient frequency distribution concerning intra macro blocks and the transform coefficient frequency distribution concerning non-intra macro blocks supplied from the transform coefficient frequency distribution calculation section 230. The operations of the other components of the hierarchical image decoding device of FIG. 26 are basically the same as those in FIG. 24.

As described above, by the hierarchical image decoding device according to the eighteenth embodiment of the present invention, a lossless decoded image signal can be obtained from the base layer bit-stream and the enhancement layer bit-stream outputted by the hierarchical image coding device of the seventeenth embodiment (FIG. 25).

As set forth hereinabove, in the hierarchical image coding devices and the hierarchical image coding method according to the present invention, the coding residual value occurrence probabilities are calculated using the quantization information (the quantization scale frequency distribution and the quantization matrix, for example), and coding (arithmetic coding etc.) of the coding residual values is adaptively executed using the coding residual value occurrence probabilities, thereby coding efficiency of the enhancement layer bit-stream is improved and total code quantity can be decreased.

The quantization scales actually used for quantization of the transform coefficients are collected and the quantization scale frequency distribution is obtained, and the calculation of the coding residual value occurrence probabilities is executed adaptively using the quantization scale frequency distribution. Therefore, the coding efficiency of the enhancement layer can be maintained high regardless of the quantization executed in the base layer.

A reversible hierarchical image coding device that is compatible with MPEG-2 can also be constructed easily according to the present invention, by employing the coding method according to MPEG-2 for the base layer coding method. In such cases, the transform coefficients obtained by the reversible discrete cosine transform become close to transform coefficients which are obtained by ordinary discrete cosine transform, and thus regeneration of the original image signal with little loss is realized by decoding the base layer bit-stream using an ordinary MPEG-2 image decoding device.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A hierarchical image coding device for encoding an original image signal hierarchically, comprising:
   a first coding means for encoding the original image signal and outputting a base layer bit-stream, quantization information and coding residual values;
   a coding residual value occurrence probability calculation means for calculating occurrence probability of each possible value of each of the coding residual values, using the quantization information;
   a second coding means for encoding the coding residual values based on the coding residual value occurrence probabilities calculated by the coding residual value occurrence probability calculation means and thereby outputting coding residual value code; and a multiplexing means for multiplexing the coding residual value code and the quantization information, and thereby generating and outputting an enhancement layer bit-stream.

2. A hierarchical image coding device as claimed in claim 1, wherein:

the coding residual values are coding residual values which occur when the first coding means executes quantization to transform coefficients which are obtained by executing reversible transform to the original image signal, and the quantization information which is outputted by the first coding means and multiplexed by the multiplexing means into the enhancement layer bit-stream includes quantization scale frequency distribution and a quantization matrix, and the coding residual value occurrence probability calculation means calculates the coding residual value occurrence probabilities, based on the quantization scale frequency distribution, the quantization matrix, and frequency distribution of each transform coefficient which has preliminarily been prepared, and the second coding means executes variable length coding to the coding residual values based on the coding residual value occurrence probabilities, in which variable length coding of coding residual values concerning each frequency index (i,j) is repeated and thereby variable length coding concerning all the frequency indexes (i,j) is completed.

3. A hierarchical image coding device as claimed in claim 2, wherein the variable length coding executed by the second coding means is arithmetic coding.

4. A hierarchical image coding device as claimed in claim 1, wherein:

the coding residual values are coding residual values which occur when the first coding means executes quantization to transform coefficients which are obtained by executing reversible transform to the original image signal, and the quantization information which is outputted by the first coding means includes quantization scale frequency distribution and a quantization matrix, and the quantization information which is multiplexed by the multiplexing means into the enhancement layer bit-stream includes the quantization scale frequency distribution, and the coding residual value occurrence probability calculation means calculates the coding residual value occurrence probabilities, based on the quantization scale frequency distribution, the quantization matrix, and frequency distribution of each transform coefficient which has preliminarily been prepared, and the second coding means executes variable length coding to the coding residual values based on the coding residual value occurrence probabilities, in which variable length coding of coding residual values concerning each frequency index (i,j) is repeated and thereby variable length coding concerning all the frequency indexes (i,j) is completed.

5. A hierarchical image coding device as claimed in claim 4, wherein the variable length coding executed by the second coding means is arithmetic coding.

6. A hierarchical image coding device as claimed in claim 1, wherein:

the first coding means includes a transform coefficient collection means for collecting transform coefficients which are obtained by executing reversible transform to the original image signal, and thereby obtaining and outputting frequency distribution of each of the transform coefficients, and the coding residual value occurrence probability calculation means successively updates transform coefficient frequency distribution stored therein using the transform coefficient frequency distribution outputted by the transform coefficient collection means, and calculates the coding residual value occurrence probabilities using the updated transform coefficient frequency distribution.

7. A hierarchical image coding device as claimed in claim 1, wherein the first coding means includes:

a first image signal generation means for executing motion estimation and motion compensation to the original image signal and thereby generating a motion compensated prediction image signal, and outputting macro block information;

a second image signal generation means for subtracting the motion compensated prediction image signal from the original image signal and thereby generating a prediction error image signal;

a transform means for executing reversible transform to the prediction error image signal and thereby obtaining transform coefficients;

a quantization scale setting means for setting a quantization scale for each macro block based on the prediction error image signal;

a quantization means for executing quantization to the transform coefficients and thereby outputting quantized values, based on the quantization scale, a quantization matrix and the macro block information;

a variable length coding means for executing variable length coding to the quantized values based on the macro block information and a predetermined coding table, and thereby outputting a variable length code of the quantized values;

a base layer multiplexing means for multiplexing the variable length code of the quantized values, the quantization matrix, the quantization scale and the macro block information, and thereby generating and outputting the base layer bit-stream;

an inverse quantization means for executing inverse quantization to the quantized values based on the quantization scale, the quantization matrix and the macro block information, and thereby outputting inversely quantized values;

a coding residual value calculation means for subtracting the inversely quantized values from the transform coefficients, and thereby obtaining the coding residual values; and a quantization scale collection means for collecting the quantization scales at predetermined coding periods, and thereby obtaining and outputting quantization scale frequency distribution, and the coding residual value occurrence probability calculation means calculates the coding residual value occurrence probabilities based on the quantization scale frequency distribution outputted by the quantization scale collection means and the quantization matrix.

8. A hierarchical image coding device as claimed in claim 7, wherein:
 the base layer multiplexing means outputs code quantity information of the base layer bit-stream as well as outputting the base layer bit-stream, and
 the quantization scale setting means sets the quantization scale for each of the macro blocks, based on the prediction error image signal and the code quantity information.

9. A hierarchical image coding device as claimed in claim 7, wherein:
 the quantization scale collection means executes the collection of the quantization scales, with respect to each different block type separately, based on the macro block information, and thereby obtains and outputs quantization scale frequency distribution with respect to each of the different block types, and
 the coding residual value occurrence probability calculation means calculates coding residual value occurrence probabilities with respect to each of the different block types separately, using the quantization scale frequency distribution with respect to each block type outputted by the quantization scale collection means, and
 the second coding means executes the coding of the coding residual values, referring to the macro block information and using coding residual value occurrence probabilities with respect to a block type corresponding to the coding residual values to be coded.

10. A hierarchical image coding device as claimed in claim 9, wherein the different block types are intra blocks and non-intra blocks.

11. A hierarchical image coding device as claimed in claim 7, wherein:
 the first coding means further includes a transform coefficient collection means for collecting the transform coefficients obtained by the transform means and thereby obtaining and outputting frequency distribution of each of the transform coefficients, and
 the coding residual value occurrence probability calculation means successively updates the transform coefficient frequency distribution stored therein using the transform coefficient frequency distribution outputted by the transform coefficient collection means, and calculates the coding residual value occurrence probabilities using the updated transform coefficient frequency distribution.

12. A hierarchical image coding device as claimed in claim 11, wherein:
 the transform coefficient collection means executes the collection of the transform coefficients, with respect to each different block type separately, based on the macro block information, and thereby obtains and outputs transform coefficient frequency distribution with respect to each of the different block types, and
 the coding residual value occurrence probability calculation means successively updates transform coefficient frequency distribution with respect to each of the different block types stored therein using the transform coefficient frequency distribution with respect to each of the different block types outputted by the transform coefficient collection means, and calculates coding residual value occurrence probabilities with respect to each of the different block types separately, using the updated transform coefficient frequency distribution with respect to each of the different block types, and
 the second coding means executes the coding of the coding residual values, referring to the macro block information and using coding residual value occurrence probabilities with respect to a block type corresponding to the coding residual values to be coded.

13. A hierarchical image coding device as claimed in claim 12, wherein the different block types are intra blocks and non-intra blocks.

14. A hierarchical image coding device as claimed in claim 1, wherein the first coding means includes:
 a first image signal generation means for executing motion estimation between the original image signal and a locally decoded image signal, executing motion compensation to the locally decoded image signal based on the result of the motion estimation and thereby generating a first motion compensated prediction image signal, and outputting macro block information;
 a second image signal generation means for subtracting the first motion compensated prediction image signal from the original image signal and thereby generating a first prediction error image signal;
 a first transform means for executing reversible transform to the first prediction error image signal and thereby obtaining first transform coefficients;
 a quantization scale setting means for setting a quantization scale for each macro block based on the first prediction error image signal;
 a quantization means for executing quantization to the first transform coefficients and thereby outputting quantized values, based on the quantization scale, a quantization matrix and the macro block information;
 a variable length coding means for executing variable length coding to the quantized values based on the macro block information and a predetermined coding table, and thereby outputting a variable length code of the quantized values;
 a base layer multiplexing means for multiplexing the variable length code of the quantized values, the quantization matrix, the quantization scale and the macro block information, and thereby generating and outputting the base layer bit-stream;
 an inverse quantization means for executing inverse quantization to the quantized values based on the quantization scale, the quantization matrix and the macro block information, and thereby outputting inversely quantized values;
 a third image signal generation means for executing inverse transformation of the reversible transform to the inversely quantized values, and thereby generating a locally decoded prediction error image signal;
 a fourth image signal generation means for adding the locally decoded prediction error image signal to the first motion compensated prediction image signal, and thereby generating the locally decoded image signal;
 a fifth image signal generation means for executing motion compensation to the original image signal based on the macro block information, and thereby generating a second motion compensated prediction image signal;
 a sixth image signal generation means for subtracting the second motion compensated prediction image signal from the original image signal, and thereby generating a second prediction error image signal;
 a second transform means for executing the reversible transform to the second prediction error image signal and thereby obtaining second transform coefficients;

a coding residual value calculation means for subtracting the inversely quantized values from the second transform coefficients, and thereby obtaining the coding residual values; and a quantization scale collection means for collecting the quantization scales at predetermined coding periods, and thereby obtaining and outputting quantization scale frequency distribution, and the coding residual value occurrence probability calculation means calculates the coding residual value occurrence probabilities based on the quantization scale frequency distribution outputted by the quantization scale collection means and the quantization matrix.

15. A hierarchical image coding device as claimed in claim 14, wherein:

the base layer multiplexing means outputs code quantity information of the base layer bit-stream as well as outputting the base layer bit-stream, and the quantization scale setting means sets the quantization scale for each of the macro blocks, based on the first prediction error image signal and the code quantity information.

16. A hierarchical image coding device as claimed in claim 14, wherein:

the quantization scale collection means executes the collection of the quantization scales, with respect to each different block type separately, based on the macro block information, and thereby obtains and outputs quantization scale frequency distribution with respect to each of the different block types, and the coding residual value occurrence probability calculation means calculates coding residual value occurrence probabilities with respect to each of the different block types separately, using the quantization scale frequency distribution with respect to each block type outputted by the quantization scale collection means, and the second coding means executes the coding of the coding residual values, referring to the macro block information and using coding residual value occurrence probabilities with respect to a block type corresponding to the coding residual values to be coded.

17. A hierarchical image coding device as claimed in claim 16, wherein the different block types are intra blocks and non-intra blocks.

18. A hierarchical image coding device as claimed in claim 14, wherein:

the first coding means further includes a transform coefficient collection means for collecting the second transform coefficients obtained by the second transform means and thereby obtaining and outputting frequency distribution of each of the second transform coefficients, and the coding residual value occurrence probability calculation means successively updates transform coefficient frequency distribution stored therein using the second transform coefficient frequency distribution outputted by the transform coefficient collection means, and calculates the coding residual value occurrence probabilities using the updated transform coefficient frequency distribution.

19. A hierarchical image coding device as claimed in claim 18, wherein:

the transform coefficient collection means executes the collection of the second transform coefficients, with respect to each different block type separately, based on the macro block information, and thereby obtains and outputs transform coefficient frequency distribution with respect to each of the different block types, and the coding residual value occurrence probability calculation means successively updates transform coefficient frequency distribution with respect to each of the different block types stored therein using the transform coefficient frequency distribution with respect to each of the different block types outputted by the transform coefficient collection means, and calculates coding residual value occurrence probabilities with respect to each of the different block types separately, using the updated transform coefficient frequency distribution with respect to each of the different block types, and the second coding means executes the coding of the coding residual values, referring to the macro block information and using coding residual value occurrence probabilities with respect to a block type corresponding to the coding residual values to be coded.

20. A hierarchical image coding device as claimed in claim 19, wherein the different block types are intra blocks and non-intra blocks.

21. A hierarchical image decoding device for decoding the base layer bit-stream and the enhancement layer bit-stream which have been encoded by the hierarchical image coding device of the claim 1, comprising:

a demultiplexing means for demultiplexing the coding residual value code and the quantization information from the enhancement layer bit-stream;

a coding residual value occurrence probability calculation means for calculating occurrence probability of each possible value of each of the coding residual values, using the quantization information;

a first decoding means for decoding the coding residual value code based on the coding residual value occurrence probabilities calculated by the coding residual value occurrence probability calculation means, and thereby outputting the coding residual values; and a second decoding means for decoding the base layer bit-stream, adding the coding residual values to a signal obtained by decoding the base layer bit-stream, and thereby regenerating the original image signal.

22. A hierarchical image decoding device as claimed in claim 21, wherein:

the coding residual value occurrence probability calculation means calculates the coding residual value occurrence probabilities, based on quantization scale frequency distribution included in the quantization information demultiplexed from the enhancement layer bit-stream, a quantization matrix, and frequency distribution of each transform coefficient which has preliminarily been prepared, and the first decoding means executes variable length decoding to the coding residual value code based on the coding residual value occurrence probabilities, in which variable length decoding of coding residual value code concerning each frequency index (i,j) is repeated and thereby variable length decoding concerning all the frequency indexes (i,j) is completed.

23. A hierarchical image decoding device as claimed in claim 22, wherein the variable length decoding executed by the first decoding means is arithmetic decoding.

24. A hierarchical image decoding device as claimed in claim 21, wherein:

the second decoding means includes a transform coefficient collection means for collecting transform coefficients which are obtained by executing the decoding of the base layer bit-stream and adding the coding residual values to the decoding result, and thereby obtaining and outputting frequency distribution of each of the transform coefficients, and the coding residual value occurrence probability calculation means successively updates transform coefficient frequency distribution stored therein using the transform coefficient frequency distribution outputted by the transform coefficient collection means, and calculates the coding residual value occurrence probabilities using the updated transform coefficient frequency distribution.

25. A hierarchical image decoding device as claimed in claim 21, wherein the second decoding means includes:

a base layer demultiplexing means for demultiplexing the variable length code of the quantized values, the quantization matrix, the quantization scale and the macro block information from the base layer bit-stream;

a variable length decoding means for executing variable length decoding to the variable length code of the quantized values based on the macro block information and a predetermined coding table, and thereby outputting the quantized values;

an inverse quantization means for executing inverse quantization to the quantized values based on the quantization matrix, the quantization scale and the macro block information, and thereby outputting the inversely quantized values;

a transform coefficient calculation means for adding the coding residual values outputted by the first decoding means and the inversely quantized values outputted by the inverse quantization means, and thereby outputting the transform coefficients;

a first image signal regeneration means for executing inverse transformation of the reversible transform that has been executed in the hierarchical image coding device to the transform coefficients, and thereby regenerating the prediction error image signal;

a second image signal regeneration means for adding the prediction error image signal to a motion compensated prediction image signal, and thereby generating a decoded image signal; and a third image signal regeneration means for executing motion compensation to the decoded image signal based on the macro block information, and thereby generating the motion compensated prediction image signal.

26. A hierarchical image decoding device as claimed in claim 25, wherein:

the quantization information demultiplexed from the enhancement layer bit-stream by the demultiplexing means includes quantization scale frequency distribution with respect to each different block type, and the coding residual value occurrence probability calculation means calculates coding residual value occurrence probabilities with respect to each of the different block types separately, using the quantization scale frequency distribution with respect to each block type, and the first decoding means executes the decoding of the coding residual value code, referring to the macro block information and using coding residual value occurrence probabilities with respect to a block type corresponding to the coding residual value code to be decoded.

27. A hierarchical image decoding device as claimed in claim 26, wherein the different block types are intra blocks and non-intra blocks.

28. A hierarchical image decoding device as claimed in claim 25, wherein:

the second decoding means further includes a transform coefficient collection means for collecting transform coefficients which are obtained by executing the decoding of the base layer bit-stream and adding the coding residual values to the decoding result, and thereby obtaining and outputting frequency distribution of each of the transform coefficients, and the coding residual value occurrence probability calculation means successively updates transform coefficient frequency distribution stored therein using the transform coefficient frequency distribution outputted by the transform coefficient collection means, and calculates the coding residual value occurrence probabilities using the updated transform coefficient frequency distribution.

29. A hierarchical image decoding device as claimed in claim 28, wherein:

the transform coefficient collection means executes the collection of the transform coefficients, with respect to each different block type separately, based on the macro block information, and thereby obtains and outputs transform coefficient frequency distribution with respect to each of the different block types, and the coding residual value occurrence probability calculation means successively updates transform coefficient frequency distribution with respect to each of the different block types stored therein using the transform coefficient frequency distribution with respect to each of the different block types outputted by the transform coefficient collection means, and calculates coding residual value occurrence probabilities with respect to each of the different block types separately, using the updated transform coefficient frequency distribution with respect to each of the different block types, and the first decoding means executes the decoding of the coding residual value code, referring to the macro block information and using coding residual value occurrence probabilities with respect to a block type corresponding to the coding residual value code to be decoded.

30. A hierarchical image decoding device as claimed in claim 29, wherein the different block types are intra blocks and non-intra blocks.

31. A hierarchical image coding method for encoding an original image signal hierarchically, comprising the steps of:

a first coding step in which the original image signal is encoded and thereby a base layer bit-stream, quantization information and coding residual values are generated;

a coding residual value occurrence probability calculation step in which occurrence probability of each possible value of each of the coding residual values is calculated using the quantization information;

a second coding step in which the coding residual values are encoded based on the coding residual value occurrence probabilities calculated in the coding residual value occurrence probability calculation step and thereby coding residual value code is generated; and a multiplexing step in which the coding residual value code and the quantization information are multiplexed and thereby an enhancement layer bit-stream is generated.

32. A hierarchical image coding method as claimed in claim 31, wherein:
- the coding residual values are coding residual values which occur in the first coding step when quantization is executed to transform coefficients which are obtained by executing reversible transform to the original image signal, and
- the quantization information which is generated in the first coding step and multiplexed into the enhancement layer bit-stream in the multiplexing step includes quantization scale frequency distribution and a quantization matrix, and
- in the coding residual value occurrence probability calculation step, the coding residual value occurrence probabilities are calculated based on the quantization scale frequency distribution, the quantization matrix, and frequency distribution of each transform coefficient which has preliminarily been prepared, and
- in the second coding step, variable length coding is executed to the coding residual values based on the coding residual value occurrence probabilities, in which variable length coding of coding residual values concerning each frequency index (i,j) is repeated and thereby variable length coding concerning all the frequency indexes (i,j) is completed.

33. A hierarchical image coding method as claimed in claim 32, wherein the variable length coding executed in the second coding step is arithmetic coding.

34. A hierarchical image coding method as claimed in claim 31, wherein:
- the coding residual values are coding residual values which occur in the first coding step when quantization is executed to transform coefficients which are obtained by executing reversible transform to the original image signal, and
- the quantization information which is generated in the first coding step includes quantization scale frequency distribution and a quantization matrix, and
- the quantization information which is multiplexed into the enhancement layer bit-stream in the multiplexing step includes the quantization scale frequency distribution, and
- in the coding residual value occurrence probability calculation step, the coding residual value occurrence probabilities are calculated based on the quantization scale frequency distribution, the quantization matrix, and frequency distribution of each transform coefficient which has preliminarily been prepared, and
- in the second coding step, variable length coding is executed to the coding residual values based on the coding residual value occurrence probabilities, in which variable length coding of coding residual values concerning each frequency index (i,j) is repeated and thereby variable length coding concerning all the frequency indexes (i,j) is completed.

35. A hierarchical image coding method as claimed in claim 34, wherein the variable length coding executed in the second coding step is arithmetic coding.

36. A hierarchical image coding method as claimed in claim 31, wherein:
- the first coding step includes a transform coefficient collection step in which transform coefficients which are obtained by executing reversible transform to the original image signal are collected, and thereby frequency distribution of each of the transform coefficients is obtained, and
- in the coding residual value occurrence probability calculation step, transform coefficient frequency distribution successively updated by the transform coefficient frequency distribution obtained by the transform coefficient collection step is used for calculating the coding residual value occurrence probabilities.

37. A hierarchical image coding method as claimed in claim 31, wherein the first coding step includes the steps of:
- a first image signal generation step in which motion estimation and motion compensation are executed to the original image signal and thereby a motion compensated prediction image signal is generated and macro block information is obtained;
- a second image signal generation step in which the motion compensated prediction image signal is subtracted from the original image signal and thereby a prediction error image signal is generated;
- a transform step in which reversible transform is executed to the prediction error image signal and thereby transform coefficients are obtained;
- a quantization scale setting step in which a quantization scale is set for each macro block based on the prediction error image signal; a quantization step in which quantization is executed to the transform coefficients based on the quantization scale, a quantization matrix and the macro block information, and thereby quantized values are obtained;
- a variable length coding step in which variable length coding is executed to the quantized values based on the macro block information and a predetermined coding table, and thereby a variable length code of the quantized values is obtained;
- a base layer multiplexing step in which the variable length code of the quantized values, the quantization matrix, the quantization scale and the macro block information are multiplexed, and thereby the base layer bit-stream is generated;
- an inverse quantization step in which inverse quantization is executed to the quantized values based on the quantization scale, the quantization matrix and the macro block information, and thereby inversely quantized values are obtained;
- a coding residual value calculation step in which the inversely quantized values are subtracted from the transform coefficients, and thereby the coding residual values are obtained; and
- a quantization scale collection step in which the quantization scales are collected at predetermined coding periods, and thereby quantization scale frequency distribution is obtained,
- and in the coding residual value occurrence probability calculation step, the coding residual value occurrence probabilities are calculated based on the quantization scale frequency distribution obtained in the quantization scale collection step and the quantization matrix.

38. A hierarchical image coding method as claimed in claim 37, wherein:
- in the base layer multiplexing step, code quantity information of the base layer bit-stream is obtained as well as generating the base layer bit-stream, and
- in the quantization scale setting step, the quantization scale is set for each of the macro blocks, based on the prediction error image signal and the code quantity information.

39. A hierarchical image coding method as claimed in claim 37, wherein:

in the quantization scale collection step, the collection of the quantization scales is executed with respect to each different block type separately, based on the macro block information, and thereby quantization scale frequency distribution with respect to each of the different block types are obtained, and in the coding residual value occurrence probability calculation step, coding residual value occurrence probabilities with respect to each of the different block types are calculated separately, using the quantization scale frequency distribution with respect to each block type obtained in the quantization scale collection step, and in the second coding step, the coding of the coding residual values is executed, referring to the macro block information and using coding residual value occurrence probabilities with respect to a block type corresponding to the coding residual values to be coded.

40. A hierarchical image coding method as claimed in claim 39, wherein the different block types are intra blocks and non-intra blocks.

41. A hierarchical image coding method as claimed in claim 37, wherein:

the first coding step further includes a transform coefficient collection step in which the transform coefficients obtained in the transform step are collected and thereby frequency distribution of each of the transform coefficients is obtained, and in the coding residual value occurrence probability calculation step, transform coefficient frequency distribution successively updated by the transform coefficient frequency distribution obtained by the transform coefficient collection step is used for calculating the coding residual value occurrence probabilities.

42. A hierarchical image coding method as claimed in claim 41, wherein:

in the transform coefficient collection step, the collection of the transform coefficients is executed with respect to each different block type separately, based on the macro block information, and thereby transform coefficient frequency distribution with respect to each of the different block types is obtained, and in the coding residual value occurrence probability calculation step, coding residual value occurrence probabilities with respect to each of the different block types are calculated separately, using transform coefficient frequency distribution with respect to each of the different block types successively updated by the transform coefficient frequency distribution with respect to each of the different block types obtained by the transform coefficient collection step, and in the second coding step, the coding of the coding residual values is executed, referring to the macro block information and using coding residual value occurrence probabilities with respect to a block type corresponding to the coding residual values to be coded.

43. A hierarchical image coding method as claimed in claim 42, wherein the different block types are intra blocks and non-intra blocks.

44. A hierarchical image coding method as claimed in claim 31, wherein the first coding step includes the steps of a first image signal generation step in which motion estimation is executed between the original image signal and a locally decoded image signal, motion compensation is executed to the locally decoded image signal based on the result of the motion estimation, and thereby a first motion compensated prediction image signal is generated, and macro block information is obtained;

a second image signal generation step in which the first motion compensated prediction image signal is subtracted from the original image signal and thereby a first prediction error image signal is generated;

a first transform step in which reversible transform is executed to the first prediction error image signal and thereby first transform coefficients are obtained;

a quantization scale setting step in which a quantization scale is set for each macro block based on the first prediction error image signal;

a quantization step in which quantization is executed to the first transform coefficients based on the quantization scale, a quantization matrix and the macro block information, and thereby quantized values are obtained;

a variable length coding step in which variable length coding is executed to the quantized values based on the macro block information and a predetermined coding table, and thereby a variable length code of the quantized values is generated;

a base layer multiplexing step in which the variable length code of the quantized values, the quantization matrix, the quantization scale and the macro block information are multiplexed, and thereby the base layer bit-stream is generated;

an inverse quantization step in which inverse quantization is executed to the quantized values based on the quantization scale, the quantization matrix and the macro block information, and thereby inversely quantized values are obtained;

a third image signal generation step in which inverse transformation of the reversible transform is executed to the inversely quantized values, and thereby a locally decoded prediction error image signal is generated;

a fourth image signal generation step in which the locally decoded prediction error image signal is added to the first motion compensated prediction image signal, and thereby the locally decoded image signal is generated;

a fifth image signal generation step in which motion compensation is executed to the original image signal based on the macro block information, and thereby a second motion compensated prediction image signal is generated;

a sixth image signal generation step in which the second motion compensated prediction image signal is subtracted from the original image signal, and thereby a second prediction error image signal is generated;

a second transform step in which the reversible transform is executed to the second prediction error image signal and thereby second transform coefficients are obtained;

a coding residual value calculation step in which the inversely quantized values are subtracted from the second transform coefficients, and thereby the coding residual values are obtained; and a quantization scale collection step in which the quantization scales are collected at predetermined coding periods, and thereby quantization scale frequency distribution is obtained, and in the coding residual value occurrence probability calculation step, the coding residual value occurrence probabilities are calculated based on the quantization scale frequency distribution obtained in the quantization scale collection step and the quantization matrix.

45. A hierarchical image coding method as claimed in claim 44, wherein:

in the base layer multiplexing step, code quantity information of the base layer bit-stream is obtained as well as generating the base layer bit-stream, and in the quantization scale setting step, the quantization scale is set for each of the macro blocks, based on the first prediction error image signal and the code quantity information.

46. A hierarchical image coding method as claimed in claim 44, wherein:

in the quantization scale collection step, the collection of the quantization scales is executed with respect to each different block type separately, based on the macro block information, and thereby quantization scale frequency distribution with respect to each of the different block types is obtained, and in the coding residual value occurrence probability calculation step, coding residual value occurrence probabilities with respect to each of the different block types are calculated separately, using the quantization scale frequency distribution with respect to each block type obtained in the quantization scale collection step, and in the second coding step, the coding of the coding residual values is executed, referring to the macro block information and using coding residual value occurrence probabilities with respect to a block type corresponding to the coding residual values to be coded.

47. A hierarchical image coding method as claimed in claim 46, wherein the different block types are intra blocks and non-intra blocks.

48. A hierarchical image coding method as claimed in claim 44, wherein:

the first coding step further includes a transform coefficient collection step in which the second transform coefficients obtained in the second transform step are collected and thereby frequency distribution of each of the second transform coefficients is obtained, and in the coding residual value occurrence probability calculation step, transform coefficient frequency distribution successively updated by the second transform coefficient frequency distribution obtained by the transform coefficient collection step is used for calculating the coding residual value occurrence probabilities.

49. A hierarchical image coding method as claimed in claim 48, wherein:

in the transform coefficient collection step, the collection of the second transform coefficients is executed with respect to each different block type separately, based on the macro block information, and thereby transform coefficient frequency distribution with respect to each of the different block types is obtained, and in the coding residual value occurrence probability calculation step, coding residual value occurrence probabilities with respect to each of the different block types are calculated separately, using transform coefficient frequency distribution with respect to each of the different block types successively updated by the transform coefficient frequency distribution with respect to each of the different block types obtained by the transform coefficient collection step, and in the second coding step, the coding of the coding residual values is executed, referring to the macro block information and using coding residual value occurrence probabilities with respect to a block type corresponding to the coding residual values to be coded.

50. A hierarchical image coding method as claimed in claim 49, wherein the different block types are intra blocks and non-intra blocks.

51. A hierarchical image decoding method for decoding the base layer bit-stream and the enhancement layer bit-stream which have been encoded by the hierarchical image coding method of the-above claims, comprising the steps of:

a demultiplexing step in which the coding residual value code and the quantization information are demultiplexed from the enhancement layer bit-stream;

a coding residual value occurrence probability calculation step in which occurrence probability of each possible value of each of the coding residual values is calculated using the quantization information;

a first decoding step in which the coding residual value code is decoded based on the coding residual value occurrence probabilities calculated in the coding residual value occurrence probability calculation step, and thereby the coding residual values are obtained; and a second decoding step in which the base layer bit-stream is decoded, the coding residual values are added to a signal obtained by decoding the base layer bit-stream, and thereby the original image signal is regenerated.

52. A hierarchical image decoding method as claimed in claim 51, wherein:

in the coding residual value occurrence probability calculation step, the coding residual value occurrence probabilities are calculated based on quantization scale frequency distribution included in the quantization information demultiplexed from the enhancement layer bit-stream, a quantization matrix, and frequency distribution of each transform coefficient which has preliminarily been prepared, and in the first decoding step, variable length decoding is executed to the coding residual value code based on the coding residual value occurrence probabilities, in which variable length decoding of coding residual value code concerning each frequency index (i,j) is repeated and thereby variable length decoding concerning all the frequency indexes (i,j) is completed.

53. A hierarchical image decoding method as claimed in claim 52, wherein the variable length decoding executed in the first decoding step is arithmetic decoding.

54. A hierarchical image decoding method as claimed in claim 51, wherein:

the second decoding step includes a transform coefficient collection step in which transform coefficients which are obtained by executing the decoding of the base layer bit-stream and adding the coding residual values to the decoding result is collected and thereby frequency distribution of each of the transform coefficients is obtained, and in the coding residual value occurrence probability calculation step, transform coefficient frequency distribution successively updated by the transform coefficient frequency distribution obtained by the transform coefficient collection step is used for calculating the coding residual value occurrence probabilities.

55. A hierarchical image decoding method as claimed in claim 51, wherein the second decoding step includes the steps of:

a base layer demultiplexing step in which the variable length code of the quantized values, the quantization matrix, the quantization scale and the macro block information are demultiplexed from the base layer bit-stream;

a variable length decoding step in which variable length decoding is executed to the variable length code of the quantized values based on the macro block information and a predetermined coding table, and thereby the quantized values are obtained;

an inverse quantization step in which inverse quantization is executed to the quantized values based on the quantization matrix, the quantization scale and the macro block information, and thereby the inversely quantized values are obtained;

a transform coefficient calculation step in which the coding residual values obtained in the first decoding step and the inversely quantized values obtained in the inverse quantization step are added, and thereby the transform coefficients are obtained;

a first image signal regeneration step in which inverse transformation of the reversible transform that has been executed in the hierarchical image coding method is executed to the transform coefficients, and thereby the prediction error image signal is regenerated;

a second image signal regeneration step in which the prediction error image signal is added to a motion compensated prediction image signal, and thereby a decoded image signal is generated; and a third image signal regeneration step in which motion compensation is executed to the decoded image signal based on the macro block information, and thereby the motion compensated prediction image signal is generated.

56. A hierarchical image decoding method as claimed in claim 55, wherein:

the quantization information demultiplexed from the enhancement layer bit-stream in the demultiplexing step includes quantization scale frequency distribution with respect to each different block type, and in the coding residual value occurrence probability calculation step, coding residual value occurrence probabilities with respect to each of the different block types are calculated separately, using the quantization scale frequency distribution with respect to each block type, and in the first decoding step, the decoding of the coding residual value code is executed, referring to the macro block information and using coding residual value occurrence probabilities with respect to a block type corresponding to the coding residual value code to be decoded.

57. A hierarchical image decoding method as claimed in claim 56, wherein the different block types are intra blocks and non-intra blocks.

58. A hierarchical image decoding method as claimed in claim 55, wherein:

the second decoding step further includes a transform coefficient collection step in which transform coefficients which are obtained by executing the decoding of the base layer bit-stream and adding the coding residual values to the decoding result are collected and thereby frequency distribution of each of the transform coefficients is obtained, and in the coding residual value occurrence probability calculation step, transform coefficient frequency distribution successively updated by the transform coefficient frequency distribution obtained by the transform coefficient collection step is used for calculating the coding residual value occurrence probabilities.

59. A hierarchical image decoding method as claimed in claim 58, wherein:

in the transform coefficient collection step, the collection of the transform coefficients is executed with respect to each different block type separately, based on the macro block information, and thereby transform coefficient frequency distribution with respect to each of the different block types is obtained, and in the coding residual value occurrence probability calculation step, coding residual value occurrence probabilities with respect to each of the different block types are calculated separately, using transform coefficient frequency distribution with respect to each of the different block types successively updated by the transform coefficient frequency distribution with respect to each of the different block types obtained by the transform coefficient collection step, and in the first decoding step, the decoding of the coding residual value code is executed, referring to the macro block information and using coding residual value occurrence probabilities with respect to a block type corresponding to the coding residual value code to be decoded.

60. A hierarchical image decoding method as claimed in claim 59, wherein the different block types are intra blocks and non-intra blocks.

* * * * *